United States Patent
Jin et al.

(10) Patent No.: US 7,449,496 B2
(45) Date of Patent: Nov. 11, 2008

(54) STABILIZED BOEHMITE-DERIVED CATALYST SUPPORTS, CATALYSTS, METHODS OF MAKING AND USING

(75) Inventors: Yaming Jin, Ponca City, OK (US); Kandaswamy Jothimurugesan, Hercules, CA (US); Kristi A. Fjare, Ponca City, OK (US); J. Dale Ortego, Jr., Katy, TX (US); Beatrice C. Ortego, Katy, TX (US); Rafael L. Espinoza, Tulsa, OK (US)

(73) Assignee: ConocoPhillips Company, Houston, TX (US)

( * ) Notice: Subject to any disclaimer, the term of this patent is extended or adjusted under 35 U.S.C. 154(b) by 2 days.

(21) Appl. No.: 11/875,484

(22) Filed: Oct. 19, 2007

(65) Prior Publication Data

US 2008/0039539 A1    Feb. 14, 2008

Related U.S. Application Data

(63) Continuation of application No. 11/114,804, filed on Apr. 26, 2005, now Pat. No. 7,341,976, which is a continuation-in-part of application No. 10/687,022, filed on Oct. 16, 2003, now Pat. No. 7,071,239, and a continuation-in-part of application No. 10/688,412, filed on Oct. 16, 2003, now Pat. No. 7,176,160.

(60) Provisional application No. 60/419,003, filed on Oct. 16, 2002, provisional application No. 60/419,073, filed on Oct. 16, 2002.

(51) Int. Cl.
*C07C 27/00*   (2006.01)
*B01J 23/00*   (2006.01)
*B01J 21/00*   (2006.01)
*B01J 20/00*   (2006.01)

(52) U.S. Cl. .............. 518/700; 502/263; 502/355; 502/415; 502/439

(58) Field of Classification Search .............. 502/263, 502/355, 415, 439; 518/700
See application file for complete search history.

(56) References Cited

U.S. PATENT DOCUMENTS 2,838,375 A * 6/1958 Gring et al. .............. 423/628

(Continued)

FOREIGN PATENT DOCUMENTS

| WO | WO01/76735 A1 | 10/2001 |
| WO | WO02/07883 A1 | 1/2002 |

OTHER PUBLICATIONS

Van De Loosdrecht et al, Database Caplus on STN, Chemical Abstract (Columbus, Ohio, USA), AN 2000:795147; "Support Modification for Cobalt Based Slurry Phase Pischer-Tropsch Catalysts", American Chemical Society (2000) 220th, Fuel 048 (1 p.).

*Primary Examiner*—Cam N. Nguyen

(57) ABSTRACT

A stabilized catalyst support having improved hydrothermal stability, catalyst made therefrom, and method for producing hydrocarbons from synthesis gas using said catalyst. The stabilized support is made by a method comprising treating a crystalline hydrous alumina precursor in contact with at least one structural stabilizer or compound thereof. The crystalline hydrous alumina precursor preferably includes an average crystallite size selected from an optimum range delimited by desired hydrothermal resistance and desired porosity. The crystalline hydrous alumina precursor preferably includes an alumina hydroxide, such as crystalline boehmite, crystalline bayerite, or a plurality thereof differing in average crystallite sizes by at least about 1 nm. The crystalline hydrous alumina precursor may be shaped before or after contact with the structural stabilizer or compound thereof. The treating includes calcining at 450° C. or more. Preferred structural stabilizers can include cobalt, magnesium, manganese, manganese, zirconium, boron, aluminum, barium, silicon, lanthanum, oxides thereof, or combinations thereof.

28 Claims, 3 Drawing Sheets

U.S. PATENT DOCUMENTS

| | | | | |
|---|---|---|---|---|
| 2,938,002 A * | 5/1960 | Braithwaite et al. | ......... | 502/314 |
| 3,242,101 A * | 3/1966 | Erickson et al. | ............ | 502/314 |
| 3,245,919 A | 4/1966 | Gring et al. | | |
| 3,852,190 A * | 12/1974 | Buss et al. | .................. | 208/138 |
| 3,894,963 A * | 7/1975 | Gerdes et al. | ............... | 502/320 |
| 3,945,945 A | 3/1976 | Kiovsky et al. | | |
| 4,012,313 A * | 3/1977 | Buss et al. | .................. | 208/139 |
| 4,063,851 A * | 12/1977 | Weldon | ..................... | 416/97 A |
| 4,224,192 A * | 9/1980 | Foster et al. | ................ | 502/326 |
| 4,387,085 A * | 6/1983 | Fanelli et al. | ............... | 423/630 |
| 4,581,157 A | 4/1986 | Twigg et al. | | |
| 4,602,000 A * | 7/1986 | Dupin et al. | ................ | 502/335 |
| 4,617,183 A * | 10/1986 | Lewis et al. | ................ | 423/630 |
| 4,708,945 A * | 11/1987 | Murrell et al. | .............. | 502/263 |
| 4,744,974 A * | 5/1988 | Lewis et al. | ................. | 423/625 |
| 4,797,139 A | 1/1989 | Bauer | | |
| 4,831,007 A | 5/1989 | Murrell et al. | | |
| 4,891,127 A * | 1/1990 | Murrel et al. | ............ | 208/111.3 |
| 5,055,019 A * | 10/1991 | Meyer et al. | ................ | 423/625 |
| 5,102,851 A * | 4/1992 | Eri et al. | ...................... | 502/302 |
| 5,116,879 A * | 5/1992 | Eri et al. | ...................... | 518/716 |
| 5,134,107 A * | 7/1992 | Narula | ....................... | 502/303 |
| 5,224,846 A * | 7/1993 | Kirschner et al. | ........... | 417/499 |
| 5,232,580 A * | 8/1993 | Le et al. | .................... | 208/114 |
| 5,255,358 A * | 10/1993 | Busboom et al. | ............ | 715/843 |
| 5,593,654 A | 1/1997 | Decker, Jr. et al. | | |
| 5,837,634 A * | 11/1998 | McLaughlin et al. | ........ | 501/127 |
| 5,874,381 A * | 2/1999 | Bonne et al. | ................ | 502/327 |
| 6,063,358 A * | 5/2000 | Lindquist et al. | ............ | 423/625 |
| 6,262,132 B1 | 7/2001 | Singleton et al. | | |
| 6,271,432 B2 * | 8/2001 | Singleton et al. | ............ | 585/700 |
| 6,303,531 B1 * | 10/2001 | Lussier et al. | ................. | 502/84 |
| 6,429,172 B1 | 8/2002 | Tsukada et al. | | |
| 6,465,530 B2 | 10/2002 | Roy-Auberger et al. | | |
| 6,503,867 B1 * | 1/2003 | Stamires et al. | ............ | 502/335 |
| 6,531,517 B1 | 3/2003 | Watcher et al. | | |
| 6,555,496 B1 * | 4/2003 | Stamires et al. | ............ | 502/327 |
| 6,773,690 B1 | 8/2004 | Norweck et al. | | |
| 6,806,226 B2 * | 10/2004 | Van Berge et al. | .......... | 502/326 |
| 6,835,690 B2 * | 12/2004 | Van Berge et al. | .......... | 502/328 |
| 2001/0003787 A1 | 6/2001 | Singleton et al. | | |
| 2001/0031793 A1 | 10/2001 | Singleton et al. | | |
| 2001/0036967 A1 | 11/2001 | Singleton et al. | | |
| 2002/0155946 A1 * | 10/2002 | Bogdan et al. | ............. | 502/227 |
| 2003/0032554 A1 * | 2/2003 | Park et al. | .................... | 502/302 |
| 2003/0162849 A1 * | 8/2003 | Van Berge et al. | .......... | 518/716 |
| 2004/0127586 A1 | 7/2004 | Jin et al. | | |
| 2004/0127587 A1 | 7/2004 | Espinoza et al. | | |
| 2004/0132833 A1 | 7/2004 | Espinoza et al. | | |
| 2004/0132834 A1 | 7/2004 | Ortego, Jr. et al. | | |
| 2004/0186188 A1 * | 9/2004 | Van Berge et al. | .......... | 518/716 |
| 2005/0234137 A1 | 10/2005 | Espinoza et al. | | |

* cited by examiner

STABILIZED BOEHMITE-DERIVED CATALYST SUPPORTS, CATALYSTS, METHODS OF MAKING AND USING

CROSS-REFERENCE TO RELATED APPLICATIONS

This non-provisional application is a continuation application of U.S. application Ser. No. 11/114,804, filed Apr. 26, 2005, which is U.S. Pat. No. 7,341,976 B2, issued Mar. 11, 2008, which is a CIP application of U.S. application Ser. No. 10/687,022, filed Oct. 16, 2003, which is U.S. Pat. No. 7,071, 239, issued Jul. 4, 2006, which claims the benefit of U.S. Provisional Application No. 60/419,003, filed Oct. 16, 2002; and a CIP application of U.S. application Ser. No. 10/688, 412, filed Oct. 16, 2003, which is U.S. Pat. No. 7,176,160, which claims the benefit of U.S. Provisional Application No. 60/419,073, filed Oct. 16, 2002, each of which is hereby incorporated by reference in its entirety.

FIELD OF THE INVENTION

The present invention relates to a catalyst that includes a stabilized support and a catalytic metal and more specifically to a stabilized support derived by treating a boehmite material in the presence of a structural stabilizer to enhance the hydrothermal stability of the catalyst made therefrom.

BACKGROUND OF THE INVENTION

There has been interest in developing technologies for converting natural gas to more readily transportable liquid fuels, i.e. to fuels that are liquid at standard temperatures and pressures. One method for converting natural gas to liquid fuels involves two sequential chemical transformations. In the first transformation, natural gas or methane, the major chemical component of natural gas, is reacted with oxygen to form syngas, which is a combination of carbon monoxide gas and hydrogen gas. In the second transformation, known as the Fischer-Tropsch process, carbon monoxide is converted into organic molecules containing carbon and hydrogen, including aliphatic hydrocarbons such as paraffins and/or olefins, as well as oxygenates. Paraffins are particularly desirable as the basis of synthetic diesel fuel. Consequently, in the production of a Fischer-Tropsch product stream for processing to a fuel, it is desirable to maximize the production of high value liquid hydrocarbons, such as hydrocarbons with at least 5 carbon atoms per hydrocarbon molecule ($C_{5+}$ hydrocarbons).

The Fischer-Tropsch process is commonly facilitated by a catalyst. Catalysts desirably have the function of increasing the rate of a reaction without being consumed by the reaction. A feed containing carbon monoxide and hydrogen is typically contacted with a catalyst in a reactor to form a range of hydrocarbons including gases, liquids and waxes. The composition of a catalyst influences the relative amounts of hydrocarbons obtained from a Fischer-Tropsch catalytic process. Common catalysts for use in the Fischer-Tropsch process contain at least one metal from Groups 8, 9, or 10 of the Periodic Table (in the new IUPAC notation, which is used throughout the present specification). For instance, a catalytic metal is typically selected from the group consisting of cobalt, ruthenium, nickel, iron, and combinations thereof. Cobalt metal is particularly desirable in catalysts used in converting natural gas to heavy hydrocarbons suitable for the production of diesel fuel. Alternatively, iron, nickel, and ruthenium have been used in Fischer-Tropsch catalysts.

Further, in addition to the catalytic metal, a Fischer-Tropsch catalyst often includes a support material. The support is typically a porous material that provides mechanical strength and a high surface area, in which the active metal and promoter(s) can be deposited. In a common method of loading a Fischer-Tropsch metal to a support, the support is impregnated with a solution containing a dissolved metal-containing compound. The metal may be impregnated in a single impregnation, drying and calcination step or in multiple impregnation steps. When a promoter is used in the catalyst formulation, an impregnation solution may further contain a promoter-containing compound. After drying the support, the resulting catalyst precursor is calcined, typically by heating in an oxidizing atmosphere, to decompose the metal-containing compound to a metal oxide. When the catalytic metal is cobalt, the catalyst precursor is then typically reduced in hydrogen to convert the oxide compound to reduced "metallic" metal. When the catalyst includes a promoter, the reduction conditions may cause reduction of the promoter, or the promoter may remain as an oxide compound.

Catalyst supports for catalysts used in Fischer-Tropsch synthesis of hydrocarbons have typically been refractory oxides, e.g., silica, alumina, titania, zirconia or mixtures thereof (see E. Iglesia et al. 1993, In: "Computer-Aided Design of Catalysts," ed. E. R. Becker et al., p. 215, New York, Marcel Dekker, Inc.). In particular, various aluminum oxide compounds have been used as catalyst supports and continue to be improved. For example, gamma-alumina is an oxide compound of aluminum having, in its pure form, the empirical formula $\gamma$-$Al_2O_3$. Gamma-alumina distinguished from other polymorphic forms of alumina, such as alpha-alumina ($\alpha$-$Al_2O_3$), by its structure, which may be detected for example by x-ray diffraction (see for example Zhou & Snyder, 1991, Acta Cryst., vol B47, pp. 617-630) or electron microscopy (see for example Santos et al., 2000, Materials Research, vol 3, No. 4, pp. 101-114). The structure of gamma-alumina is conventionally thought to approximate a spinel with a cubic form or a tetragonal form or combination.

In a common method of producing gamma-alumina, naturally occurring bauxite is transformed to gamma-alumina via intermediates. Bauxite is an ore, which is obtained from the earth's crust. Minerals commonly found in bauxite and the empirical formulas of their pure forms include gibbsite ($\alpha$-$Al_2O_3$.$3H_2O$), boehmite ($\alpha$-$Al_2O_3$.$H_2O$), diaspore ($\beta$-$Al_2O_3$.$H_2O$), hematite ($\alpha$-$Fe_2O_3$), goethite ($\alpha$-FeOOH), magnetite ($Fe_3O_4$), siderite ($FeCO_3$), ilmenite ($FeTiO_3$), anatase ($TiO_2$), rutile ($TiO_2$), brookite ($TiO_2$), hallyosite ($Al_2O_3$ $2SiO_2$.$3H_2O$), kaolinite ($Al_2O_3$ $2SiO_2$ $2H_2O$), and quartz ($SiO_2$).

In a first transformation, gibbsite is derived from bauxite. The Bayer process is one common process for producing gibbsite from bauxite. The Bayer process was originally developed by Karl Joseph Bayer in 1888 and is the basis of most commercial processes for the production of gibbsite. As it is conventionally carried out, the Bayer process includes digestion of bauxite with sodium hydroxide in solution at elevated temperature and pressure to form sodium aluminate in solution, separation of insoluble impurities from the solution, and precipitation of gibbsite from the solution.

In a second transformation, boehmite is derived from gibbsite. As disclosed above, gibbsite is a trihydrated alumina having, in its pure form, the empirical formula $\alpha$-$Al_2O_3$.$3H_2O$. Transformation of gibbsite to boehmite may be accomplished by varying the conditions so as to influence the thermodynamic equilibrium to favor boehmite. For example, a method for producing boehmite from gibbsite may include dehydration in air at 180° C.

In a third transformation, gamma-alumina is derived from boehmite. Boehmite, in its pure form has the empirical formula $\alpha\text{-}Al_2O_3.H_2O$. Alternately, it is denoted in the art by $\gamma\text{-}AlO(OH)$. The respective $\alpha$ and $\gamma$ prefixes refer to the crystalline form. Boehmite is distinguished from other polymorphic forms of monohydrated alumina, such as diaspore ($\beta\text{-}Al_2O_3.H_2O$), by its structure or crystalline form. In particular, boehmite typically has orthorhombic symmetry. Transformation of boehmite to gamma-alumina may be accomplished by varying the conditions so as to influence the thermodynamic equilibrium to favor gamma-alumina.

A support material is desirably stable. Under ambient (standard) conditions of temperature and pressure, such as for storage, gamma-alumina is less reactive and therefore more stable than boehmite. Thus, gamma-alumina is typically regarded as a more desirable support material than boehmite. Further, calcination of boehmite to form gamma-alumina before loading the catalytic metal to the gamma-alumina is generally regarded as a desirable step in the formation of a catalyst on alumina. Therefore, the catalytic metal is typically not loaded to boehmite itself in forming the catalyst.

Despite the tendency of gamma-alumina to be stable at atmospheric conditions, gamma-alumina is known to exhibit a tendency to instability under hydrothermal conditions. For example, M. Abso-Haalabi, et al. in "Preparation of Catalysts V", Ed. G. Poncelet, et al. (1991, Elsevier, Amsterdam, pp. 155-163) disclose that gamma-alumina undergoes an increase in average pore size and an accompanying decrease in surface area after hydrothermal treatment in the temperature range 150-300° C. Such a transformation would be undesirable in a catalyst. However, similar hydrothermal conditions occur, for example, in the Fischer-Tropsch process. In particular, in a Fischer-Tropsch process, water is produced during the Fischer-Tropsch reaction. The presence of water together with the elevated temperatures conventionally employed in the Fischer-Tropsch process create conditions in which hydrothermal stability, which is stability at elevated temperatures in the presence of water, is desirable. Fischer-Tropsch catalysts using gamma-alumina supports are known to exhibit a tendency to hydrothermal instability under Fischer-Tropsch operating conditions. This instability tends to cause a decrease in performance of gamma-alumina supported catalysts.

Finely divided supported catalysts used in fluidized or slurry systems have been known to attrit and deactivate, which causes longevity concerns and product separation issues due to fines formation. The attrition and the deactivation may be due in part to hydrothermal degradation by high pressure and temperature steam from water formed in the reactor. Particularly, the high pressure and temperature steam may promote rehydration of the catalyst support, such as in the case of an alumina support to boehmite and/or gibbsite phases causing a change in the chemical structure and leading to structural instability.

Consequently, there remains a significant need to enhance the robustness of a Fischer-Tropsch supported catalyst without jeopardizing its performance by optimizing the alumina-based support structure by careful selection of the alumina precursor and by addition of a structural stabilizer so as to provide a good performing Fischer-Tropsch catalyst with improved overall physical properties and increased hydrothermal stability under Fischer-Tropsch operating conditions. Additional needs include increased porosity of the support structure of a Fischer-Tropsch supported catalyst to improve diffusional limitations while keeping its surface area sufficient to provide optimal dispersion of the Fischer-Tropsch metal(s).

SUMMARY OF THE INVENTION

According to one embodiment of the present invention, a catalyst features a stabilized support and a Fischer-Tropsch catalytic metal. The stabilized support can be made by a method that includes treating a crystalline hydrous alumina precursor (e.g., boehmite, bayerite) in contact with a structural stabilizer. Contacting the crystalline hydrous alumina precursor with the structural stabilizer preferably includes forming a mixture comprising a crystalline hydrous alumina precursor and a compound of the structural stabilizer in a solvent. The mixture can be a sol or a slurry. The treating preferably enhances the hydrothermal stability of the support. Treating preferably includes drying the mixture and/or calcining.

One method for making a catalyst precursor with an enhanced hydrothermal stability, comprises providing a material comprising a crystalline hydrous alumina precursor; contacting the material with at least one structural stabilizer or a compound thereof; shaping the contacted material in the presence of the compound of the at least one structural stabilizer so as to form a shaped alumina precursor material in the form of particles of a desired average particle size, wherein the shaped alumina precursor material comprises the crystalline hydrous alumina precursor and the at least one structural stabilizer or compound thereof; calcining the shaped alumina precursor material under suitable calcination conditions to effect the conversion of the crystalline hydrous alumina precursor to a stabilized aluminum oxide structure and to generate a stabilized catalyst support; and applying a catalytic metal or a compound thereof to said stabilized catalyst support to form a catalyst precursor, wherein the catalytic metal comprises a Group 8 metal, a Group 9 metal, a Group 10 metal, or combinations thereof.

Another method for making a catalyst precursor with an enhanced hydrothermal stability comprises shaping a material comprising a crystalline hydrous alumina precursor to form a shaped alumina precursor material in the form of particles with a desired average particle size; optionally, treating the shaped alumina precursor material to a temperature not exceeding about 350° C. so as to retain a substantial portion of the crystalline hydrous alumina precursor; contacting the shaped alumina precursor material containing the crystalline hydrous alumina precursor with at least one structural stabilizer or a compound thereof; calcining the shaped alumina precursor material in the presence of the at least one structural stabilizer or compound thereof under suitable conditions to effect the conversion of the crystalline hydrous alumina precursor to a stabilized aluminum oxide structure and to generate a stabilized catalyst support; and e) applying a catalytic metal or a compound thereof to said stabilized catalyst support to form the catalyst precursor, wherein the catalytic metal comprises a Group 8 metal, Group 9 metal, Group 10 metal, or combinations thereof.

The crystalline hydrous alumina precursor comprises at least one crystalline boehmite or at least one crystalline bayerite. The crystalline hydrous alumina precursor preferably has an average crystallite size selected from an optimum range of average crystallite size, said optimum range being delimited by a desired hydrothermal stability and a desired porosity. The optimum range of average crystallite size may comprise a low average crystallite size limit determined by a desired minimum level of hydrothermal resistance of the resulting support and an upper average crystallite size limit determined by a desired minimum surface area or maximum average pore size. In some embodiments, the crystalline hydrous alumina precursor may comprise at least one crystalline boehmite having an average crystallite size selected from an optimum range from about 4 nm to about 30 nm so as to provide a suitable support to make a very productive Fischer-Tropsch catalyst with improved hydrothermal resistance.

One embodiment of the method for making a catalyst precursor with an enhanced hydrothermal stability comprises providing a boehmite material comprising at least one crystalline boehmite, wherein the at least one crystalline boehmite comprises an average crystallite size selected from a range from about 4 nm and about 30 nm. The method also comprises contacting the boehmite material with at least one structural stabilizer or a compound thereof. In addition, the method comprises shaping the boehmite material in the presence of the at least one structural stabilizer or compound thereof so as to form a shaped boehmite material in the form of particles of a desired average particle size, wherein the shaped boehmite material comprises the at least one crystalline boehmite and the at least one structural stabilizer or compound thereof. The method further comprises calcining the shaped boehmite material under suitable calcination conditions to effect the conversion of the at least one crystalline boehmite to a stabilized aluminum oxide structure and to generate a stabilized catalyst support. Moreover, the method comprises applying a catalytic metal or a compound thereof to said stabilized catalyst support to form a catalyst precursor, wherein the catalytic metal comprises a Group 8 metal, Group 9 metal, Group 10 metal, or combinations thereof. Calcining the boehmite material can be performed at a temperature between about 450° C. and about 900° C., more preferably between about 500° C. and about 850° C., still more preferably between about 600° C. and about 850° C. Alternatively, calcining can be performed at a temperature between about 500° C. and about 800° C. or between about 500° C. and about 775° C. or between about 550° C. and about 850° C. or between about 500° C. and about 750° C. Yet in another alternate embodiment, calcining can be performed at a temperature between about 900° C. and about 1600° C. or between about 1000° C. and about 1500° C. or between about 1100° C. and about 1400° C.

Yet another embodiment of the method for making a stabilized catalyst precursor with an enhanced hydrothermal stability, comprises shaping a boehmite material comprising at least one crystalline boehmite to form a shaped boehmite material in the form of particles with a desired average particle size, wherein the at least one crystalline boehmite comprises an average crystallite size selected from a desired range from about 4 nm to about 30 nm; optionally, heat-treating the shaped boehmite material to a temperature not exceeding 350° C. so as to retain a substantial portion of the at least one crystalline boehmite; contacting the shaped boehmite material containing the at least one crystalline boehmite with at least one structural stabilizer or a compound thereof; calcining the shaped boehmite material in the presence of the at least one structural stabilizer or compound thereof under suitable conditions to effect the conversion of the at least one crystalline boehmite to a stabilized aluminum oxide structure and to generate a stabilized catalyst support; and applying a catalytic metal or a compound thereof to said stabilized catalyst support to form the catalyst precursor, wherein the catalytic metal comprises a metal from Groups 8, 9 and/or 10 of the Periodic Table. In some instances, the contacting step may comprise forming a mixture of a compound of at least one structural stabilizer and a boehmite material powder in a solvent, wherein the compound of at least one structural stabilizer is dissolved in said solvent. Particularly, the contacting step may comprise impregnation of the at least one structural stabilizer or compound thereof onto the shaped boehmite material. In preferred embodiments, calcining comprises calcining the contacted shaped boehmite material at a temperature between about 450° C. and about 900° C. to effect the conversion of the two or more crystalline boehmites to a stabilized aluminum oxide structure, preferably between about 500° C. and about 850° C., more preferably between about 600° C. and about 850° C., still more preferably between about 600° C. and about 750° C. In alternate embodiments, calcining comprises calcining the contacted shaped boehmite material at a temperature between about 900° C. and about 1600° C. or between about 1000° C. and about 1500° C. or between about 1100° C. and about 1400° C.

Other embodiments of the present invention relate to a method for making a stabilized catalyst precursor with an enhanced hydrothermal stability, comprising preparing a stabilized catalyst support by a method comprising contacting a crystalline hydrous alumina precursor with at least one structural stabilizer or a compound thereof, wherein the crystalline hydrous alumina precursor includes two or more crystalline boehmites or bayerites having different average crystallite sizes differing by at least 1 nm; and subjecting the crystalline hydrous alumina precursor to at least one heat treatment employing a temperature of about 450° C. or higher, preferably about 500° C. or higher, either before or after the contacting step; and applying a catalytic metal or a compound thereof to said stabilized catalyst support to form a catalyst precursor, wherein the catalytic metal comprises a metal from Groups 8, 9 and/or 10 of the Periodic Table. In preferred embodiments, the at least one heat treatment employing a temperature of about 450° C. or higher comprises calcining. The heat treatment step more preferably comprises calcining the contacted crystalline hydrous alumina precursor at a temperature between about 450° C. and about 900° C. to effect the conversion of the two or more crystalline boehmites to a stabilized aluminum oxide structure, preferably between about 500° C. and about 850° C., more preferably between about 600° C. and about 850° C., still more preferably between about 600° C. and about 750° C. In alternate embodiments, the heat treatment step comprises calcining the contacted crystalline hydrous alumina precursor at a temperature between about 900° C. and about 1600° C. or between about 1000° C. and about 1500° C. or between about 1100° C. and about 1400° C. The method may further include a shaping step before the contacting or preferably after the contacting step.

In another embodiment, the method for making a stabilized catalyst precursor may further include contacting the crystalline hydrous alumina precursor with a pore-regulating agent before the shaping step. The contact with the pore-regulating agent may be simultaneous to that with the structural stabilizer or compound thereof. Alternatively, the contact with the pore-regulating agent may be before that with the structural stabilizer or compound thereof. In such case, there may be a "low temperature" treatment step at a temperature of 350° C. or less between the two contacting steps.

In preferred embodiments, the crystalline hydrous alumina precursor comprises at least one crystalline boehmite having an average crystallite size in a range from about 4 nm to about 30 nm, preferably from about 6 nm to about 30 nm, more preferably in a range from about 8 nm to about 25 nm, still more preferably in a range from about 10 nm to about 25 nm, most preferably from about 10 nm to about 25 nm. In alternate embodiments, the at least one crystalline boehmite comprises an average crystallite size in a range from about 15 nm to about 25 nm; or in a range from about 4 nm to about 20 nm. In some embodiments, the boehmite material comprises two or more boehmites differing in average crystallite size by at least about 1 nm, preferably at least about 3 nm, more preferably at least about 5 nm. In some embodiments, the crystalline hydrous alumina precursor comprises a first crystalline boehmite having a first average crystallite size between about 4 nm and about 30 nm and a second crystalline boehmite having a second average crystallite size between about 20 nm and about 40 nm.

According to some embodiments, the stabilized support includes a BET surface area greater than about 50 $m^2/g$; preferably between about 50 $m^2/g$ support and about 250 $m^2/g$ support. According to alternate embodiments, the stabilized support includes a BET surface area less than about 50 $m^2/g$. According to some embodiments, the stabilized support includes an average pore size of at least about 6 nm. According to other embodiments, the stabilized support includes an average pore size of 20 nm or less.

According to some embodiments, the structural stabilizer comprises at least one element selected from the group consisting of cobalt, magnesium, manganese, zirconium, boron, aluminum, barium, silicon, lanthanum, zinc, oxides thereof, and any combination of two or more thereof. According to preferred embodiments, the structural stabilizer comprises at least one element selected from the group consisting of cobalt, magnesium, manganese, zirconium, aluminum, silicon, oxides thereof, and any combination of two or more thereof.

A catalyst may be prepared by a method comprising applying a catalytic metal or a precursor thereof to said stabilized support to provide a catalyst precursor, and then calcining said catalyst precursor. The application step preferably comprises impregnating a solution comprising a precursor of the catalytic metal onto or into the stabilized support. The precursor of the catalytic metal is preferably a soluble decomposable salt. The catalytic metal is preferably selected from among rhenium and metals from Groups 8, 9, and 10 of the Periodic Table (new IUPAC notation). When the catalyst is used for the hydrocarbon synthesis from synthesis gas, the catalytic metal is preferably selected from the group consisting of cobalt, ruthenium, nickel, iron, and combinations thereof; more preferably cobalt, iron, ruthenium, or any combinations thereof; most preferably cobalt; and calcining the catalyst precursor may be done at a temperature of at least about 200° C. but not more than about 450° C. Alternatively, when the catalyst is used for the production of synthesis gas from one or more hydrocarbon gases, the catalytic metal in the syngas catalyst is selected from the group consisting of rhenium, rhodium, iridium, platinum, palladium, ruthenium, nickel, and combinations thereof; and calcining the catalyst precursor is typically done at a temperature between about 300° C. and about 1200° C., preferably between about 500° C. and about 1100° C.

One advantage of the present catalyst is improved stability in the presence of water vapor. This improved hydrothermal stability conveys a better conservation of surface area, pore volume, and/or pore size of the catalyst when the catalyst is exposed to high water vapor partial pressure at high temperature (e.g., more than 180° C.).

According to another embodiment of the present invention, a process for producing hydrocarbons includes reacting a feed gas comprising carbon monoxide and hydrogen under conversion promoting conditions in the presence of a supported catalyst comprising stabilized support so as to produce a hydrocarbon product, wherein the catalyst is prepared by a method comprising: preparing a stabilized catalyst support, by a method comprising the following steps: preparing a stabilized catalyst support by a method comprising providing a crystalline hydrous alumina precursor; contacting the crystalline hydrous alumina precursor with at least one structural stabilizer or a compound thereof to generate a contacted alumina precursor; shaping either the crystalline hydrous alumina precursor before or after the contacting step to form particles of a desired average particle size; and subjecting the contacted alumina precursor in the presence of the at least one structural stabilizer or compound thereof to at least one heat treatment employing a temperature of about 450° C. or higher, in such a manner that said prepared stabilized catalyst support has an enhanced hydrothermal stability; applying a catalytic metal or a compound thereof to said stabilized catalyst support to form a catalyst precursor, wherein the catalytic metal is selected from the group consisting of cobalt, ruthenium, nickel, iron, and combinations thereof; and calcining at a temperature of at least about 200° C. and optionally not more than about 450° C. The crystalline hydrous alumina precursor preferably comprises at least one crystalline boehmite or at least one crystalline bayerite. The at least one crystalline boehmite preferably has an average crystallite size selected from an optimum range between about 4 nm and about 30 nm.

An advantage of the present catalyst is improved stability under Fischer-Tropsch reaction conditions. This improved stability can be determined by one or any combination of measurements such as steam resistance, selectivity, conversion, overall productivity, lifetime, and product yield.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DEFINITIONS AND NOMENCLATURES

Figure 1A:
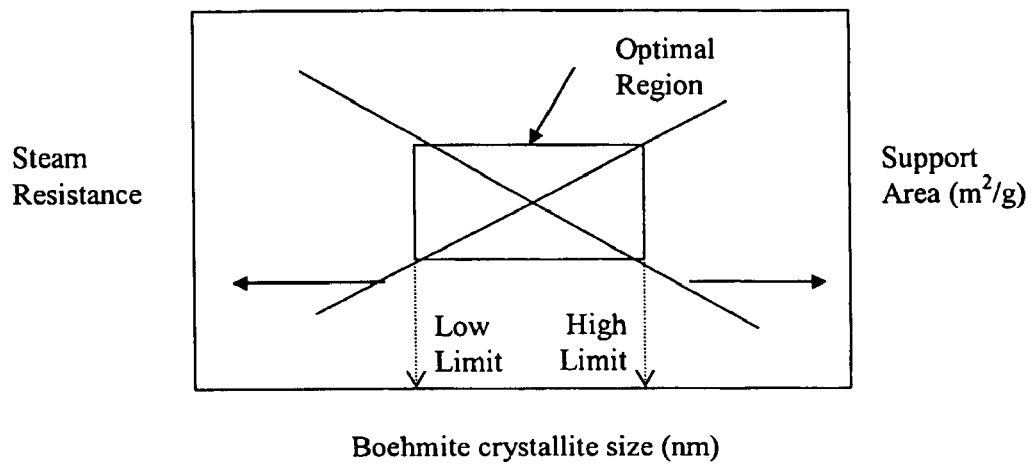
FIG. 1a illustrates the chemical/mechanical strength (e.g., resulting from steam resistance tests) and the average surface area of a resulting aluminum oxide structure versus the average crystallite size of a single boehmite material.

For purposes of the present disclosure, certain terms are intended to have the following meanings.

"Catalytic material" refers to any metal that is present on a catalyst that is active for catalyzing a particular reaction. The catalytic material may include one or more catalytic metals. Promoters are also part of the catalytic material.

A "promoter" is one or more substances, such as a metal or a metal oxide or metal ion that enhances the activity of a catalytic metal in a particular process, such as employing synthesis of syngas or the Fischer-Tropsch synthesis (e.g., increase conversion of the reactant and/or selectivity for the desired product). In some instances, a particular promoter may additionally provide another function, such as aiding in dispersion of active metal or aiding in reduction of the active metal.

A "structural stabilizer" is one or more compounds, such as a metalloid, a metal, oxides thereof, and ions thereof, that modifies at least one physical property of the support material onto which it is deposited, e.g., by impregnation, to render the support material more resistant to hydrothermal degradation in high temperature water partial pressure. It should be understood that stabilizers of alumina suitable for conferring different stabilities such as thermal stability, mechanical stability, improved crush strength, may not necessarily be effective as hydrothermal stabilizers. Without being limited by theory, the mode of destabilization of alumina by hydrothermal action may be caused by the rehydration of the aluminum oxide matrix to a hydrated form, such as boehmite or pseudo-boehmite or bayerite or gibbsite. If for example, an added element to the alumina matrix provides an improved crush strength by conferring a greater rigidity to the crystalline structure, it may not necessarily protect in a suitable manner the alumina against a chemical attack by water. Hence, an effective "structural stabilizer" in the present invention would prevent or minimize changes in the porosity of the stabilized support (e.g., change in average pore size or surface area) when the stabilized support is exposed to high water partial pressure.

With respect to a catalytic reaction such as partial oxidation of light hydrocarbons such as methane or natural gas to produce synthesis gas or conversion of synthesis gas to hydrocarbons, references to "catalyst stability" refer to maintenance of at least one of the following criteria: level of conversion of the reactants, productivity, selectivity for the desired products, physical and chemical stability of the catalyst, lifetime of the catalyst on stream, and resistance of the catalyst to deactivation.

A precursor or a compound or a precursor compound of an element (e.g., metal) is a chemical entity, such as, for example, a water-soluble metal salt, in which each molecule contains one or more atoms of said element (e.g., a catalytic metal, a promoter, or a structural stabilizer) in which the element may be in a zero oxidation state or may have an oxidation state. This applies to any element selected from the group consisting of a catalytic metal, a promoter, and a structural stabilizer.

DETAILED DESCRIPTION OF THE PREFERRED EMBODIMENTS

The present invention relates to a stabilized catalyst support comprising an aluminum oxide matrix, its methods of preparation with at least one structural stabilizer, the catalysts supported on said stabilized support, the method of making such catalysts and the methods of use, particularly in the field of hydrocarbon synthesis from mixtures of hydrogen and carbon monoxide, which is often called the Fischer-Tropsch synthesis. Using the methods of preparation described herein, Applicants can manipulate both the hydrothermal stability and physical properties of an alumina-based catalyst support.

Catalyst Support

According to a preferred embodiment of the present invention, an effective catalyst includes a stabilized support that includes a structural stabilizer. The structural stabilizer may be any material that when added to the support or a support precursor is capable of increasing the robustness of the catalyst under reaction conditions. The robustness may be exhibited, for example, as mechanical strength, attrition resistance, hydrothermal stability, and the like.

The stabilized support may have between about 0.5 weight percent and about 20 weight percent (wt %) of the structural stabilizer in the total support weight, preferably between about 1 wt % and about 10 wt % of the structural stabilizer in the total support weight, and more preferably between about 1 wt % and about 8 wt % of the structural stabilizer in the total support weight. In some embodiments, the stabilized support comprises between about 0.5 weight percent and about 5 weight percent (wt %) structural stabilizer based on the total support weight.

The stabilized support is preferably porous. The stabilized support may have an average pore size larger than about 4 nm, preferably between about 4 nm and about 50 nm, more preferably between about 4 nm and about 20 nm, still more preferably between about 9 nm and about 20 nm. In alternate embodiments, the average pore size is larger than about 6 nm, preferably between about 6 nm and about 50 nm, more preferably between about 6 nm and about 20 nm. In some embodiments, the stabilized support comprises a bimodal distribution of pore sizes with the two modes differing by at least about 1 nm, preferably by at least about 3 nm. One mode is preferably between about 4 nm and about 20 nm, more preferably between about 6 nm and about 20 nm, while the other mode is preferably between about 15 nm and about 50 nm, more preferably between about 20 nm and about 40 nm.

In preferred embodiments, the average surface area of the stabilized support, including the surface of the pores, is larger than about 30 square meters per gram of support ($m^2/g$ support), preferably larger than about 5 $m^2/g$ support, more preferably between about 50 $m^2/g$ support and about 250 $m^2/g$ support, still more preferably between about 70 $m^2/g$ support and about 200 $m^2/g$ support. In some embodiments, the average surface area of the stabilized support is between about 60 $m^2/g$ support and about 240 $m^2/g$ support.

In alternate embodiments, the average surface area of the stabilized support, including the surface of the pores, is less than about 50 square meters per gram of support ($m^2/g$ support), preferably between about 0.5 $m^2/g$ support and about 50 $m^2/g$ support, more preferably between about 1 $m^2/g$ support and about 30 $m^2/g$ support.

In some embodiments, a support stabilized with cobalt (or a cobalt-containing compound, such as cobalt oxide and/or cobalt aluminate), or stabilized with magnesium (or a magnesium-containing compound such as magnesium oxide and/or spinel) or stabilized with aluminum (or an aluminum-containing compound) or stabilized with cobalt and boron (or compounds thereof such as cobalt oxide, cobalt aluminate, boria, boron aluminate, or combinations thereof) comprises an average pore size between about 6 nm and about 20 nm; a BET surface area between about 75 $m^2/g$ support and about 200 $m^2/g$ support; and a pore volume between about 0.25 cc/g support and about 0.55 cc/g support.

In some embodiments, a support stabilized with silicon or a silicon-containing compound comprises an average pore size between about 10 nm and about 20 nm; a BET surface area between about 90 m²/g support and about 180 m²/g support; and a pore volume between about 0.4 cc/g support and about 0.55 cc/g support, preferably between about 0.4 cc/g support and about 0.5 cc/g support.

When the stabilized support is in the form of particles, the particles have a size between about 10 microns and about 250 microns, preferably between about 10 microns and about 200 microns, more preferably between about 20 microns and about 200 microns, most preferably between about 20 microns and about 150 microns, when the catalyst is intended for use in a slurry bed reactor or fluidized bed reactor. The average size of the stabilized support particles may be between about 30 microns and about 150 microns; preferably between about 40 microns and about 120 microns; more preferably between about 50 microns and about 100 microns; most preferably between about 60 microns and about 90 microns. In alternative embodiments, the average size of the stabilized support particles is greater than about 30 microns. Alternatively, when the catalyst is intended for use in a fixed or packed bed reactor, particles of the stabilized support may have an average particle size greater than about 0.5 mm, preferably greater than about 1 mm. In other embodiments, when the catalyst is intended for use in a fixed or packed bed reactor, particles of the stabilized support can have a maximum size of about 10 mm or less, preferably about 6 mm or less, more preferably about 3 mm or less. Each particle of the stabilized support may include a plurality of crystallites. The crystallites in the stabilized support preferably have an average crystallite size between about 10 nm and about 40 nm.

In some embodiments, the stabilized catalyst support prepared according to the present invention preferably comprises a transition alumina. The transition alumina matrix may include an alumina phase selected from the group consisting of gamma-alumina; eta-alumina; delta alumina; theta-alumina, and any combinations of two or more thereof. In preferred embodiments, the stabilized catalyst support preferably comprises a gamma alumina XRD pattern, but is different from a conventional gamma alumina in a way that the primary particles of the stabilized alumina support inherit the unique morphology and crystallite size of the boehmite material from which it is derived. Additionally, the stabilized catalyst support preferably contains a gamma alumina phase or a gamma-like alumina phase, but does not contain another transitional alumina phase selected from the group consisting of delta alumina and theta alumina. Alternately or additionally, the stabilized catalyst support prepared according to the present invention may comprise a transitional alumina phase other than gamma-alumina, such as delta-alumina and/or theta-alumina. In some embodiments, the stabilized catalyst support may comprise a theta-alumina matrix which includes at least a portion of the structural stabilizer or oxide thereof. In some embodiments, the stabilized aluminum oxide structure consists of a transition alumina matrix (e.g., gamma-alumina or a gamma-alumina like matrix; theta-alumina or a theta-alumina like matrix; and the like) that includes the structural stabilizer within the aluminum oxide structure, e.g, silicon-substituted gamma-alumina. Alternatively, the stabilized aluminum oxide structure may consist of a dispersed phase of an oxide form of the structural stabilizer or an aluminate form of the structural stabilizer or both (e.g., silica, magnesia, zirconia, zirconia, lanthana, cobalt aluminate, magnesium aluminate, lanthanum aluminate, and the like) in a transition alumina matrix.

In some embodiments, the stabilized catalyst support prepared according to the present invention may comprise an alpha alumina phase or an alpha-like alumina phase. In an embodiment, such a stabilized catalyst support may comprise an alpha alumina phase or an alpha-like alumina phase when the method of preparation employs a heat treatment at a temperature greater than about 900° C., preferably greater than about 1000° C., more preferably greater than about 1100° C., but not exceeding about 1600° C. Alternatively, the stabilized aluminum oxide structure may consist of a dispersed phase of an oxide form of the structural stabilizer or an aluminate form of the structural stabilizer or both (e.g., silica, magnesia, zirconia, cobalt aluminate, magnesium aluminate, zirconia, and the like) in an alpha-alumina matrix.

In alternate embodiments, the stabilized catalyst support prepared according to the present invention preferably comprises particles, wherein each particle contains an alumina phase and an aluminate, said aluminate comprising at least a portion of the structural stabilizer. An "aluminate" herein refers to a compound of alumina and a structural stabilizer oxide, e.g., a solid solution or a homogeneous solid of the structural stabilizer or an oxide thereof and aluminum oxide. Non-limiting examples of aluminates are cobalt aluminate, lanthanum aluminate, magnesium aluminate, aluminate silicate, and the like. The aluminate may be in the form of a spinel, such as $CoAl_2O_4$ spinel or $MgAl_2O_4$ spinel.

The stabilized support is preferably non-dispersible in water or an aqueous solution, wherein said aqueous solution can comprise an active metal compound. In some embodiments, the stabilized support may also be non-dispersible in acidic solution.

Accordingly, the stabilized support of the present invention may be shaped or formed in the form of powders, particles, particulates, pellets, granules, beads, pills, cylinders, trilobes, extrudates, spheres or other rounded shapes, or other manufactured configurations.

In some compositions, the stabilized support comprises an aluminum oxide and a structural stabilizer comprising a metal or a metalloid, the metal or metalloid of which is in a different row of the Periodic Table than aluminum. In other compositions, the stabilized support comprises an aluminum oxide and a structural stabilizer comprising a metal or a metalloid, the metal or metalloid of which is in the same row of the Periodic Table than aluminum, such as magnesium or silicon.

The stabilized support may be made by a plurality of methods, which include treating a material comprising one crystalline hydrous alumina precursor or a plurality thereof in contact with a structural stabilizer or a precursor compound thereof.

Crystalline Hydrous Alumina Precursor

The crystalline hydrous alumina precursor may comprise at least one crystalline aluminum hydroxide. Crystalline aluminum hydroxides are precursors of metastable transition aluminas. Examples of crystalline aluminum hydroxides include gibbsite, bayerite, nordstrandite, diaspore, boehmite, and tohdite. The crystalline forms of aluminum trihydroxide are gibbsite ($Al(OH)_3$), bayerite (a polymorph of gibbsite), and nordstrandidte, whereas the crystalline forms of aluminum oxide hydroxide are boehmite (AlOOH) and diaspore. In preferred embodiments, the crystalline hydrous alumina precursor comprises at least one crystalline boehmite; or at least one crystalline bayerite; or a plurality thereof; or combinations thereof.

The crystalline hydrous alumina precursor preferably comprises a solid form and does not consist of a dissolved form, such as an aluminum salt or an aluminate salt. However, it is envisioned that the crystalline hydrous alumina precursor may comprise both solid and dissolved alumina precursor compounds, such as in a non-limiting example, the crystalline hydrous alumina precursor may comprise a mixture of solid particles of a crystalline aluminum hydroxide and dissolved alumina precursor compound (e.g., aluminate salt or dissolved aluminum salt or both) in a solvent.

The crystalline hydrous alumina precursor preferably comprises an average crystallite size selected from an optimum range. The higher the average crystallite size of crystalline hydrous alumina precursor, the better the hydrothermal resistance of the support, but the lower the surface area of the support. There is a trade-off between desirability of hydrothermal resistance and requirement for a specific surface area needed for supporting catalytic metal(s) of the resulting stabilized supported catalyst. This trade-off may dictate an optimum range of average crystallite sizes from which an average crystallite size is selected so as to achieve a hydrothermal resistance and a surface area suitable for the end-use catalyst. The optimum range of average crystallite size may comprise a low limit determined by a desired minimum level of hydrothermal resistance of the resulting support (e.g., less than 10% change in the average pore size in a steaming test) and an upper limit determined by a desired minimum surface area or maximum average pore size (e.g., an average pore size of not more than about 20 nm; or a BET surface area of the support of at least about 50 $m^2/g$). The low limit optimum of the optimum range of average crystallite size may be determined by both a desired minimum level of hydrothermal resistance of the resulting support and a minimum average pore size (e.g., an average pore size greater than about 6 nm; or a BET surface area of the support of less than about 200 $m^2/g$).

In some embodiments, the crystalline hydrous alumina precursor may comprise one crystalline bayerite or a plurality of crystalline bayerites. The crystalline bayerite may have an average crystallite size ranging from about 30 nm to about 50 nm; or alternatively from about 35 nm to about 45 nm. When the crystalline hydrous alumina precursor comprises more than one crystalline bayerite, the plurality of crystalline bayerites preferably have an average crystallite size that differ by at least about 1 nanometer (nm), preferably by at least about 3 nanometer (nm); more preferably by at least about 5 nanometer (nm).

The crystalline hydrous alumina precursor can be obtained as commercial bayerite. Commercial bayerite may be available as a powder primarily having micron-sizes, e.g., with particle sizes ranging between about 0.1 micron and about 50 microns. By way of example and not limitation, suitable commercial boehmites include bayerite from UOP LLC (Des Plaines, Ill.) under the trademark Versal™. A commercial bayerite may have an average particle size of less than about 40 microns, such as between about 20 microns and about 40 microns or between about 15 microns and about 30 microns. Without being limited, for powders obtained with an average particle size outside a desired range, the average particle size may be adjusted by spray-drying (e.g., shaping) a dispersion or suspension of the bayerite powder in a solvent (such as a bayerite sol or a bayerite slurry) so as to obtain a bayerite material with a desired average particle size and/or particle size distribution, for example as disclosed herein. It is to be understood that the desired average particle size and/or particle size distribution is generally dictated by the end use of the catalyst made from the stabilized support.

The crystalline hydrous alumina precursor may comprise one crystalline boehmite or a plurality of crystalline boehmites. The boehmite in the crystalline hydrous alumina precursor is preferably derived as synthetic boehmite. Synthetic boehmite includes any boehmite not derived from ore. When the boehmite is synthetic boehmite, the synthetic boehmite can be made by any suitable process. For example, synthetic boehmite can be made by a gellation method such as a modified Ziegler alcohol process that produces high purity gels derived from aluminum metal or a process comprising dissolving and precipitating aluminum trihydrate that produces high porosity gels albeit with more impurities. For instance, maturation of an $Al(OH)_3$ gel at pH>12 and 80° C. produces synthetic boehmite. The maturation time of the $Al(OH)_3$ gel affects the average crystallite size of the resulting synthetic boehmite, as typically the longer the maturation, the larger the average crystallite size of the resulting synthetic boehmite. High purity boehmite gels may contain very low levels (i.e., less than 0.01 wt %) of impurities typically present in alumina, such as iron, silicon, and sodium. High purity boehmite gels have a structure that consists of small boehmite crystals, often referred to as pseudoboehmite, which is in the form of aluminum monohydrate, $AlO(OH)—H_2O$.

In alternative embodiments, the boehmite in the crystalline hydrous alumina precursor can be derived as natural boehmite. In one alternative embodiment, any conventional natural boehmite may be suitable as the boehmite. Minor variations, such as in impurities, may exist between various commercial sources of natural boehmite. Exemplary impurities include, for example, elements or compounds derived from other materials contained in natural sources of boehmite. Thus, natural boehmite may include minor amounts of any one or combination of iron, titanium, and silicon.

According to some embodiments, the crystalline hydrous alumina precursor can be a mixture of a synthetic boehmite and a natural boehmite. According to other embodiments, the crystalline hydrous alumina precursor can be a mixture of two or more synthetic boehmites differing in average crystalline sizes by at least about 1 nm.

The crystalline hydrous alumina precursor may comprise one crystalline boehmite or a plurality of crystalline boehmites. When the crystalline hydrous alumina precursor comprises more than one crystalline boehmite, the plurality of crystalline boehmites preferably have an average crystallite size that differ by at least about 1 nanometer (nm).

The average crystallite size of crystalline boehmite or bayerite may be determined by X-ray diffraction (XRD) patterns of the boehmite material. XRD sizing of crystallites may be performed using the Scherrer equation (see for example H. P. Klug and L. E. Alexander, X-Ray Diffraction Procedures for Polycrystalline and Amorphous Materials, John Wiley, New York, 2nd Edition, 1974).

In an embodiment, the crystalline hydrous alumina precursor may comprise a pseudoboehmite, a boehmite, or combinations thereof. A pseudoboehmite refers to a small crystal sized boehmite that may contain intercalated water. In an embodiment, pseudoboehmite may occur as nano-crystalline plates or needles with each plate or needle being a few nanometers in size (e.g., with an average crystallite size not larger than 5 nm), and boehmite comprises rod-like and/or platelet-like crystallites with a larger size (e.g., with an average crystallite size of 5 nm or more).

According to some embodiments, the crystalline hydrous alumina precursor can be spray-dried boehmite. Alternatively, the crystalline hydrous alumina precursor can be extruded boehmite.

The crystalline hydrous alumina precursor can be obtained as commercial boehmite. Commercial boehmite may be available as a powder primarily having micron-sizes, e.g., with particle sizes ranging between about 1 and about 50 microns. A commercial boehmite may have an average particle size of less than about 40 microns, such as between about 20 microns and about 40 microns or between about 15 microns and about 30 microns. Without being limited, for powders obtained with an average particle size outside a desired range, the average particle size may be adjusted by spray-drying (shaping) a dispersion or suspension of the boehmite powder in a solvent (such as a boehmite sol or a boehmite slurry) so as to obtain a boehmite material with a desired average particle size and/or particle size distribution, for example as disclosed herein. It is to be understood that the desired average particle size and/or particle size distribution may be dictated by the end use of the catalyst made from the stabilized support. In some embodiments, the boehmite sol or a boehmite slurry may further contain an acid (such as nitric acid, acetic acid, and the like) so as to form a colloidal suspension of the boehmite material before re-shaping. In alternate embodiments, the boehmite sol or slurry does not contain an acid before re-shaping.

By way of example and not limitation, suitable commercial boehmites include boehmites from Sasol North America Inc. (Houston, Tex.) under the registered trademarks Dispal® owned by Sasol North America Inc. (Houston, Tex.) and Disperal® owned by Sasol Germany GMBH (Hamburg, Germany); boehmites from Almatis Adsorbents & Catalysts, Inc. (Leetsdale, Pa.) under the registered trademark Hi Q®; and high-purity boehmite powder from WesBond Corporation (Wilmington, Del.) under the tradename Wesolok.

The crystalline hydrous alumina precursor may be available in a variety of rheological and physical forms. For instance, the crystalline hydrous alumina precursor may be in the form of a powder, a gel, a sol, a slurry, or a paste. A boehmite "sol" refers to a two-phase colloidal system where the continuous phase is liquid and the dispersed phase (i.e., boehmite) is solid. A boehmite "sol" may comprise nano-sized particles of boehmite, such as varying between about 10 and about 1000 nm. If the solid particles aggregate or polymerize to form a giant aggregate that extends through the sol, the boehmite material is said to be a "gel." A boehmite "sol" may be transformed into a "gel" and sometimes vice versa. One property of the boehmite powders is that a particle size reduction can be obtained by chemical attack such as in the presence of a dilute monovalent acid. For example, to form a "sol", boehmite particles in a powder break down due to chemical attack by the acid into smaller fragments, which additionally are provided with a positive charge. The positively-charged fragments in the "sol" may not settle in the continuous phase due to electrostatic repulsion. A boehmite "slurry" refers to a boehmite powder dispersed in a solvent. In an embodiment, a boehmite "slurry" comprises a boehmite powder with larger particle sizes than that of a colloidal state of boehmite in a "sol." A boehmite "slurry" typically comprises micron-sized particles of boehmite. A boehmite "sol" or "slurry" may comprise less than about 50% by weight of solids, preferably between about 20 wt % and about 45 wt % solids, more preferably between about 20 wt % and about 40 wt % solids. A boehmite "paste" refers to a boehmite powder mixed with a small amount of solvent. Generally, a boehmite paste may comprise more than about 80% by weight of solids, preferably between about 80 wt % and about 95 wt % solids, more preferably between about 85 wt % and about 95 wt % solids.

The crystalline boehmite in the crystalline hydrous alumina precursor may be dispersible or substantially non-dispersible in water or an aqueous solution.

The crystalline hydrous alumina precursor may comprise a crystalline boehmite, which is non-dispersible in aqueous solution. A non-dispersible crystalline boehmite may be obtained from a dispersible crystalline boehmite by preheating the dispersible crystalline boehmite at a temperature of from about 250° C. to about 350° C. for a period of from about 20 minutes to about 24 hours, preferably in an oxidizing atmosphere. The temperature is preferably selected to be lower than the temperature required for the formation of a gamma-alumina phase. The dispersible crystalline boehmite may be a commercial boehmite as received or as modified, e.g., by spray-drying, or alternatively heat-treated without affecting dispersibility.

In some embodiments, the crystalline hydrous alumina precursor comprises a crystalline boehmite that is dispersible in acid. The acid-dispersible boehmite can be a commercial acid-dispersible boehmite. Without intending to be limited by theory, the acid dispersibility of the crystalline boehmite confers to the stabilized support a greater stability towards the presence of water, especially of steam.

The crystalline hydrous alumina precursor preferably is formed into multi-particle macrostructures before contacting with the structural stabilizer or compound thereof. Without limitation, examples of suitable macrostructures include powder, spheres, pellets, and particles. Such forming may be carried out by any suitable powder forming technique. Without limitation, examples of suitable powder forming techniques include spray-drying, extrusion, tableting, and pelletization. Such macrostructures preferably are micron-sized, e.g., have a minimum dimension in the range of 1 micron, preferably greater than 5 microns, more preferably greater than 10 microns. Such macrostructures preferably have a maximum dimension less than 250 microns, more preferably less than 200 microns. In some embodiments, multi-particle macrostructures have a maximum dimension less than 150 microns.

In preferred embodiments, the crystalline hydrous alumina precursor is essentially free of any aluminum alkoxide. In some embodiments, the crystalline hydrous alumina precursor comprises a crystalline boehmite and does not contain any aluminum alkoxide.

In some embodiments, the crystalline hydrous alumina precursor comprises a single crystalline boehmite or at least one crystalline boehmite with an average crystallite size of from about 4 nm to about 30 nm, preferably from about 6 nm to about 30 nm, more preferably from about 8 nm to about 25 nm, and more preferably from about 4 nm to about 20 nm, still more preferably from about 10 nm to about 25 nm, and most preferably from about 10 nm to about 20 nm. In alternate embodiments, the crystalline boehmite preferably has an average crystallite size in the range of from about 4 nm to about 25 nm, alternatively from about 4 nm to about 20 nm, and alternatively from about 6 nm to about 20 nm, and further alternatively from about 15 nm to about 25 nm. In other alternate embodiments, the boehmite material is a crystalline boehmite with a desired average crystallite size.

The selection of the average crystallite size for the crystalline hydrous alumina precursor is preferably dictated by a desired resistance to hydrothermal degradation of the resulting stabilized support and a desired porosity (e.g., surface area, average pore size, and the like) to provide a suitable surface to deposit catalytic metal(s). For example, there exists an optimum range for the average crystallite size of a crystalline boehmite comprising a low limit and an upper limit, as shown in FIG. 1a. Indeed, it has been surprisingly found that the higher the average crystallite size of a crystalline boehmite, the better the hydrothermal resistance to the alumina matrix derived therefrom. It is expected that the average crystalline size of other crystalline hydrous alumina precursors, such as bayerite, gibbsite, and diaspore, would also have an optimum range to provide the desired hydrothermally stable support with a suitable porosity. The low limit of the average crystallite size optimum range may be dictated by a minimum resistance to hydrothermal degradation (e.g., steam resistance); alternatively or additionally, by a maximum surface area and/or minimum average pore size that may be achieved in the stabilized support. The upper limit of the average crystallite size optimum range may be dictated by a minimum surface area and/or a maximum average pore size.

In some embodiments, the crystalline hydrous alumina precursor comprises more than about 75 percent by weight of one crystalline boehmite. In alternate embodiments, the crystalline hydrous alumina precursor comprises more than about 80 percent by weight of one crystalline boehmite.

In other embodiments, the crystalline hydrous alumina precursor comprises two or more crystalline boehmites differing in average crystallite size. When a mixture of boehmites with various average crystallite sizes is used, the mixture of boehmites may comprise a first boehmite having a first average crystallite size and a second boehmite having a second average crystallite size, wherein the first average crystallite size is at least about 1 nm smaller, preferably at least about 3 nm smaller, more preferably at least about 5 nm smaller, than the second average crystallite size. The proportion of the at least two boehmites with different average crystallite sizes depends on the desired properties of stabilized aluminum oxide porous structure. Several mixed-boehmite embodiments are envisioned.

In one embodiment, the crystalline hydrous alumina precursor used to make a stabilized alumina support may comprise at least two boehmites with different average crystallite sizes, with the larger average crystallite size being not more than about 40 nm, and the smaller average crystallite size being more than about 4 nm.

In an alternate embodiment, the crystalline hydrous alumina precursor used to make a stabilized support comprises at least two boehmites with different average crystallite sizes differing by at least about 1 nm.

One embodiment comprises forming a stabilized support from a mixture of at least two boehmite materials with different average crystallite sizes, wherein at least one boehmite has an average crystallite size in the range of from about 4 to about 30 nm, and further wherein the difference between the average crystallite sizes is at least about 1 nm, preferably at least about 3 nm, more preferably more than about 5 nm.

Another embodiment comprises forming a stabilized support using at least two boehmites with different average crystallite sizes, wherein at least one of the boehmites has an average crystallite size preferably in the range of from about 8 nm to about 30 nm, more preferably in the range of from about 8 nm to about 20 nm.

In yet another embodiment, the crystalline hydrous alumina precursor used to make a stabilized support may comprise a boehmite and a pseudoboehmite with different average crystallite sizes, wherein the boehmite average crystallite size is about 6 nm or more, and the pseudoboehmite average crystallite size is about 5 nm or less.

In preferred embodiments when the crystalline hydrous alumina precursor used to make a stabilized support comprises two boehmites of different average crystallite sizes, at least one of the boehmites has an average crystallite size in the range from about 4 nm to about 20 nm or from about 4 nm to about 30 nm, preferably from about 6 nm to about 30 nm, more preferably in the range of from about 8 nm to about 30 nm, and more preferably from about 8 nm to about 25 nm, still more preferably in the range of from about 10 nm to about 25 nm, and most preferably from about 15 nm to about 25 nm, while another boehmite has an average crystallite size preferably in the range of from about 20 nm to about 40 nm, more preferably in the range of from about 20 nm to about 35 nm, most preferably in the range of from about 25 nm to about 35 nm. In an embodiment, such preferred embodiments include the two boehmites differing by at least about 1 nm.

In some embodiments, the crystalline hydrous alumina precursor comprises three or four boehmites with different average crystallites sizes differing from each other by at least about 1 nm, preferably by at least about 3 nm.

In a mixed-boehmite embodiment, the first average crystallite size is preferably in the range of from about 4 nm to about 15 nm, more preferably in the range of from about 8 nm to about 12 nm. The second average crystallite size is in the range of from about 10 nm to about 40 nm, preferably in the range of from about 10 nm to about 30 nm, more preferably in the range of from about 12 nm to about 20 nm. In this preferred mixed-boehmite embodiment, the weight ratio of the first boehmite material with the first average crystallite size to the second boehmite material with the second average crystallite size is preferably from about 1:99 to about 99:1, more preferably from about 99:1 to about 1:99, still more preferably from about 10:90 to about 90:10, and most preferably from about 25:75 to about 75:25. A non-limiting example, for illustration purposes only, includes mixing about equal weights of two boehmites with respective average crystallite sizes of about 10 nm and about 15 nm.

In another mixed-boehmite embodiment, the first average crystallite size is preferably in the range of from about 4 nm to about 10 nm, more preferably in the range of from about 4 nm to about 8 nm. The second average crystallite size may be in the range of from about 10 nm to about 40 nm, preferably in the range of from about 8 nm to about 30 nm, more preferably in the range of from about 10 nm to about 15 nm. It is preferred in this mixed-boehmite embodiment that the first boehmite with the first average crystallite size has a smaller weight fraction than the boehmite with the second average crystallite size. The weight ratio of the first boehmite material with the first average crystallite size to the second boehmite material with the second average crystallite size is preferably from about 1:99 to about 20:80, more preferably from about 1:99 to about 10:90, still more preferably from about 1:99 to about 5:95. A non-limiting example, for illustration purposes only, includes mixing less than about 10% by weight of a boehmite with an average crystallite size of about 4 nm and more than about 90% by weight of a boehmite with an average crystallite size of about 15 nm.

In an alternative mixed-boehmite embodiment, the first average crystallite size is preferably in the range of from about 8 nm to about 20 nm, more preferably in the range of from about 10 nm to about 20 nm. The second average crystallite size is in the range of from about 20 nm to about 40 nm, preferably in the range of from about 20 nm to about 30 nm, more preferably in the range of from about 25 nm to about 30 nm. It is preferred in this alternative mixed-boehmite embodiment that the boehmite with the second average crystallite size has a smaller weight fraction than the boehmite with the first average crystallite size. The weight ratio of the first boehmite material with the first average crystallite size to the second boehmite material with the second average crystallite size is preferably from about 99:1 to about 80:20, more preferably from about 99:1 to about 90:10, still more preferably from about 99:1 to about 95:5. A non-limiting example, for illustration purposes only, includes mixing more than about 90% by weight of a boehmite with an average crystallite size of about 15 nm and less than about 10% by weight of a boehmite with an average crystallite size of about 30 nm.

In other mixed-boehmite embodiments, the first average crystallite size is preferably in the range of from about 10 nm to about 30 nm, more preferably in the range of from about 15 nm to about 25 nm. The second average crystallite size is preferably in the range of from about 25 nm to about 40 nm, more preferably in the range of from about 25 nm to about 35 nm. It is preferred in this mixed-boehmite embodiment that the boehmite with the second average crystallite size has a smaller weight fraction than the boehmite with the first average crystallite size. The weight ratio of the first boehmite material with the first average crystallite size to the second boehmite material with the second average crystallite size is preferably from about 95:5 to about 50:50, more preferably from about 90:10 to about 55:45. A non-limiting example, for illustration purposes only, includes mixing from about 85% to about 55% by weight of a boehmite with an average crystallite size of about 25 nm (e.g., from about 55% to about 90%) and from about 15% to about 45% by weight of a boehmite with an average crystallite size of about 35 nm.

When a combination of boehmites is used in the crystalline hydrous alumina precursor, the boehmites are preferably mixed prior to application of the structural stabilizer or a compound thereof (which may include a catalytically active metal precursor).

Hereinafter, a boehmite material refers to a single boehmite and also to mixtures of two or more boehmites with different average crystallite sizes.

Hereinafter, a crystalline hydrous alumina precursor refers to a single boehmite and also to mixtures of two or more boehmites with different average crystallite sizes as well as a single bayerite, and also to mixtures of two or more bayerites with different average crystallite sizes.

Pre-Treatment of the Crystalline Hydrous Alumina Precursor

The crystalline hydrous alumina precursor can be pre-treated prior to contacting and treating the crystalline hydrous alumina precursor with the structural stabilizer or compound thereof.

In an embodiment, the pre-treatment can comprise spray-drying of a suspension of the crystalline hydrous alumina precursor, preheating of the crystalline hydrous alumina precursor, or combinations thereof. In some embodiments when the crystalline hydrous alumina precursor is pretreated by spray-drying and preheating, the spray-drying step is preferably performed before the preheating step.

Preheating: Pretreating can comprise preheating at a temperature below the temperature of phase transformation from boehmite (aluminum monohydroxide) or bayerite (aluminum trihydroxide) or other crystalline hydrous alumina precursor to an aluminum oxide structure. The preheat treatment can comprise exposing the support material comprising the crystalline hydrous alumina precursor, e.g., boehmite and/or bayerite, in an atmosphere to a temperature preferably ranging from about 250° C. to about 350° C., more preferably from about 300° C. to about 350° C., and most preferably from about 315° C. to about 335° C. The preheat temperature is selected so that substantially all the crystalline hydrous alumina precursor in the sample is retained (e.g., more than 80% of the crystalline hydrous alumina precursor is retained). The atmosphere can comprise molecular oxygen, any inert gas such as nitrogen, or any mixture thereof. Preferably, the atmosphere is oxidizing. More preferably, the atmosphere comprises air. Preheating at about 325° C. in air may retain the majority of or all of the crystalline hydrous alumina precursor in the sample. The resulting preheated support material comprising the crystalline hydrous alumina precursor is substantially non-dispersible crystalline hydrous alumina precursor, e.g., non-dispersible boehmite, where non-dispersible refers to non-dispersion in aqueous solution. Without intending to be limited by theory, preheating boehmite at a temperature of from about 250° C. to about 350° C. may produce a substantially non-dispersible boehmite, which may not be dispersible in water or an aqueous solution. The aqueous solution may comprise a catalyst material such as a compound of a catalytic metal and/or a structural stabilizer such as a compound of said structural stabilizer.

Shaping: When the crystalline hydrous alumina precursor is in the form of a powder, the average particle size range of the powder (e.g., an average particle size of 40 microns or less, or an average particle size of 30 microns or less) can also be adjusted to a desired range (e.g., an average particle size of more than 40 microns). The powder may be formed or reformed into a desired shape by a shaping process with optionally the use of suitable additives (i.e., binders and lubricants). A suitable binder may be a compound that can be combusted into a volatile vapor or decomposable during calcination. A binder may be a porous inorganic oxide material or a clay binder. One such preferred inorganic oxide is silica. Other examples of such binder materials include but are not limited to zirconia, magnesia, titania, thoria and boria. These materials can be utilized in the form of a dried inorganic oxide gel or as a gelatinous precipitate. Suitable examples of clay binder materials include but are not limited to bentonite and kieselguhr. The relative proportion of crystalline hydrous alumina precursor to binder material to be utilized is from about 50 wt. % to about 99.5 wt. %. A proportion of crystalline hydrous alumina precursor to binder from about 75 wt. % to about 99 wt. % is more preferred. The particle size distribution can be modified, for example, by suspending a boehmite or bayerite powder in a solvent, and spray-drying the suspension of boehmite or bayerite. An optional drying may follow the spray-drying of the boehmite. In preferred embodiments, the crystalline hydrous alumina precursor powder is mixed in a solvent with the structural stabilizer compound to make a slurry that is then fed to a spray-drier, wherein said slurry does not contain a binder. In alternate embodiments, the crystalline hydrous alumina precursor powder is mixed in a solvent to make a slurry that is then fed to a spray-drier, wherein said slurry does not contain a binder. The solvent is preferably water for a substantially dispersible crystalline hydrous alumina precursor or a non-aqueous solvent for a substantially non-dispersible crystalline hydrous alumina precursor. The spray-dried crystalline hydrous alumina precursor preferably has a particle size range of from about 20 microns to about 200 microns. In some embodiments, the spray-dried crystalline hydrous alumina precursor has a weight average particle size from about 30 microns to about 120 microns, preferably from about 50 microns to about 100 microns, more preferably from about 60 microns to about 90 microns. In alternate embodiments, the crystalline hydrous alumina precursor in the powder form is extruded or pelletized to form large particles of size greater than 500 microns or greater than 1 millimeter. In extrusion or pelletization, a lubricant may be added to make the shaping process smoother and faster.

Structural Stabilizer

A "structural stabilizer", as used herein and with reference to the stabilized support and catalyst made therefrom, refers to a compound that acts to minimize or prevent the loss of integrity of the catalyst structure, particularly when it is subjected to a high water partial pressure. Without being limited by theory, change in the structural integrity of the catalyst may be caused by the rehydration of the aluminum oxide matrix to a hydrated form, such as boehmite or pseudoboehmite or gibbsite.

Suitable structural stabilizers include tungsten (W), tantalum (Ta), niobium (Nb), thorium (Th), germanium (Ge), uranium (U), tin (Sn), antimony (Sb), vanadium (V), halfnium (Hf), sodium (Na), potassium (K), boron (B), aluminum (Al), magnesium (Mg), silicon (Si), calcium (Ca), titanium (Ti), chromium (Cr), manganese (Mn), iron (Fe), cobalt (Co), nickel (Ni), copper (Cu), zinc (Zn), gallium (Ga), selenium (Se), strontium (Sr), zirconium (Zr), barium (Ba), thorium (Th), and the lanthanides, including lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), yterrbium (Yb) and lutetium (Lu), oxides thereof, or combinations thereof. The structural stabilizer preferably comprises at least one element selected from the group consisting of cobalt, magnesium, manganese, zirconium, boron, aluminum, barium, silicon, lanthanum, zinc, oxides thereof, and any combination thereof. More preferably, the structural stabilizer comprises at least one element selected from the group consisting of cobalt, magnesium, manganese, zirconium, aluminum, boron, barium, silicon, lanthanum, oxides thereof, and any combination thereof. Most preferably, the structural stabilizer comprises at least one element selected from the group consisting of cobalt, magnesium, manganese, zirconium, aluminum, silicon, oxides thereof, and any combination of two or more thereof. In some embodiments, the structural stabilizer may include one or more oxides of these elements.

The structural stabilizer may be contacted with the boehmite material in the form of a compound containing said structural stabilizer. When the contacting step comprises mixing the boehmite material and the compound of the structural stabilizer in a solvent, the compound of the structural stabilizer may be soluble (e.g., dissolved in the solvent suspending the boehmite) in said solvent; alternatively, it may be insoluble in said solvent (e.g., in the form of small solid particles suspended or dispersed in the solvent). The compound of the at least one structural stabilizer may be in the form of a salt, an acid, a hydroxide, an oxide of the structural stabilizer, an organic compound of the structural stabilizer, or any combination of two of more thereof. Suitable compounds of the structural stabilizer soluble in the solvent can include, for example but not limited to, salts thereof, acids thereof, and hydroxides thereof. Without limitation, an example of suitable compounds of the structural stabilizer insoluble in the solvent includes an oxide of the structural stabilizer. In some embodiments, the compound of the structural stabilizer comprises a colloidal suspension of an oxide of the structural stabilizer. In other embodiments, the compound of the structural stabilizer comprises a colloidal suspension of an oligomer of an acid and an oxide of the structural stabilizer. The compound of the structural stabilizer may be inorganic or organic. Non-limiting examples of inorganic compounds of the structural stabilizer include nitrate salts and chloride salts. Non-limiting examples of organic compounds of the structural stabilizer include alkoxides, acetate salts, lactate salts, oxalate salts, and carboxylic acids. In some embodiments, the compound of the structural stabilizer excludes an alkoxide of the structural stabilizer.

By way of example, when the structural stabilizer comprises silicon, a colloidal suspension of silicon oxide may be used as the structural stabilizer compound. Commercial sources of colloidal silicas are available from Grace Davison (Columbia, Md.) under the Trademark Ludox®; and from WesBond Corporation (Wilmington, Del.) under the Trademarks Megasol® and Nyacol®. Other suitable compounds of silicon include ammonium silicate [e.g., of formula $(SiO_2)_x \cdot (NH_4)_2O$ with x between 2 and 6], sodium silicate $(Na_2Si_3O_7)$, calcium silicate $(CaSiO_3)$, tetraalkyl orthosilicate (e.g, tetramethyl orthosilicate $(Si(OCH_3)_4)$, tetraethyl orthosilicate $(C_8H_{20}O_4Si)$, tetrapropyl orthosilicate $((CH_3CH_2CH_2O)_4Si)$, tetraisopropyl orthosilicate $(C_{12}H_{28}O_4Si)$, tetrabutyl orthosilicate $((CH_3CH_2CH_2CH_2O)_4Si)$, tetrahexyl orthosilicate, tetraallyl orthosilicate $(C_{12}H_{20}O_4Si)$, silicon tetraboride $(SiB_4)$, silicon tetraacetate $(Si(OCOCH_3)_4)$, zirconium silicate $(ZrSiO_4)$, silicic acid $(H_2O_3Si)$, or a silica-alumina gel.

By way of example, when the structural stabilizer comprises at least one element selected from the group consisting of magnesium, zirconium, aluminum, barium, lanthanum, zinc, oxides thereof, and any combination thereof, suitable structural stabilizer compounds include but are not limited to nitrate salts, such as magnesium nitrate (e.g., $Mg(NO_3)_2 \cdot 6H_2O$), zirconium nitrate (e.g., $ZrO(NO_3)_2 \cdot xH_2O$), aluminum nitrate (e.g., $Al(NO_3)_3 \cdot 9H_2O$), barium nitrate (e.g., $Ba(NO_3)_2$), lanthanum nitrate (e.g., $La(NO_3)_3 \cdot 6H_2O$) or zinc nitrate (e.g., $Zn(NO_3)_2 \cdot 6H_2O$).

By way of another example, when the structural stabilizer comprises boron, suitable boron-containing compounds include boric acid, trimethyl borate (e.g., $B(OCH_3)_3$), triethyl borate (e.g., $(C_2H_5O)_3B$), tripropyl borate (e.g., $(CH_3CH_2CH_2O)_3B$), triisopropyl borate (e.g., $[(CH_3)_2CHO]_3B$), and tri-tert-butyl borate (e.g., $[(CH_3)_3CO]_3B$).

In some embodiments, the structural stabilizer comprises a catalytic metal. Preferred catalytic metals that can be used as a structural stabilizer include cobalt or iron, more preferably cobalt. Those skilled in the art would be able to select the most suitable catalytic-metal containing compound for use in preparing the stabilized support. By way of example, when the structural stabilizer comprises cobalt, suitable cobalt-containing precursor compounds include but are not limited to hydrated cobalt nitrate (e.g. cobalt nitrate hexadydrate), cobalt carbonyl, cobalt acetate, cobalt acetylacetonate, and cobalt oxalate.

An alternate embodiment comprises the use of at least two elements in the structural stabilizer, with one element having more acidity than the other(s). It is envisioned that adding a small amount of acidic sites, preferably well-dispersed acidic sites, within the stabilized support structure may be particularly desirable for the making of the catalyst. Without limiting the invention and as an example of such an alternate embodiment, the structural stabilizer can comprise a mixture of inorganic oxides, such as silica, alumina, titania, zirconia, magnesia, boria, ceria, thoria, and combinations thereof. Preferably, the structural stabilizer comprises a silica-alumina material with a molar ratio of silica to alumina between about 1:1 and about 500:1, more preferably between about 3:1 and about 500:1. In a preferred embodiment, the silica-alumina material comprises co-precipitated silica-alumina. In such a preferred embodiment, a suitable compound for the silica-alumina stabilizer includes a co-precipitated silica-alumina gel.

Method of Making the Stabilized Support

Without being limited by theory, the preparation history of the stabilized support may have an impact on the type of aluminum oxide structure that is ultimately generated from the boehmite material. In an embodiment, the stabilized support is made by a method that includes contacting a crystalline hydrous alumina precursor with a structural stabilizer or a compound thereof and then treating said crystalline hydrous alumina precursor in the presence of said structural stabilizer or compound thereof. In preferred embodiments, the crystalline hydrous alumina precursor comprises one or more crystalline boehmites; one or more crystalline bayerites; or combinations thereof. The treating can be applied before or after the contacting.

In an embodiment, contacting the crystalline hydrous alumina precursor with a structural stabilizer may include forming a mixture of the structural stabilizer or compound thereof with the crystalline hydrous alumina precursor. In some embodiments, the mixture includes a solvent that may maintain the solid crystalline hydrous alumina precursor in suspension or dispersed. The mixture can be in the form of a slurry or a sol. The structural stabilizer or compound thereof may also be suspended in the solvent (when insoluble in said solvent) or dissolved in said solvent (when soluble in said solvent). In preferred embodiments, contacting includes applying (e.g., impregnating) the structural stabilizer or compound thereof onto the crystalline hydrous alumina precursor. It should be understood that more than one structural stabilizer or more than one compound of a structural stabilizer can be used. In embodiments wherein the crystalline hydrous alumina precursor comprises two or more crystalline boehmites, contacting may include mixing first the two or more crystalline boehmites in a solvent and adding the structural stabilizer or compound thereof to said boehmite mixture. Alternatively, the structural stabilizer or compound thereof may be suspended in a solvent (when insoluble in said solvent) or dissolved in a solvent (when soluble in said solvent), and the two or more crystalline boehmites added to the suspension or solution of the structural stabilizer or compound thereof, either separately or mixed, in the form of a crystalline hydrous alumina precursor powder or as a crystalline hydrous alumina precursor slurry (e.g., powder suspended in a solvent). If a solvent is used for first preparing the suspension or solution of the structural stabilizer and the boehmite mixture, the solvents may be the same, such as water, but may also be different such as water and an organic solvent. In preferred embodiments, the two or more crystalline boehmites are in the form of powders, and contacting includes mixing the boehmite powders to form the boehmite material, and then applying (e.g., impregnating) the structural stabilizer or compound thereof onto the boehmite material.

In an embodiment, treating the crystalline hydrous alumina precursor includes calcining the crystalline hydrous alumina precursor in contact with the structural stabilizer or compound thereof. The terms "calcination" or "calcining" refer to a heat treatment at an elevated temperature of at least about 200° C. in an oxidizing environment (such as air). Such "calcination" or "calcining" may be performed to transform a decomposable compound of the structural stabilizer into an oxide form, as well as to remove any residual solvent that may be used during contacting of the structural stabilizer or compound thereof with the crystalline hydrous alumina precursor. In an embodiment, the contacted crystalline hydrous alumina precursor is subjected to at least one heat treatment such as a "high temperature" treatment. High temperature treatment refers to a temperature sufficient to effect the conversion of the crystalline hydrous alumina precursor to a stabilized aluminum oxide structure. In an embodiment, the high temperature treatment includes a temperature of about 450° C. or higher, preferably a temperature of about 500° C. or higher, more preferably a temperature of about 600° C. or higher. In an alternative embodiment, the high temperature treatment includes a temperature of less than about 900° C., preferably less than about 850° C. In other alternative embodiments, the high temperature treatment includes a temperature of about 900° C. or more, preferably between about 900° C. and about 1600° C., more preferably between about 1000° C. and about 1500° C. In some embodiments, treating may include drying before calcining.

In an embodiment, the preparation of the stabilized support may further include shaping the crystalline hydrous alumina precursor. In some embodiments, preparation of the stabilized support may include contacting the crystalline hydrous alumina precursor with a structural stabilizer or a compound thereof, then shaping the crystalline hydrous alumina precursor, and then treating (e.g., high temperature treating) the crystalline hydrous alumina precursor in the presence of the structural stabilizer or compound thereof. In alternative embodiments, preparation of the stabilized support may include shaping the crystalline hydrous alumina precursor, then contacting the crystalline hydrous alumina precursor comprising boehmite with a structural stabilizer or a compound thereof, and then treating (e.g., high temperature treating) the crystalline hydrous alumina precursor in the presence of the structural stabilize or compound thereof. In another alternative embodiment, a "low temperature" treatment may be performed after shaping the crystalline hydrous alumina precursor. A low temperature treatment includes a temperature sufficient to retain a majority (i.e, at least about 50%) of the crystalline hydrous alumina precursor, preferably to retain a substantial portion (i.e., at least about 80%) of the crystalline hydrous alumina precursor. In an embodiment, the low temperature treatment includes a temperature of about 350° C. or less. For instance, an embodiment may include drying at a temperature of between about 70° C. and about 150° C. or calcining between about 150° C. and about 350° C.

Figure 1B:
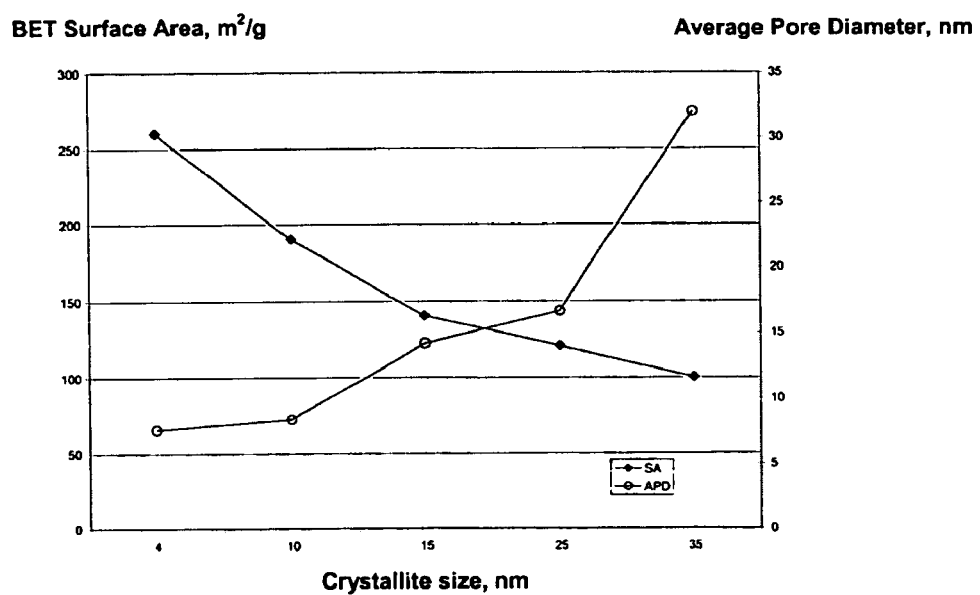
FIG. 1b illustrates the total surface area of the support versus the average crystallite size of a single boehmite material.

It is to be understood that dehydration of crystalline hydrous alumina precursor (e.g., by calcination) may produce a certain distribution of pores in the resulting catalyst support. Some interparticle pores are developed from the packing of the particles of the crystalline hydrous alumina precursor powder and originate from inter-particle spaces (i.e., spaces in between the boehmite particles), while other pores are formed by the loss of water from crystals of crystalline hydrous alumina precursor such as alumina monohydrate. Without being limited by theory, the volume and size of the interparticle pores may be directly dependent on the size of the crystalline hydrous alumina precursor particles in the powder, and there may be a good correlation between the average crystallite size of the crystalline hydrous alumina precursor and the average pore size as shown in FIG. 1b. Pore size control of the stabilized support can therefore be effected by the selection of an optimum average crystallite size of the crystalline hydrous alumina precursor or the use of a mixture of two or more crystalline boehmites differing in average crystallite size in the crystalline hydrous alumina precursor, as well as by the calcination conditions. Without limitation, examples of suitable calcination conditions include the selected calcination temperature; the holding time at the selected calcination temperature; the heating ramp (e.g., 1-10° C./min) to the selected calcination temperature; the use of steam during calcination (or not using steam during calcination); calcination at atmospheric pressure or above or under vacuum. In an embodiment, the method of making the stabilized support further includes contacting a pore-regulating agent with the crystalline hydrous alumina precursor before the shaping step to further control the pore size and pore distribution of the stabilized support. The contact with the pore-regulating agent may be simultaneous to contacting the crystalline hydrous alumina precursor with the structural stabilizer or compound thereof. In an alternative embodiment, the contact with the pore-regulating agent may be before or after contacting the crystalline hydrous alumina precursor with the structural stabilizer or compound thereof. In such an alternate embodiment, the crystalline hydrous alumina precursor may be exposed to a "low temperature" treatment between contacting the crystalline hydrous alumina precursor with the pore-regulating agent and contacting the crystalline hydrous alumina precursor with the structural stabilizer or compound thereof. In another alternative embodiment, contacting the crystalline hydrous alumina precursor with the pore-regulating agent may be accomplished after contacting with the structural stabilizer or compound thereof.

In an embodiment, the pore-regulating agent may be a compound that is decomposable under the calcination conditions. Without being limited by theory, a pore-regulating agent may help control pore size by reactivity to a particular functional group that influences pore size (e.g., reaction with alumina or aluminum hydroxide) and/or by physical separation of crystallites or particles (e.g., agglomerates of crystallites) of the crystalline hydrous alumina precursor acting as a "space-filling" factor. Further without being limited by theory, the pore-regulating agent may be positioned in the spaces inbetween the crystalline hydrous alumina precursor particles. For instance, upon decomposition of the pore-regulating agent, there may be new formed "holes" (i.e., pores), or the pore size may be enlarged by a "bulky" agent or reduced such as by cross-linking or peptization. The selection of the pore-regulating agent may be directed to its mode of action (e.g., reactivity and/or space-filling), size, its impact on certain pores (e.g., micropores of less than 1.5 nm; mesopores between 1.5 nm and 20 nm, macropores greater than 20 nm) and decomposition temperature. The pore-regulating agent may be used for example to change the average pore size, narrow the pore distribution, or create a bimodal pore distribution. Non-limiting examples of pore-regulating agents include acids (e.g., nitric acid, acetic acid, any polycarboxylic acid containing between 2 and 22 carbon atoms); alkalis such as ammonium hydroxide and/or ammonium salts, either used separately or used simultaneously, wherein the ammonium salt may be ammonium carbonate; ammonium bicarbonate; ammonium formate; ammonium acetate; ammonium propionate; tetra-alkyl ammonium with alkyl being methyl, ethyl, propyl, or butyl, or any combination thereof; graphite; ethylene oxide; ethylene glycol; propylene oxide; propylene glycol; acrylamide; ethylene amine; polymers (e.g., any polyethylene oxide, any polyethylene glycol, any polypropylene glycol, any polyethylene amine, any polyacrylamide, and any polyvinyl alcohol); cellulose; methyl cellulose; any methyl cellulose ether; and any combination of two or more thereof such as mixtures of polyethylene glycol and methyl cellulose.

Impact of Structural Stabilizer on Calcined Crystalline Hydrous Alumina Precursor Without being limited by theory, when a crystalline hydrous alumina precursor is impregnated with a catalytic metal precursor and then calcined to form the support, said calcination being performed at a temperature (e.g., >350° C.) sufficient to decompose the catalytic metal precursor but at a temperature (e.g., <800° C.) less than the temperature at which loss of support surface area is appreciable, the catalyst made therefrom may have a higher hydrothermal stability than a catalyst made from a calcined crystalline hydrous alumina precursor without impregnation with a catalytic metal precursor. In some instances, the catalytic metal precursor may migrate into the boehmite during the calcination, which may cause the size of the pores of the calcined boehmite to change and may result in not achieving the desired pore size on the catalyst support. As a result, the performance of the ensuing stabilized supported catalyst during the Fischer-Tropsch process may be compromised. For instance, syngas conversion and $C_5^+$ hydrocarbon selectivity may not be as high as desired.

Further without being limited by theory, the addition of either a catalytic metal precursor or a structural stabilizer compound to the crystalline hydrous alumina precursor, such as a crystalline boehmite or bayerite may also have an impact on the microstructure of the resulting aluminum oxide matrix, as it tends to reduce the pore size of the resulting aluminum oxide matrix. For example, the average pore size of the stabilized support resulting from the calcination of a boehmite in contact with a structural stabilizer compound is smaller than that of a support resulting from the calcination of said boehmite without the structural stabilizer compound. Hence, this may lead to the selection of a crystalline hydrous alumina precursor with a larger crystallite size to mitigate this reduction in pore size by the structural stabilizer compound.

Methods Employing a Single Crystalline Hydrous Alumina Precursor with an Optimum Average Crystallite Size Without being limited by theory, the original crystalline structure of the crystalline hydrous alumina precursor as well as the type and feedstock of the structural stabilizer may affect the microstructure of the resulting aluminum oxide matrix in the stabilized support obtained after the treating step. For example, it has been discovered that, for the preparation of a catalyst support (whether it is modified by a structural stabilizer or not) for strong Fischer-Tropsch catalysts, the larger the average crystallite size of the boehmite material to be used, the stronger the resistance to chemical or mechanical changes of the resulting support after calcination, which is illustrated in FIG. 1a (obtained without a structural stabilizer) where the steam resistance is plotted versus the average crystallite size of a single boehmite. Furthermore, FIG. 1b (also obtained without a structural stabilizer) shows that, as the average crystallite size of the single boehmite increases, the total surface area of the support obtained therefrom decreases, which implies that the average pore size may increase with the average crystallite size of the single boehmite. Further without being limited by theory, larger pore sizes in the support obtained from a single crystalline hydrous alumina precursor may improve diffusion of product hydrocarbons, and the porous structure of the resulting aluminum oxide matrix may depend on the original crystallite size of the crystalline hydrous alumina precursor.

Without being limited by theory, since the average pore size of a porous support may correlate with the average crystallite size of a metal deposited thereon, (see for example, "Characteristic feature of $Co/SiO_2$ catalysts for slurry phase Fischer-Tropsch synthesis" by Sun et al. in *J. Chem. Eng. Jpn.* (2000), Volume 33 (2), Pages 232-238; "Silica supported cobalt Fischer-Tropsch catalysts: effect of pore diameter of support" by Saib et al. in *Catalysis Today* (2002), Volume 71, Pages 395-402; "Supercritical Phase Fischer-Tropsch Synthesis: Catalyst Pore-size Effect" by Fan et al. in *AIChE Journal* (1992) Volume 38 No. 10, Pages 1639-1648) larger pore sizes in the stabilized support obtained from a single boehmite may increase the average crystallite size of a Fischer-Tropsch catalytically active metal deposited on the stabilized support (e.g., by impregnation). For instance, the crystallite size of cobalt may have an impact not only on the intrinsic activity of the cobalt-based catalyst but also on the stability of this activity over time. A larger cobalt average crystallite size may result in higher resistance to steam oxidation (i.e., increase stability of activity) but may also lower the intrinsic activity as less and less of the deposited cobalt is accessible to the reactants. Smaller cobalt crystallite sizes may result in higher intrinsic activity but may also confer poorer resistance to steam oxidation and conversion to cobalt oxide. Further without being limited by theory, the average pore size of the support may be sufficiently small to provide adequate catalyst activity (e.g, by reducing the active metal crystallite sizes), but not so small that it results in mass transfer limitation (e.g., by diffusion constraints) and formation of very small oxidation-prone Fischer-Tropsch metal crystallites. Hence, it has been discovered that for a stable performant Fischer-Tropsch catalyst, there is in general a selection of an optimum range of cobalt crystallite sizes, which is based on a compromise between high intrinsic activity and stability of the activity over time. It has been further found that the optimum crystallite size for the Fischer-Tropsch metal may be determined in part by the selection of an average crystallite size for a single boehmite from an optimum range of boehmite crystallite sizes, which is represented by the optimal region shown in FIG. 1a. Moreover, the addition of a structural stabilizer in this aluminum oxide matrix derived from the boehmite material may further prevent or reduce its subsequent degradation by hydrothermal action (e.g., rehydration in the presence of high temperature and pressure steam to a boehmite or pseudoboehmite phase).

Therefore, in some embodiments, a stabilized support is made by methods employing a single crystalline hydrous alumina precursor comprising an average crystallite size selected from an optimum size range.

One embodiment for making a stabilized catalyst support with an enhanced hydrothermal stability includes a) contacting a crystalline hydrous alumina precursor with at least one structural stabilizer or a compound thereof, wherein the crystalline hydrous alumina precursor includes at least one crystalline boehmite comprising an average crystallite size selected from a desired optimum range between about 4 nm and about 30 nm; b) shaping the contacted crystalline hydrous alumina precursor in the presence of the compound of the at least one structural stabilizer so as to form a shaped support precursor of a desired average particle size, wherein the shaped support precursor comprises the at least one crystalline boehmite and the at least one structural stabilizer compound; and c) treating the shaped support precursor. In an embodiment, the shaped precursor is treated under suitable calcination conditions to effect the conversion of the at least one crystalline boehmite to a stabilized aluminum oxide structure and to generate a stabilized catalyst support.

In preferred embodiments, the crystalline hydrous alumina precursor comprising at least one crystalline boehmite is in the form of a powder before the shaping. In some embodiments, the at least one crystalline boehmite is dispersible. In alternate embodiments, the at least one crystalline boehmite is non-dispersible.

In some embodiments, the crystalline hydrous alumina precursor may be in the form of a slurry or sol before the shaping, wherein the slurry or sol comprises a crystalline hydrous alumina precursor powder dispersed in a solvent. The solvent in the slurry or sol may be aqueous, but may be organic. The solvent in the slurry or sol may contain an acid to facilitate the dispersion of the crystalline hydrous alumina precursor powder.

In an embodiment, contacting a crystalline hydrous alumina precursor with at least one structural stabilizer or compound thereof includes forming a mixture of the compound of at least one structural stabilizer and the crystalline hydrous alumina precursor powder in a solvent, wherein the compound of at least one structural stabilizer is insoluble in said solvent. In an alternative embodiment, the contacting includes forming a mixture of a compound of at least one structural stabilizer and the crystalline hydrous alumina precursor powder in a solvent, wherein the compound of at least one structural stabilizer is dissolved in said solvent.

Shaping the contacted crystalline hydrous alumina precursor preferably generates particles of the shaped support precursor. In an embodiment, such particles have a particle size between about 10 microns and about 250 microns, more preferably between about 20 microns and about 200 microns. In an alternative embodiment, shaping the contacted crystalline hydrous alumina precursor generates shaped support precursor particles comprising a particle size greater than about 0.5 mm. Shaping of the crystalline hydrous alumina precursor may be accomplished by any suitable method. Without limitation, examples of suitable methods include spray-drying, pelletization, and/or extrusion.

In some embodiments, the desired average particle size is between about 30 microns and about 150 microns. In preferred embodiments, the desired average particle size is between about 50 microns and about 100 microns, more preferably between about 60 microns and about 90 microns.

In an embodiment, contacting the crystalline hydrous alumina precursor with the structural stabilizer or compound thereof preferably includes forming a mixture comprising a crystalline hydrous alumina precursor and a compound of the structural stabilizer in a solvent. The crystalline hydrous alumina precursor preferably comprises one or more crystalline boehmites in the form of a powder, such as comprising primarily micron-sized particles. The mixture may have a solid content of from about 20% to about 95% by weight of the total mixture weight. The mixture may be a sol or a slurry, preferably containing said boehmite powder or powders, with a solid content of from about 20% to about 60% by weight of the total mixture weight, preferably from about 20% to about 45% by weight of the total mixture weight, more preferably from about 20% to about 40% by weight of the total mixture weight. The mixture may be a paste, preferably containing said crystalline hydrous alumina precursor powder or powders, with a solid content of from about 80% to about 95% by weight of the total mixture weight, preferably from about 80% to about 90% by weight of the total mixture weight. More than one structural stabilizer or more than one compound of a structural stabilizer may be used to form the mixture. In an embodiment, the shaped support precursor may be dried before being calcined. Drying may include conventional drying (such as in an oven; a rotary calciner or dryer; a drum dryer; an indirect-heat dryer; a direct-heat dryer; a fluidized bed dryer; a tubular dryer; tunnel kiln; a muffle furnace; a box furnace; a belt dryer; a band dryer; or any combination thereof) and/or spray drying.

In an alternative embodiment, contacting the crystalline hydrous alumina precursor with a structural stabilizer or compound thereof includes forming a sol comprising a crystalline hydrous alumina precursor and a compound of the structural stabilizer. The sol may have a solid content of from about 20% to about 60% by weight of the total sol weight. In an embodiment wherein the shaped support precursor is dried by spray drying, the sol may have a solid content of from about 20% to about 45% by weight of the total sol weight; preferably a solid content of from about 20% to about 40% by weight of the total sol weight. It should be understood that more than one structural stabilizer or more than one compound of a structural stabilizer may be added to the sol. Forming the sol can also comprise dispersing the crystalline hydrous alumina precursor in a solvent to form a sol and adding a compound of the structural stabilizer to the sol or can comprise dispersing a compound of the structural stabilizer in a solvent to form a sol and adding the crystalline hydrous alumina precursor to the sol. Alternatively, forming the sol can include dispersing the crystalline hydrous alumina precursor in a first solvent to form a first sol, dispersing a compound of at least one structural stabilizer in a second solvent to form a second sol or a solution, and combining the first sol with the second sol or solution. Without being limited by theory, this embodiment of the method of making a stabilized support may be useful when the first solvent used to make the crystalline hydrous alumina precursor sol would not be suitable for the compound of the structural stabilizer.

In another embodiment, forming the mixture includes dispersing the crystalline hydrous alumina precursor in a first solvent to form a sol, dispersing a compound of at least one structural stabilizer in a second solvent to form a gel, and combining the sol and the gel to make a slurry. In this embodiment, it may be desirable to contact the crystalline hydrous alumina precursor with one inorganic oxide or a combination of inorganic oxides. For instance, a sol comprising the crystalline hydrous alumina precursor may be formed and one oxide of a structural stabilizer or a combination of oxides of structural stabilizers, such as inorganic oxides, may be dispersed in a solvent to form a gel with inorganic oxide(s). The sol and the inorganic oxide gel may be combined to form the mixture. Preferably, forming a gel with inorganic oxide(s) comprises precipitating the inorganic oxide or co-precipitating at least two inorganic oxides. The inorganic oxide gel preferably comprises a co-precipitated silica-alumina gel. The silica-alumina gel may have a molar ratio of silica to alumina between about 500:1 and about 1:1, preferably between about 500:1 and about 3:1. The silica-alumina gel is preferably made by the co-precipitation of an aluminate compound and a silicate compound (for example, sodium aluminate and sodium silicate) with the addition of an acid (such as nitric acid) by adding an acid so as to form a co-precipitated silica-alumina gel. Sufficient amounts of aluminate compound and silicate compound may be selected to produce a molar ratio of silica to alumina between about 500:1 and about 1:1, preferably between about 500:1 and about 3:1. A hydrogel may be obtained within a few seconds to several hours, and the gelation pH may be above about 7, preferably between about 9 and about 11. The hydrogel may then be aged for more than about 0.5 hour, preferably not more than about 80 hours at room temperature.

An alternate method to forming the stabilized support comprises forming a boehmite sol by dispersing a boehmite material in a solvent to form a boehmite sol, spray-drying the boehmite sol to form spray-dried boehmite, and depositing a structural stabilizer compound to the spray-dried boehmite.

In another method, contacting a boehmite material with a structural stabilizer or compound thereof includes forming a boehmite sol by dispersing the boehmite material and a structural stabilizer compound in a solvent to form the boehmite sol and spray-drying the boehmite sol in the presence of the structural stabilizer to form spray-dried boehmite, which comprises the structural stabilizer.

Yet another method for making a stabilized catalyst support with an enhanced hydrothermal stability includes a) shaping a crystalline hydrous alumina precursor comprising at least one crystalline boehmite to form a shaped boehmite material in the form of particles with a desired average particle size, wherein the at least one crystalline boehmite comprises an average crystallite size selected from a desired range from about 4 nm to about 30 nm; b) optionally, heat-treating the shaped crystalline hydrous alumina precursor to a temperature not exceeding 350° C. so as to retain a substantial portion of the at least one crystalline boehmite; c) contacting the shaped crystalline hydrous alumina precursor with at least one structural stabilizer or a compound thereof; and d) treating the shaped crystalline hydrous alumina precursor in the presence of the at least one structural stabilizer or compound thereof under suitable conditions to effect the conversion of the at least one crystalline boehmite to a stabilized aluminum oxide structure and to generate a stabilized catalyst support. In some instances, contacting the shaped crystalline hydrous alumina precursor includes forming a mixture of a compound of at least one structural stabilizer and a crystalline hydrous alumina precursor powder in a solvent, wherein the compound of at least one structural stabilizer is dissolved in said solvent. Particularly, contacting may comprise impregnation of a compound of the at least one structural stabilizer onto the shaped crystalline hydrous alumina precursor.

Yet another alternate method for making a stable catalyst support comprises a) forming a mixture of a crystalline hydrous alumina precursor comprising a boehmite or a bayerite and at least a portion of a structural stabilizer; b) drying the mixture; c) treating the dried mixture comprising said portion of structural stabilizer and still further comprising said boehmite or said bayerite and to form a partially-stabilized support; d) applying another portion of the structural stabilizer to the partially-stabilized support to form a support precursor; and e) treating the support precursor to form a stabilized support.

In alternative embodiments, an additional amount of at least one structural stabilizer is added to the stabilized support. Such an additional amount may be the same or different than the at least one structural stabilizer contacted with the crystalline hydrous alumina precursor.

In alternative embodiments, one structural stabilizer may be incorporated into the support by means of different techniques. For instance, drying the mixture (such as a sol) containing the crystalline hydrous alumina precursor and a compound of the structural stabilizer may deposit a fraction of the stabilizer to form a partially-stabilized dried material, and then another fraction of the stabilizer may be deposited (e.g., by impregnation, precipitation, or chemical vapor deposition) to the partially-stabilized dried material to form a stabilized support. In other embodiments, any combination of techniques may be used to deposit a structural promoter or several structural promoters to the partially-stabilized material.

In further embodiments, two or more structural stabilizers may be incorporated into the support by means of several techniques. For instance, a first stabilizer may be deposited by drying a mixture (such as a sol) containing the crystalline hydrous alumina precursor and a compound of said first structural stabilizer to form a partially-stabilized dried material, and a second stabilizer may be deposited on the partially-stabilized dried material using a method such as impregnation, precipitation, or chemical vapor deposition to obtain a stabilized support. In other embodiments, any combination of techniques may be used to deposit one structural stabilizer or several structural stabilizers (sometimes called structural promoters) to the partially-stabilized dried material.

In an additional embodiment, contacting the crystalline hydrous alumina precursor with the structural stabilizer to form the precursor support includes dispersing the crystalline hydrous alumina precursor in a solvent to form a sol, drying the sol so as to form a dried crystalline alumina precursor, and then depositing one or more structural stabilizers to the dried crystalline alumina precursor to form the support precursor. The deposition may be done using any suitable technique. Without limitation, examples of suitable techniques include incipient wetness impregnation, precipitation, and chemical vapor deposition. In other embodiments, any combination of techniques may be used to deposit a structural promoter or several structural promoters to the dried crystalline alumina precursor.

When a structural stabilizer is deposited by impregnation to a dried crystalline alumina precursor (partially stabilized or not), the compound containing the structural stabilizer is preferably dissolved in an organic solvent.

Suitable solvents for the preparation of the mixture with the crystalline hydrous alumina precursor include water and/or an organic solvent such as methanol, acetone, ethanol, and the like. Suitable compounds of the structural stabilizer soluble in the solvent can include, for example but not limited to, salts thereof, acids thereof, hydroxides thereof, and oxides thereof.

In some embodiments, when the solvent comprises water, the pH of the sol may be below about 7. Preferably, the pH of the sol is between about 3 and about 7 and more preferably between about 4 and about 6. Acids or acidic solutions, such as acetic acid, nitric acid, formic acid, boric acid, or combinations thereof can be added to the sol in order to adjust the pH of the sol. Without being limited by theory, acids may act as peptizing agents, which strengthen the molecular structure of the material by creating shorter bonds between molecules and tightening the structural lattice. The acidic condition during drying (conventionally drying or spray drying) may then confer greater structural integrity to the support. The peptizing agent is preferably used when the crystalline hydrous alumina precursor is substantially non-dispersible, to facilitate its dispersion in the sol.

Treating the support precursor may include calcining and/or drying. The support precursor is preferably calcined in an oxidizing atmosphere. Calcining can be performed at a temperature between about 450° C. and about 900° C., alternatively between about 450° C. and about 850° C., preferably between about 500° C. and about 850° C., more preferably between about 600° C. and about 850° C. In some embodiments, calcining may be performed at temperatures between about 600° C. and about 750° C. In other embodiments, calcining includes temperatures of about 450° C. or higher, alternatively about 500° C. or higher, and alternatively about 600° C. or higher. Alternatively, calcining may be performed at a temperature between about 500° C. and about 800° C., alternatively between about 500° C. and about 775° C., and alternatively between about 500° C. and about 750° C., and further alternatively between about 550° C. and about 850° C. In another alternative embodiment, the calcination temperature may be about 900° C. or more, preferably between about 900° C. and about 1600° C., more preferably between about 1000° C. and about 1500° C., and more preferably between about 1100° C. and about 1600° C., and still more preferably between about 1100° C. and about 1400° C. Calcining may proceed from 0.5 to 36 hours. Calcining at a pressure of about 100 kPa or higher is desirable. In an embodiment, the calcining may be performed at a pressure from about 0 to about 500 kPa (about 0 to about 5 atm), more preferably from about 100 to about 500 kPa (about 1 atm to about 5 atm), most preferably from about 100 to about 105 kPa (about 1 atm). Calcining in an oxidizing atmosphere preferably achieves oxidation of any deposited compound or salt of the structural stabilizer to an oxide compound of the structural stabilizer. When the preparation of the support comprises multiple techniques such as spray drying followed by impregnation, chemical vapor deposition, or precipitation, calcining in an oxidizing atmosphere preferably proceeds after the last technique is used but can also be done after each technique is used.

In some embodiments, the support precursor may be dried before or after calcining. In alternative embodiments, the support precursor is not calcined but is instead dried. Drying the support precursor preferably occurs at a temperature between about 75° C. and about 200° C., more preferably between about 80° C. and about 150° C. Drying may proceed from 0.5 to 36 hours at a pressure of from 0 atm to about 10 atm, more preferably from about 0 to about 5 atm, most preferably at about 1 atm. When drying is performed by spray-drying, spray-drying comprises passing the mixture through a spray-drier with an inlet temperature of from about 200° C. to about 425° C. and an outlet temperature from about 100° C. to about 140° C. In large-scale preparation, the drying step preferably comprises at least one spray-drying step. When the preparation of the support comprises multiple techniques such as for example, spray drying followed by impregnation, chemical vapor deposition, or precipitation, the treatment of the support precursor by drying preferably proceeds after each technique is used.

Methods Employing Two or More Boehmites with Differing Average Crystallite Sizes Extensive work is needed to optimize the relationship between the porosity of the support structure (e.g., average pore size, surface area, pore volume) and Fischer-Tropsch metal crystallite size. However, considerations based on possible diffusional limitations of the resulting catalyst are generally neglected.

The porosity of a support is defined as the total pore volume inside a support particle. This porosity can be divided into different fractions as defined by the pore diameter. The largest pores are called macropores, these are defined as pores greater than 75 nanometers (nm) in diameter. The mesopores are those between 8 nm and 75 nm, and the micropores are those below 8 nm. The surface area is primarily located in the microporosity, whereas the macroporosity is important for the transport and diffusion of molecules to this surface area. As described earlier, the porosity (e.g., the average pore size and surface area) of the resulting stabilized support comprising the aluminum oxide matrix is dictated not only by the original boehmite material but also the type and the amount used of the structural stabilizer, and one can select a single boehmite with an average crystallite size within an optimal range so as to achieve a hydrothermally stable support structure with a desired porosity (e.g., average pore size and/or surface area) to support the deposited catalytic metal and further achieve high intrinsic activity of the supported catalyst derived therefrom.

It has been surprisingly discovered that a mixture of equal amounts (by weight) of two boehmite materials with different average crystallite sizes of 10 and 15 nm may form a Fischer-Tropsch catalyst with relatively high activity, good selectivity, good attrition resistance, and good catalytic stability, all of which may be equal to or superior than catalysts derived from a boehmite material with a single crystallite of 10 nm or 15 nm. Similarly, mixtures containing a small weight fraction of a boehmite material with an average crystallite size of about 4 nm and a large weight fraction of a boehmite material with an average crystallite size of 10 or 15 nm form Fischer-Tropsch catalysts with excellent catalytic performance. Similarly, mixtures containing a small weight fraction of a boehmite material with an average crystallite size of about 35 nm and a large weight fraction of a boehmite material with an average crystallite size of 15 or 25 nm form Fischer-Tropsch catalysts with excellent catalytic performance and hydrothermal stability.

Therefore, in addition of adding one or more structural stabilizers (like Si, Co, Mg, etc.) to the boehmite before and/or after shaping or forming (such as spray drying), combinations of boehmites may be used differing in average crystallite sizes to further optimize the pore size distribution of the resulting stabilized support obtained therefrom. In an embodiment, the boehmite material can include the mixture of two boehmites, one of which has a larger boehmite crystallite size (e.g., typically larger than 20 nm) for the purpose of forming a small fraction of larger pores (e.g., comprising between 1 to 20% of the total pore volume). Without being limited by theory, these larger pores may have a beneficial effect in the diffusion properties of each catalyst particle. The combination of two boehmites to form the support and catalyst precursor therefore may provide an additional factor for the optimization of the porous structure of the aluminum oxide-based matrix to provide a desired crystallite size distribution of the catalytic material (e.g., cobalt metal) deposited thereupon.

Figure 2:
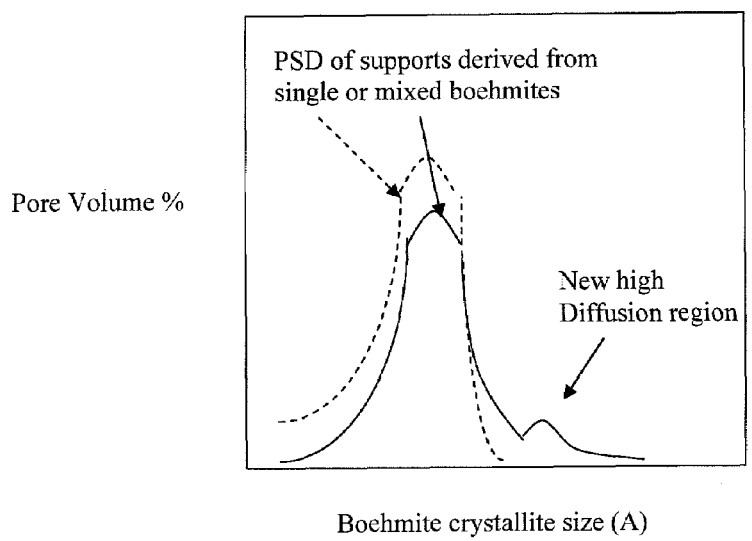
FIG. 2 illustrates a pore volume distribution versus pore size in a mixed-boehmite embodiment.

For illustrative purposes, a pore size distribution based on pore volume is shown in FIG. 2 for a calcined single-boehmite derived support (dotted line) and for a calcined mixed-boehmite derived support (plain line), which comprises a portion of the same boehmite used in the calcined single-boehmite derived support. The calcined mixed-boehmite derived support has a relatively lower portion of small pores than the calcined single-boehmite derived support. Furthermore, the pore volume distribution curve for the calcined mixed-boehmite derived support can contain a bimodal distribution illustrated by two pore size peaks. A first mode is generally greater than a second mode by at least about 1 nm, preferably by at least about 3 nm. Particularly, the first mode may be between about 4 nm and about 20 nm, whereas the second mode may be between about 15 nm and about 40 nm. There is typically an additional tail on the right-hand side of the pore size distribution of the calcined mixed-boehmite derived support. This additional tail and/or the second mode of the calcined mixed-boehmite derived support can provide an enhanced mass transport in the catalyst supported therefrom.

In one embodiment, a method for making a stabilized catalyst support with enhanced hydrothermal stability comprises forming a stabilized support from a mixture of at least two boehmite materials with different average crystallite sizes, differing by at least about 1 nm. In preferred embodiments, at least one boehmite has an average crystallite size in the range from about 4 to about 30 nm, and the difference between the average crystallite sizes is at least about 1 nm, preferably at least about 3 nm, more preferably more than about 5 nm. In more preferred embodiments, a first boehmite has an average crystallite size in the range from about 4 to about 30 nm, and a second boehmite has an average crystallite size in the range from about 20 to about 40 nm.

An embodiment includes a method for making a stabilized catalyst support with an enhanced hydrothermal stability, comprising a) contacting a boehmite material with at least one structural stabilizer or a compound thereof, wherein the boehmite material includes two or more crystalline boehmites, wherein at least one crystalline boehmite comprises an average crystallite size selected from a desired optimum range between about 4 nm and about 30 nm; and b) treating the boehmite material. In preferred embodiments, treating includes treating the boehmite material in the presence of the at least one structural stabilizer or compound thereof under suitable conditions to effect the conversion of the two or more crystalline boehmites to a stabilized aluminum oxide structure. In alternate embodiments, treating comprises calcining the boehmite material without the at least one structural stabilizer or compound thereof under suitable conditions to effect the conversion of the two or more crystalline boehmites to a stabilized aluminum oxide structure; then, contacting the calcined boehmite material with the at least one structural stabilizer or compound thereof, and calcining again.

Preferably, the at least one crystalline boehmite comprises an average crystallite size in a range of about 4 nm to about 30 nm, preferably from about 6 nm to about 30 nm, more preferably in a range of from about 8 nm to about 25 nm, and more preferably in a range from about 10 nm to about 25 nm, most preferably in a range of from about 10 nm to about 20 nm. In alternate embodiments, the at least one crystalline boehmite comprises an average crystallite size in a range of from about 15 nm to about 25 nm. In some embodiments, the boehmite material comprises a first crystalline boehmite having a first average crystallite size between about 4 nm and about 30 nm and a second crystalline boehmite having a second average crystallite size, wherein the second average crystallite size is at least about 1 nanometer larger than the second average crystallite size. The second average crystallite size may be between about 20 and about 40 nm; preferably between about 20 and about 35 nm; more preferably between about 25 and about 35 nm. In some embodiments, the first crystalline boehmite has a first average crystallite size from about 8 nm to about 30 nm, while the second crystalline boehmite has a second average crystallite size from about 20 nm to about 35 nm. Still in an alternate embodiment, the first crystalline boehmite has a first average crystallite size from about 10 nm to about 25 nm, while the second crystalline boehmite has a second average crystallite size from about 25 nm to about 35 nm.

In some embodiments, contacting includes 1a) mixing two or more crystalline boehmites in a solvent to form a boehmite mixture; 2a) shaping the boehmite mixture in the absence of the at least one structural stabilizer or compound thereof to generate a shaped boehmite material in the form of particles of a desired average particle size; and 3a) contacting the shaped boehmite material with the at least one structural stabilizer or a compound thereof to form a contacted shaped boehmite material. In an embodiment, shaping may generate particles of the shaped boehmite material particles comprising a particle size between about 20 microns and about 200 microns or particles comprising a particle size greater than about 500 microns, preferably between about 30 microns and about 150 microns. In an embodiment, such treating may be a low temperature treatment. In other embodiments, the contacted shaped boehmite material is calcined. In some embodiments, treating may be performed between shaping and contacting. In such embodiments, treating may include calcining the shaped boehmite material. In addition, contacting may proceed by impregnating a soluble decomposable compound of the at least one structural stabilizer onto the shaped aluminum oxide material.

In alternate embodiments, the contacting step (a) comprises: Ia) mixing the two or more crystalline boehmites and the at least one structural stabilizer or compound thereof in a solvent to form a boehmite mixture; IIa) shaping the contacted boehmite mixture in the presence of the at least one structural stabilizer or compound thereof to generate a shaped boehmite material in the form of particles of a desired average particle size; and IIIa) optionally, treating the shaped boehmite material. In alternative embodiments, treating includes a temperature of not more than about 350° C., so as to retain substantially the two or more crystalline boehmites.

In preferred embodiments, the boehmite material subjected to the heat treating step (b) is in the form of particles of desired average particles size greater than about 30 microns. The desired average particle size may be between about 30 microns and about 150 microns, preferably between about 50 microns and about 100 microns, more preferably between about 60 microns and about 90 microns.

Catalyst Composition

In an embodiment, the catalyst includes a catalytic metal deposited on the stabilized support. The catalytic metal is preferably a Fischer-Tropsch catalytic metal. In particular, the catalytic metal is preferably selected from among the Group 8 elements of the Periodic Table, such as iron (Fe), ruthenium (Ru), and osmium (Os); Group 9 elements, such as cobalt (Co), rhodium (Rh), and iridium (Ir); Group 10 elements, such as nickel (Ni), palladium (Pd), and platinum (Pt); and the metals molybdenum (Mo), rhenium (Re), and tungsten (W). The catalytic metal more preferably comprises cobalt, iron, ruthenium, nickel, or combinations thereof. The catalytic metal still more preferably comprises cobalt, iron, ruthenium, or combinations thereof. Most preferably, the catalytic metal comprises cobalt. The catalyst preferably contains a catalytically effective amount of the catalytic metal. The amount of catalytic metal present in the catalyst may vary widely.

A Fischer-Tropsch catalyst supported on the stabilized support derived from a mixture of boehmites has catalytic properties equal to or superior than those of a Fischer-Tropsch catalyst prepared from a stabilized support derived from a single boehmite material.

When the catalytic metal is cobalt, the catalyst preferably has a nominal composition that includes cobalt in an amount totaling from about 1% to about 50% by weight (as the metal) of total catalyst composition (catalytic metal, support, and any optional promoters), more preferably from about 5% to about 40% by weight, still more preferably from about 10 to about 37% by weight, and most preferably from about 15 to about 35% by weight. It will be understood that % indicates percent throughout the present specification.

When the catalytic metal is iron, the catalyst preferably has a nominal composition including from about 5 to about 75 wt. % iron, preferably from about 10 to about 60 wt. % iron, more preferably from about 20 to about 50 wt. % iron.

When the catalytic metal is ruthenium, the catalyst preferably has a nominal composition including from about 0.01 to about 5 wt. % ruthenium, preferably from about 0.5 to about 4 wt. % ruthenium, more preferably from about 1 to about 3 wt. % ruthenium.

It will be understood that, when the catalyst includes more than one supported metal, the catalytic metal, as termed herein, is the primary supported metal present in the catalyst. The primary supported metal is preferably determined by weight, wherein the primary supported metal is preferably present in the greatest % by weight.

The catalytic metal contained by a catalyst according to a preferred embodiment of the present invention is preferably in a reduced, metallic state before use of the catalyst in the Fischer-Tropsch synthesis. However, it will be understood that the catalytic metal can be present in the form of a metal compound, such as a metal oxide, a metal hydroxide, and the like. The catalytic metal is preferably uniformly dispersed throughout the support. It is also understood that the catalytic metal can also be present at the surface of the support, in particular on the surface or within a surface region of the support, or that the catalytic metal can be non-homogeneously dispersed onto the support.

Optionally, the present catalyst can also include at least one promoter known to those skilled in the art. The promoter may vary according to the catalytic metal. A promoter can be an element that also, in an active form, has catalytic activity in the absence of the catalytic metal. Such an element will be termed herein a promoter when it is present in the catalyst in a lesser wt. % than the catalytic metal.

A promoter preferably enhances the performance of the catalyst. Suitable measures of the performance that may be enhanced include selectivity, activity, stability, lifetime, reducibility and resistance to potential poisoning by impurities such as sulfur, nitrogen, and oxygen. A promoter is preferably a Fischer-Tropsch promoter, which is an element or compound that enhances the performance of a Fischer-Tropsch catalyst in a Fischer-Tropsch process.

It will be understood that as contemplated herein an enhanced performance of a promoted catalyst can be calculated according to any suitable method known to one of ordinary skill in the art. In particular, an enhanced performance can be given as a percent and computed as the ratio of the performance difference to the performance of a reference catalyst. The performance difference is between the performance of the promoted catalyst and the reference catalyst, wherein the reference catalyst is a similar corresponding catalyst having the nominally same amounts, e.g. by weight percent, of all components except the promoter. It will further be understood that as contemplated herein a performance can be measured in any suitable units. For example, when the performance is productivity, productivity can be measured in grams product per hour per liter reactor volume, grams product per hour per kilogram catalyst, and the like.

Suitable promoters vary with the catalytic metal and can be selected from Groups 1-15 of the Periodic Table of the Elements. A promoter can be in elemental form. Alternatively, a promoter can be present in an oxide compound. Further, a promoter can be present in an alloy containing the catalytic metal. Except as otherwise specified herein, a promoter is preferably present in an amount to provide a weight ratio of elemental promoter:elemental catalytic metal of from about 0.00005:1 to about 0.5:1, preferably from about 0.0005:1 to about 0.25:1 (dry basis). When the promoter comprises a metal from Groups 7, 8, 9, and 10 of the Periodic Table such as rhenium, ruthenium, platinum, or palladium, the weight ratio of elemental promoter:elemental catalytic metal may be between about 0.00005:1 and about 0.05:1.

Further, when the catalytic metal is cobalt or iron, suitable promoters include Group 1 elements such as potassium (K), lithium (Li), sodium (Na), and cesium (Cs); Group 2 elements such as calcium (Ca), magnesium (Mg), strontium (Sr), and barium (Ba); Group 3 elements such as scandium (Sc), yttrium (Y), and lanthanum (La); Group 4 elements such as titanium (Ti), zirconium (Zr), and hafnium (Hf); Group 5 elements such as vanadium (V), niobium (Nb), and tantalum (Ta); Group 6 elements such as molybdenum (Mo) and tungsten (W); Group 7 elements such as rhenium (Re) and manganese (Mn); Group 8 elements such as ruthenium (Ru) and osmium (Os); Group 9 elements such as rhodium (Rd) and iridium (Ir); Group 10 elements such as platinum (Pt) and palladium (Pd); Group 11 elements such as silver (Ag) and copper (Cu); Group 12 elements such as zinc (Zn), cadmium (Cd), and mercury (Hg); Group 13 elements such as gallium (Ga), indium (In), thallium (Tl), and boron (B); Group 14 elements such as tin (Sn) and lead (Pb); and Group 15 elements such as phosphorus (P), bismuth (Bi), and antimony (Sb).

When the catalytic metal is cobalt, iron, or combinations thereof, the promoter preferably comprises platinum, palladium, ruthenium, rhenium, silver, boron, copper, lithium, sodium, potassium, magnesium, manganese, or combinations thereof.

When the catalytic metal is cobalt, the promoter more preferably comprises rhenium, ruthenium, platinum, palladium, boron, silver, or combinations thereof. When the cobalt catalyst includes rhenium, the rhenium is preferably present in the catalyst in an amount between about 0.001 and about 5% by weight, more preferably between about 0.01 and about 2% by weight, most preferably between about 0.2 and about 1% by weight. When the cobalt catalyst includes ruthenium, the ruthenium is preferably present in the catalyst in an amount between about 0.0001 and about 5% by weight, more preferably between about 0.001 and about 1% by weight, most preferably between about 0.01 and about 1% by weight. When the cobalt catalyst includes platinum, the platinum is preferably present in the catalyst in an amount between about 0.00001 and about 5% by weight, more preferably between about 0.0001 and about 1% by weight, and most preferably between about 0.0005 and about 1% by weight. When the cobalt catalyst includes palladium, the palladium is preferably present in the catalyst in an amount between about 0.00001 and about 5% by weight, more preferably between about 0.0001 and about 2% by weight, most preferably between about 0.0005 and about 1% by weight. When the cobalt catalyst includes silver, the catalyst preferably has a nominal composition including from about 0.01 to about 10 wt % silver, more preferably from about 0.07 to about 7 wt % silver, still more preferably from about 0.1 to about 5 wt % silver. When the cobalt catalyst includes boron, the catalyst preferably has a nominal composition including from about 0.025 to about 2 wt % boron, more preferably from about 0.05 to about 1.8 wt. % boron, still more preferably from about 0.075 to about 1.5 wt % boron.

By way of example and not limitation, when the catalytic metal is iron, suitable promoters include copper (Cu), potassium (K), silicon (Si), zirconium (Zr), silver (Ag), lithium (Li), sodium (Na), rubidium (Rb), cesium (Cs), magnesium (Mg), manganese (Mn), calcium (Ca), strontium (Sr), and barium (Ba). When the catalytic metal is iron, the promoter more preferably comprises potassium, copper, lithium, sodium, silver, magnesium, or combinations thereof. When the catalytic metal is iron, the catalyst may include potassium or lithium as a promoter; and alternatively or in combination, the catalyst may include copper or silver. When the iron catalyst comprises lithium as a promoter, lithium is present in an amount preferably between about 0.05 wt % and about 5 wt % of lithium to total weight of catalyst; and more preferably, between about 0.5 wt % and about 2 wt %. When the iron catalyst comprises silver as a promoter, silver is present in an amount preferably between about 0.001 wt % and about 5 wt % of silver to total weight of catalyst; more preferably between about 0.001 wt % and about 2 wt % of silver to total weight of catalyst; and most preferably between about 0.005 wt % and 1 wt % of silver to total weight of catalyst. When the iron catalyst comprises potassium as a promoter, potassium is present in an amount preferably between about 0.0001 wt % and about 10 wt % of potassium to total weight of catalyst; more preferably, between about 0.0005 wt % and about 1 wt % of potassium to total weight of catalyst; and most preferably, between about 0.0005 wt % and about 0.5 wt % of potassium to total weight of support. When the iron catalyst comprises calcium as a promoter, calcium is present in an amount preferably between about 0.001 wt % and about 4 wt % of calcium to total weight of catalyst; more preferably, between about 0.5 wt % and about 3 wt % of calcium to total weight of catalyst. When the iron catalyst comprises copper as a promoter, copper is preferably present in an amount to provide a nominal catalyst composition including between about 0.1 wt. % and about 10 wt. % copper.

Alternatively, by way of example and not limitation, when the catalytic metal is ruthenium, suitable promoters include rhenium. When the ruthenium catalyst includes rhenium, the rhenium is preferably present in the catalyst in an amount between about 0.001 and about 1% by weight, more preferably between about 0.01 and about 0.5% by weight, still more preferably between about 0.05 and about 0.5% by weight.

In some embodiments of the present invention, the catalyst is suitable for use as a syngas catalyst (e.g., suitable in a process for producing syngas). In an embodiment, a syngas catalyst comprises rhodium, rhenium, ruthenium, palladium, platinum, iridium, nickel, or combinations thereof, as the active metal. Preferably the catalyst used for producing synthesis gas comprises rhodium, ruthenium, iridium, platinum, palladium, rhenium, or any combinations thereof. More preferably, the catalyst used for producing synthesis gas comprises rhodium, ruthenium, iridium, or any combinations thereof supported by the stabilized support. The syngas catalyst may comprise between about 0.1 wt % to about 20 wt % of active metal, preferably from about 0.5 wt % to about 10 wt % of active metal, and more preferably from about 0.5 wt % to about 6 wt % of active metal. Syngas catalyst compositions may also contain one or more promoters. In some embodiments when the active metal comprises rhodium, the promoter comprises an element selected from the group consisting of La, Ce, Pr, Nd, Pm, Sm, Eu, Gd, Tb, Dy, Ho, Er, Tm, Yb and Lu, preferably Sm, Eu, Pr and Yb. The introduction of a lanthanide and/or lanthanide oxide, e.g., $La_2O_3$ or $Sm_2O_3$, on the stabilized support surface before deposition of the active metal is believed to further enhance the metal-support interaction, and that the active metal also disperses better on the stabilized support surface on which a lanthanide and/or lanthanide oxide is deposited. In this embodiment, the promoter is preferably applied to the stabilized support before the active metal is applied or alternatively is applied simultaneously to the active metal.

As used herein, a nominal composition is preferably a composition specified with respect to an active catalyst. The active catalyst can be either fresh or regenerated. The nominal composition can be determined by experimental elemental analysis of an active catalyst. Alternatively, the nominal composition can be determined by numerical analysis from the known amounts of catalytic metal, promoter, and support used to make the catalyst. It will be understood that the nominal composition as determined by these two methods will typically agree within conventional accuracy.

Further, as used herein, it will be understood that each of the ranges, such as of ratio or weight %, herein is inclusive of its lower and upper values.

In some embodiments, a resulting Fischer-Tropsch catalyst comprising a support stabilized with cobalt (or a cobalt-containing compound), or stabilized with magnesium (or a magnesium-containing compound) or stabilized with aluminum (or an aluminum-containing compound) comprises an average pore size between about 8 nm and about 22 nm; a BET surface area between about 40 $m^2$/g catalyst and about 100 $m^2$/g catalyst; and a pore volume between about 0.15 cc/g catalyst and about 0.3 cc/g catalyst, alternatively between about 0.16 cc/g catalyst and about 0.26 cc/g catalyst.

In some embodiments, a resulting Fischer-Tropsch catalyst comprising a support stabilized with silicon or a silicon-containing compound comprises an average pore size between about 10 nm and about 15 nm; a BET surface area between about 70 $m^2$/g catalyst and about 100 $m^2$/g catalyst; and a pore volume between about 0.2 cc/g catalyst and about 0.3 cc/g catalyst.

The resulting Fischer-Tropsch catalyst, which has a catalyst support comprising a stabilized aluminum oxide structure derived from a single boehmite material or a mixed-boehmite material, is highly active. The catalyst has an improved attrition resistance, and has a good hydrothermal stability, especially when using a single boehmite material or a mixed-boehmite material comprising at least one crystalline boehmite with the most preferred average crystallite size ranging from about 10 nm to about 20 nm.

In further embodiments, as shown later in Table 5, the % conversion of the CO reactant as well as the selectivity and productivity of the valuable $C_5^+$ hydrocarbon products are considerably higher when the Fischer-Tropsch catalyst is formed from a boehmite having an average crystallite size of from about 10 nm to about 20 nm as opposed to when it is formed from a boehmite having an average crystallite size of less than 10 nm or greater than about 20 nm.

Catalyst Preparation

The catalysts may be prepared by any suitable method. Without limitation, examples of suitable methods include impregnating a catalyst material onto the stabilized support of the present invention, extruding the stabilized support together with the catalyst material to prepare catalyst extrudates, spray-drying the catalyst material and the support from a solution containing both, and/or precipitating the catalyst material onto a support. The supported catalysts may be used in the form of powders, particles, pellets, monoliths, honeycombs, packed beds, foams, and aerogels. The catalyst material can include any one or any combination of a catalytic metal, a precursor compound of a catalytic metal, a promoter, and a precursor compound of a promoter.

The most preferred method of preparation may vary among those skilled in the art depending, for example, on the desired catalyst particle size. Those skilled in the art are able to select the most suitable method for a given set of requirements.

One method of preparing a catalyst includes making a catalyst precursor by applying a catalyst material (such as catalytic metal and/or promoter element) onto the stabilized support of the present invention. The applying step may include impregnating the stabilized catalyst support with a solution containing the catalyst material. Suitable solvents include water and organic solvents (e.g., toluene, methanol, ethanol, and the like). Those skilled in the art will be able to select the most suitable solvent for a given catalyst material. The catalyst material can be in the form of a salt of a catalytic metal or promoter element. Thus, one method of preparing the catalyst includes incipient wetness impregnation of the stabilized catalyst support with a solution of a soluble catalytic metal salt and optionally a soluble promoter metal compound. Incipient wetness impregnation preferably proceeds by solution of one or more compounds of the catalyst material (such as a cobalt compound) in a minimal amount of solvent sufficient to fill the pores of the support. Alternatively, the catalyst material can be applied to the stabilized support in the form of a zero valent compound of a catalytic metal or promoter element. Thus, another method comprises impregnating the support with a solution of zero valent metal such as cobalt carbonyl (e.g., $CO_2(CO)_8$, $CO_4(CO)_{12}$) or the like. Multiple steps of impregnation can be done to achieve the desired amount of catalyst material loading.

Another method of preparing the supported catalyst includes making a catalyst precursor by impregnating the stabilized catalyst support with a molten salt of a catalytic metal and/or promoter. Thus, another method includes preparing the supported catalyst from a molten metal salt. One such method includes impregnating the support with a molten metal nitrate (e.g., Co $(NO_3)_2.6H_2O$). A promoter compound can be impregnated separately from any cobalt, in a separate step. Alternatively, a promoter compound can be impregnated simultaneously with, e.g. in the same solution as, at least a portion of the catalytic metal.

When a catalyst material is impregnated as a precursor compound of the catalyst material, e.g. a salt or a zero valent compound, those skilled in the art will be able to select suitable catalyst material precursor compound(s).

By way of example and not limitation, suitable cobalt-containing precursor compounds include, for example, hydrated cobalt nitrate (e.g. cobalt nitrate hexahydrate), cobalt carbonyl, cobalt acetate, cobalt acetylacetonate, cobalt oxalate, and the like. Hydrated cobalt nitrate, cobalt carbonyl and cobalt acetate are exemplary of cobalt-containing precursor compounds soluble in water. Cobalt oxalate is soluble in acids or acidic solutions. Cobalt acetate and cobalt acetylacetonate are exemplary of cobalt-containing precursor compounds soluble in an organic solvent.

Suitable rhenium-containing precursor compounds soluble in water are preferred and include, for example, perrhenic acid, ammonium perrhenate, rhenium pentacarbonyl chloride, rhenium carbonyl, and the like. Suitable ruthenium-containing precursor compounds soluble in water include for example ruthenium carbonyl, $Ru(NH_3)_6.Cl_3$, Ru(III)2,4-pentanedionoate, ruthenium nitrosyl nitrate, and the like. Water-soluble ruthenium-containing precursor compounds are preferred. Suitable platinum-containing precursor compounds soluble in water include, for example, $Pt(NH_3)_4(NO_3)_2$ and the like. Alternatively, the platinum-containing precursor can be soluble in an organic solvent, such as platinum acetyl acetonate soluble in acetone. Suitable boron-containing precursor compounds soluble in water include, for example, boric acid and the like. Alternatively, the boron-containing precursor can be soluble in an organic solvent. Suitable silver-containing precursor compounds soluble in water include, for example, silver nitrate ($AgNO_3$) and the like. Alternatively, the silver-containing precursor can be soluble in an organic solvent. Suitable palladium-containing precursor compounds include palladium nitrate ($Pd(NO_3)_2$) and the like. Suitable palladium-containing precursor compounds soluble in an organic solvent include palladium dioxide ($PdO_2$), which is soluble in acetone, and the like.

The catalyst precursor (e.g., support impregnated with a catalytic metal or a compound thereof and optionally a promoter or a compound thereof) is preferably treated to form the catalyst. The treatment can include drying the catalyst precursor (e.g., drying the impregnated support). Drying preferably occurs at a temperature between about 80° C. and about 150° C. Typically, drying proceeds for from about 0.5 to about 24 hours at a pressure of from about 1 to about 75 atm, more preferably from about 1 to about 10 atm, most preferably at about 1 atm.

Alternatively or in combination to drying, treating the catalyst precursor preferably includes calcining (e.g., calcining the impregnated support). The calcination preferably achieves conversion of any impregnated decomposable compound or salt of a catalyst material to an oxide form of the catalyst material on the stabilized support, for example conversion of the impregnated salt of a catalytic metal to an oxide form. For example and by no limitation, when the catalytic metal includes cobalt and the catalyst precursor includes the stabilized support impregnated with a decomposable salt of cobalt, the calcination preferably proceeds at a temperature of at least about 200° C. Further, the calcination of the catalyst precursor preferably proceeds at a temperature less than the temperature at which loss of support surface area is appreciable. It is believed that, at temperatures above 900° C., loss of support surface area is appreciable. When the catalytic metal includes cobalt, the calcination temperature preferably ranges from about 200° C. to about 900° C. In some embodiments, the calcination of a catalyst precursor which includes cobalt is performed at a calcination temperature from about 350° C. to about 800° C., still more preferably from about 450° C. to about 800° C., and most preferably from about 450° C. to about 755° C. In alternate embodiments, the calcination of a catalyst precursor that includes cobalt is performed at a calcination temperature from about 200° C. to about 450° C., preferably from about 210° C. to about 425° C., more preferably from about 215° C. to about 400° C., still more preferably more preferably from about 215° C. to about 400° C., and most preferably from about 220° C. to about 325° C. Typically, calcining proceeds from about 0.5 to about 24 hours at a pressure of about 0.01 to about 75 atm, more preferably from about 1 to about 10 atm, most preferably at about 1 atm. When the preparation of the catalyst includes a multi-step impregnation of a catalytic metal on the stabilized support, calcination may be performed after each impregnation of the catalytic metal-containing compound and optionally of the promoter-containing compound, or it may be performed after all impregnations have been completed. However, any calcining step of the catalyst precursor after any impregnation following the first calcination preferably proceeds at a temperature of not more than about 500° C., preferably not more than about 450° C., more preferably not more than about 350° C. Alternatively, when the catalyst is used for the production of synthesis gas from one or more hydrocarbon gases, the catalytic metal in the syngas catalyst is selected from the group consisting of rhenium, rhodium, iridium, platinum, palladium, ruthenium, nickel, and combinations thereof; and calcining the catalyst precursor is typically done at a temperature between about 300° C. and about 1200° C., preferably between about 500° C. and about 1100° C.

Calcining at a pressure of about 100 kPa or higher is desirable. The calcining can be performed at pressures from about 0 to about 500 kPa (about 0 to about 5 atm), more preferably from about 100 to about 500 kPa (about 1 atm to about 5 atm), most preferably from about 100 to about 105 kPa (about 1 atm).

The impregnation of catalytic metal and any optional promoter on the support can proceed by multi-step impregnation, such as by two, three, or four impregnation steps. Each impregnation step can include impregnation of any one or combination of a catalytic metal and promoter. Each impregnation step can be followed by any of the above-described treatments of the impregnated support. In particular, each step of impregnating the support to form an impregnated support can be followed by treating the impregnated support to form a treated impregnated support. Thus, a multi-step impregnation can include multiple steps of drying and/or calcination. Each subsequent step of drying can proceed at a different temperature from any earlier steps of drying. Further, each subsequent step of calcination can proceed at a different temperature than the temperature used in any earlier steps of calcination. By way of example and not limitation, a multi-step impregnation can include calcining the support at a first temperature that is higher than the temperature for subsequent calcinations.

The impregnation, drying, and calcination steps may be repeated, for example, until the desired catalytic metal loading is obtained. Each impregnation step may include impregnation of any one or combination of catalytic metal-containing compound and promoter-containing compound. Each subsequent step of drying may proceed at a different temperature from any earlier steps of drying. Further, each subsequent step of calcination may proceed at a different temperature from any earlier steps of calcination.

The resulting catalyst or catalyst precursor, which includes a catalytic metal oxide on the stabilized support (comprising an aluminum oxide structure obtained from a boehmite material), may be ready to use in a catalytic process if the catalyst precursor does not require an activation step or if the catalyst precursor will be activated during said catalytic process (e.g., an in situ reduction step in a reactor vessel in which it is to be used).

The resulting catalyst or catalyst precursor, which includes a metal oxide on a support comprising a stabilized aluminum oxide structure obtained from boehmite, is desirably converted to an active catalyst before using the catalyst, for example to facilitate the Fischer-Tropsch reaction. The catalyst precursor can be activated via a reduction treatment in the presence of a reducing gas at an elevated temperature.

In an embodiment, at least a portion of the metal(s) of the catalytic metal component of the catalysts may be present in a reduced state (i.e., in the metallic state). Therefore, it may be advantageous to activate the catalyst prior to use by a reduction treatment in the presence of a reducing gas at an elevated temperature. The reducing gas preferably includes hydrogen. Typically, the catalyst is treated with hydrogen or a hydrogen-rich gas at a temperature in the range of from about 75° C. to about 500° C., for about 0.5 to about 50 hours at a pressure of about 1 to about 75 atm, preferably at a pressure of about 1 to about 10 atm. Pure hydrogen can be used in the reduction treatment. Moreover, a mixture of hydrogen and an inert gas such as nitrogen or a mixture of hydrogen and other suitable gases, such as carbon monoxide and carbon dioxide, can be used in the reduction treatment. Reduction with pure hydrogen and reduction with a mixture of hydrogen and carbon monoxide are preferred. The amount of hydrogen may range from about 1% to about 100% by volume.

The metal catalyst described above may be used to facilitate any reaction requiring a reduced metal catalyst. That is, the catalyst may be used with various reactants to promote the production of different products. In some embodiments, the catalyst described above is used in a Fischer-Tropsch process for producing synthesis gas or for synthesizing hydrocarbons and/or alcohols.

Process of Producing Synthesis Gas

According to the present invention, a syngas reactor can comprise any of the synthesis gas technology and/or methods known in the art. The hydrocarbon-containing feed is almost exclusively obtained as natural gas. However, the most important component is generally methane. Natural gas comprises at least 50% methane and as much as 10% or more ethane. Methane or other suitable hydrocarbon feedstocks (hydrocarbons with four carbons or less) are also readily available from a variety of other sources such as higher chain hydrocarbon liquids, coal, coke, hydrocarbon gases, and the like. Preferably, the feed comprises at least about 50% by volume methane, more preferably at least about 80% by volume, and most preferably at least about 90% by volume methane. The feed can also comprise as much as about 10% ethane. Similarly, the oxygen-containing gas may come from a variety of sources and will be somewhat dependent upon the nature of the reaction being used. For example, a partial oxidation reaction requires diatomic oxygen as a feedstock, while steam reforming requires only steam. According to the preferred embodiment of the present invention, partial oxidation is assumed for at least part of the syngas production reaction.

Regardless of the source, the hydrocarbon-containing feed and the oxygen-containing feed are reacted under catalytic conditions. Improved catalyst compositions in accordance with the present invention are described herein. They generally are comprised of a catalytic metal, some alloyed, which has been reduced to its active form and with one or more optional promoters on a stabilized catalyst support. Due to the high temperature (i.e., 800° C. or higher) that may be employed in the synthesis gas production process, the stabilized catalyst support that has been subjected to a calcination temperature of about 900° C. or higher during its preparation may be suitable for high-temperature reactions such as catalytic partial oxidation. Preferred calcination temperatures for the stabilized catalyst support of a syngas production catalyst include ranges from about 900° C. to about 1600° C.; alternatively from about 1000° C. to about 1500° C.; and alternatively from about 1100° C. to about 1400° C.

The syngas catalyst compositions according to the present invention comprise an active metal selected from the group consisting of Group VIII metals, rhenium, tungsten, zirconium, their corresponding oxides or ions, and any combinations thereof, preferably a group VII metal or rhenium, more preferably rhodium, indium, ruthenium, rhenium, or combinations thereof. In some embodiments when the active metal is rhodium, rhodium is comprised in a high melting point alloy with another metal. It has been discovered that in addition to the enhanced thermal stability of the support, the high melting point rhodium alloys used in some of these syngas catalysts confer additional thermally stability than non-alloy rhodium catalysts, which may lead to enhanced ability of the catalyst to resist various deactivation phenomena.

Without being limited by theory, in some instances, during syngas reactions, several undesired processes, such as coking (carbon deposition), metal migration, and sintering of metal and/or the support, can occur and severely deteriorate catalytic performance. The catalyst compositions of the present invention are better able to resist at least one of these phenomena over longer periods of time than conventional catalysts. As a consequence, these novel rhodium containing catalysts on the stabilized support derived from a boehmite material comprising a crystalline boehmite with a desired optimum crystallite size can maintain high methane conversion as well as high CO and $H_2$ selectivity over extended periods of time with little to no deactivation of the syngas catalyst.

The support structure of these catalysts can be in the form of a monolith or can be in the form of divided or discrete structures or particulates. Particulates are preferred. Small support particles tend to be more useful in fluidized beds. Preferably at least a majority (i.e., >50%) of the particles or distinct structures have a maximum characteristic length (i.e., longest dimension) of less than 6 millimeters (mm), preferably less than 3 mm, more preferably between 0.8 mm and 3 mm. According to some embodiments, the divided catalyst structures have a diameter or longest characteristic dimension of about 0.5 mm to about 10 mm, preferably between about 0.5 mm and about 6 mm. In other embodiments, they are in the range of about 50 microns to about 6 mm.

The hydrocarbon feedstock and the oxygen-containing gas may be passed over the catalyst at any of a variety of space velocities. Space velocities for the process, stated as gas hourly space velocity (GHSV), are in the range of about 20,000 to about 100,000,000 $hr^{-1}$, more preferably of about 100,000 to about 800,000 $hr^{-1}$, most preferably of about 400,000 to about 700,000 $hr^{-1}$. Although for ease in comparison with conventional systems space velocities at standard conditions have been used to describe the present invention, it is to be understood that residence time is the inverse of space velocity and that the disclosure of high space velocities corresponds to low residence times on the catalyst. "Space velocity," as that term is customarily used in chemical process descriptions, is typically expressed as volumetric gas hourly space velocity in units of $hr^{-1}$. Under these operating conditions, a flow rate of reactant gases is maintained sufficient to ensure a residence or dwell time of each portion of reactant gas mixture in contact with the catalyst of no more than 200 milliseconds, preferably less than 50 milliseconds, and still more preferably less than 20 milliseconds. A contact time less than 10 milliseconds is highly preferred. The duration or degree of contact is preferably regulated so as to produce a favorable balance between competing reactions and to produce sufficient heat to maintain the catalyst at the desired temperature.

The process is operated at atmospheric or super-atmospheric pressures. The pressures may be in the range of about 100 kPa to about 100,000 kPa (about 1-100 atm), preferably from about 200 kPa to about 5,000 kPa (about 2-50 atm). The process is preferably operated at a temperature in the range of about 350° C. to about 2,000° C. More preferably, the temperature is maintained in the range of about 400° C.-2,000° C., or even more preferably in the range of about 600° C.-1,500° C., as measured at the reactor outlet.

The catalysts of the present invention may maintain hydrocarbon conversion of equal to or greater than about 85%, preferably equal to or greater than about 90% after 100 hours of operation when operating at pressures of greater than 2 atmospheres. Likewise, the catalysts of the present invention may maintain CO and $H_2$ selectivity of equal to or greater than about 85%, preferably equal to or greater than about 90% after 100 hours of operation when operating at pressures of greater than 2 atmospheres.

The synthesis gas product contains primarily hydrogen and carbon monoxide, however, many other minor components may be present including steam, nitrogen, carbon dioxide, ammonia, hydrogen cyanide, and the like, as well as unreacted feedstock, such as methane and/or oxygen. The synthesis gas product, i.e., syngas, is then ready to be used, treated, or directed to its intended purpose. The product gas mixture emerging from the syngas reactor may be routed directly into any of a variety of applications, preferably at pressure. For example, in the instant case some or all of the syngas can be used as a feedstock in subsequent synthesis processes, such as Fischer-Tropsch synthesis, alcohol (particularly methanol) synthesis, hydrogen production, hydroformylation, or any other use for syngas. One such preferred application for the CO and $H_2$ product stream is for producing, via the Fischer-Tropsch synthesis, higher molecular weight hydrocarbons, such as hydrocarbons with 5 or more carbon atoms ($C_{5+}$ hydrocarbons).

Syngas may be at a temperature of about 600-1500° C. when leaving a syngas reactor. The syngas may be transitioned to be useable in a Fischer-Tropsch or other synthesis reactors, which operate at lower temperatures from about 200° C. to about 400° C. The syngas may be cooled, dehydrated (i.e., taken below 100° C. to knock out water) and compressed during the transition phase. Thus, in the transition of syngas from the syngas reactor to for example a Fischer-Tropsch reactor, the syngas stream may experience a temperature window of 50° C. to 1500° C.

Fischer-Tropsch Operation

A process for producing hydrocarbons preferably includes contacting a feed stream that includes carbon monoxide and hydrogen with the present catalyst. Alternatively or in combination, a process for producing hydrocarbons includes contacting a feed stream that includes carbon monoxide and hydrogen with a catalyst in a reaction zone to produce hydrocarbons, wherein the catalyst is a catalyst supported on a stabilized catalyst support made according to the present invention.

The feed gas charged to the process for producing hydrocarbons includes hydrogen, or a hydrogen source, and carbon monoxide. $H_2$/CO mixtures suitable as a feedstock for conversion to hydrocarbons according to the process of this invention can be obtained from light hydrocarbons such as methane by means of steam reforming, partial oxidation, or other processes known in the art. Preferably, the hydrogen is provided by free hydrogen, although some Fischer-Tropsch catalysts have sufficient water gas shift activity to convert some water and carbon monoxide to hydrogen and carbon dioxide, which produces hydrogen for use in the Fischer-Tropsch process. It is preferred that the molar ratio of hydrogen to carbon monoxide in the feed be greater than 0.5:1 (e.g., from about 0.67 to 2.5). Preferably, when cobalt, nickel, and/or ruthenium catalysts are used, the feed gas stream contains hydrogen and carbon monoxide in a molar ratio of about 1.6:1 to 2.3:1. Preferably, when iron catalysts are used, the feed gas stream contains hydrogen and carbon monoxide in a molar ratio between about 1.4:1 and 2.3:1. The feed gas may also contain carbon dioxide. The feed gas stream should contain only a low concentration of compounds or elements that have a deleterious effect on the catalyst, such as poisons. For example, the feed gas may need to be pretreated to ensure that it contains low concentrations of sulfur or nitrogen compounds such as hydrogen sulfide, ammonia, hydrogen cyanide, and carbonyl sulfides.

The feed gas is contacted with the catalyst in a reaction zone. Mechanical arrangements of conventional design may be employed as the reaction zone including, for example, plug flow, continuous stirred tank, fixed bed, fluidized bed, slurry phase, slurry bubble column, reactive distillation column, or ebulliating bed reactors, among others. The size and physical form of the catalyst may vary, depending on the reactor in which it is to be used. Plug flow, fluidized bed, reactive distillation, ebulliating bed, and continuous stirred tank reactors have been delineated in "Chemical Reaction Engineering," by Octave Levenspiel, and are known in the art, as are slurry bubble column. A preferred slurry bubble column is described in co-pending commonly assigned U.S. Published Patent Application 2003/0114543, hereby incorporated herein by reference in its entirety.

When the reaction zone includes a slurry bubble column, the column preferably includes a three-phase slurry. Further, a process for producing hydrocarbons by contacting a feed stream including carbon monoxide and hydrogen with a catalyst in a slurry bubble column preferably includes dispersing the particles of the catalyst in a liquid phase comprising the hydrocarbons to form a two-phase slurry and dispersing the hydrogen and carbon monoxide in the two-phase slurry to form the three-phase slurry. Further, the slurry bubble column preferably includes a vertical reactor, and dispersal preferably includes injection and distribution in the bottom half of the reactor.

The Fischer-Tropsch process may be typically run in a continuous mode. In this mode, the gas hourly space velocity through the reaction zone may range from about 50 to about 10,000 $hr^{-1}$, preferably from about 300 $hr^{-1}$ to about 2,000 $hr^{-1}$. The gas hourly space velocity is defined as the volume of reactants per time per reaction zone volume. The volume of reactant gases is at standard conditions (standard pressure of 101 kPa and standard temperature of 0° C.). The reaction zone volume is defined by the portion of the reaction vessel volume where the reaction takes place and which is occupied by a gaseous phase comprising reactants, products and/or inerts; a liquid phase comprising liquid/wax products and/or other liquids; and a solid phase comprising catalyst. The reaction zone temperature may be in the range from about 160° C. to about 300° C. Preferably, the reaction zone is operated at conversion promoting conditions at temperatures from about 190° C. to about 260° C., more preferably from about 205° C. to about 230° C. The reaction zone pressure is typically in the range of about 80 psia (552 kPa) to about 1000 psia (6,895 kPa), more preferably from 80 psia (552 kPa) to about 800 psia (5,515 kPa), and still more preferably from about 140 psia (965 kPa) to about 750 psia (5,170 kPa). Most preferably, the reaction zone pressure is from about 250 psia (1,720 kPa) to about 650 psia (4,480 kPa).

The products resulting from the process may have a great range of molecular weights. Typically, the carbon number range of the product hydrocarbons may start at methane and continue to about 50 to 100 carbons or more per molecule as measured by current analytical techniques. The process is particularly useful for making hydrocarbons having five or more carbon atoms, especially when the above-referenced preferred space velocity, temperature and pressure ranges are employed.

Typically, in the Fischer-Tropsch synthesis, the product spectra can be described by likening the Fischer-Tropsch reaction to a polymerization reaction with a Shultz-Flory chain growth probability, called alpha value ($\alpha$), that is independent of the number of carbon atoms in the lengthening molecule. The alpha value is typically interpreted as the ratio of the mole fraction of the $C_{n+1}$ product to the mole fraction of the $C_n$ product. An alpha value of at least 0.72 is desirable for producing high carbon-length hydrocarbons, such as those of diesel cuts.

The wide range of hydrocarbons produced in the reaction zone may afford liquid phase products at the reaction zone operating conditions. Therefore, the effluent stream of the reaction zone may be a mixed phase stream including liquid and gas phase products. The effluent gaseous stream of the reaction zone can be cooled to condense additional amounts of hydrocarbons and can be passed into a vapor-liquid separation zone separating the liquid and vapor phase products. The gaseous material can be passed into a second stage of cooling for recovery of additional hydrocarbons. The liquid material from the reaction zone together with any liquid from a subsequent separation zone can be fed into a fractionation column. In an embodiment, a stripping column is employed first to remove light hydrocarbons such as propane and butane. The remaining hydrocarbons can be passed into a fractionation column in which they are separated by boiling point range into products such as naphtha, kerosene and fuel oils. Hydrocarbons recovered from the reaction zone and having a boiling point above that of the desired products can be passed into conventional processing equipment such as a hydrocracking zone in order to reduce their molecular weight to that of desired products such as middle distillates and gasoline. The gas phase recovered from the reactor zone effluent stream after hydrocarbon recovery can be partially recycled if it contains a sufficient quantity of hydrogen and/or carbon monoxide.

The invention having been generally described, the following Examples are given as particular embodiments of the invention and to demonstrate the practice and advantages hereof. It is understood that the examples are given by way of illustration and are not intended to limit the specification or the claims to follow in any manner.

EXAMPLES S0-S5

Examples S1-S5 of catalyst supports and catalyst Examples C1-C4 active for the Fischer-Tropsch synthesis were prepared using a boehmite material having an average crystallite size of about 15 nanometers. Support Examples S1-S4 have been stabilized by a structural stabilizer comprising one element (Mg, Co, Si, or Al respectively), and support Example S5 has been stabilized by a co-precipitated silica-alumina. A comparative catalyst support Example S0 was also prepared from the same boehmite material without a structural stabilizer. A description of the preparation of these supports and catalysts Examples S0-S5 and C1-C4 is provided below.

Example S0

Unmodified Catalyst Support

An unmodified support Example S0 was made as a reference with no structural stabilizer using a boehmite material Dispal° 18N4-80 (in the form of a powder and with an average crystallite size of about 15 nm), which is commercially available from Sasol North America. The boehmite material was mixed in deionized water to make a sol with a solid content of about 35% by weight. The sol was then dried at 100° C. for 16 hours. Finally, the dried material was calcined at 725° C. for 4 hours at atmospheric pressure. The catalyst support of S0 contained no structural stabilizer.

Examples S1-S4

Modified Catalyst Supports using a Single Boehmite

Four catalyst support Examples S1-S4 were made with four different structural stabilizers (magnesium, cobalt, silicon, and aluminum) using the same boehmite material (Dispal® 18N4-80 in the form of a powder and with an average boehmite crystallite size of about 15 nm available from Sasol North America) used in Example S0. The boehmite was mixed with one of the following structural stabilizer compounds: magnesium nitrate, cobalt nitrate, silicic acid, or aluminum nitrate for Examples S1-S4, respectively, in deionized water to make a sol with a solid content of about 35% by weight. The sol was then dried at 100° C. for 16 hours. Finally, the dried material was calcined at 725° C. for 4 hours at atmospheric pressure to form the catalyst support. The catalyst support of Examples S1-S4 had a final structural stabilizer content of 2 wt % Mg, 2 wt % Co, 2 wt % Si, and 2 wt % Al, respectively, wherein wt % represents percent by weight based on the total weight of the final catalyst support. Throughout the specification, "wt %", "% by weight", and "percent by weight" are being used interchangeably. It should be noted that, for Example S4, since aluminum was added as a structural stabilizer to the boehmite material, which already comprises about 42 wt % aluminum, the actual nominal composition of aluminum weight in the stabilized catalyst support should be about 43 wt % aluminum, while support Examples S1-S3 have an aluminum content of about 41 wt %.

Example S5

Catalyst Support Modified with Silica-Alumina

The catalyst support Example S5 was made with the addition of a co-precipitated silica-alumina to the same boehmite material (Dispal® 18N4-80 in the form of a powder and with an average boehmite crystallite sizes of about 15 nm available from Sasol North America) used in Examples S0-S4. The boehmite material was mixed in deionized water to make a sol. A low acidity silica-alumina gel with a molar ratio of silica to alumina of 3:1 was prepared by co-precipitating sodium aluminate and sodium silicate with the addition of diluted nitric acid. A hydrogel was obtained within 3 minutes, and the gelation pH was 10.5. The gel was then aged for three days at room temperature. Thereafter, ion exchange was performed with a 1.0 Molar ammonium nitrate solution to convert it from the $Na^+$ to $H^+$ form. Next, the hydrogel was washed with water to remove most of the ammonium nitrate. Finally, the gel was mixed with the boehmite sol to make a mixture with a solid content of about 35% by weight. The mixture was then dried at 100° C. for 16 hours. Finally, the dried material was calcined at 750° C. for 4 hours at atmospheric pressure. The catalyst support of Example S5 had a final structural stabilizer content of about 10 wt % silica-alumina, wherein wt % represents percent by weight based on the total weight of the final catalyst support. With a molar ratio of silica to alumina of 3:1, this resulted in an addition of about 3.6 wt % alumina (ca. 1.9 wt % aluminum) and about 6.4 wt % silica (ca. 3.0 wt % silicon) based on the total weight of the final catalyst support. It should be noted that, for Example S5, since alumina was added as a structural stabilizer to the boehmite material, which already comprises about 42 wt % aluminum, the actual nominal composition of aluminum weight in the stabilized catalyst support Example S5 should be about 40 wt % aluminum.

Examples C1-C4

Catalysts on Stabilized Supports

A multi-step aqueous incipient wetness impregnation method was used to prepare four Fischer-Tropsch catalysts in Examples C1-$C_4$ from, respectively, the support of Examples S1-S4, and derived from boehmite and stabilized with 2 wt % of four different structural stabilizers, Mg, Co, Si, and Al. A solution was prepared by combining cobalt nitrate hexahydrate $[Co(NO_3)_2.6H_2O]$, tetraamineplatinum(II) nitrate $[(NH_3)4Pt(NO_3)_2]$, and boric acid $[H_3BO_3]$. A sample from each of support Examples S1-S4 was impregnated using a portion of the solution prepared above to achieve incipient wetness. The resulting catalyst precursor was dried for 16 hours in an oven at a temperature of about 82° C. The dried catalyst precursor was then calcined in air by raising its temperature at a rate of 1° C./min. to 240° C., followed by holding at this temperature for 4 hours. The above procedure was repeated to obtain the following loadings of Co, Pt, and B on the support: 30 wt. % Co; 0.03 wt. % Pt; and 0.5 wt. % B, wherein the weight % is based on the total weight of the final catalyst. It should be noted that, for Example C2, since cobalt was added as a structural stabilizer in the support, the actual nominal composition of cobalt of the total catalyst weight was approximately about 31.4 wt %. The Co, Pt, and B metal content in the catalyst was calculated by mass balance after drying and calcination.

Characteristics of Support Examples S0-S5 and Catalyst Examples C1-C4

Several properties (BET Surface Area, average pore volume and average pore diameter) of the support materials from Examples S0-S5 and the catalysts from Examples C1-C4 are shown in Table 1. The BET surface area, average pore volume, and average pore diameter were measured by the BJH desorption method using $N_2$ as the adsorptive material of catalysts and supports. Surface area and pore size distribution were obtained on a Micromeritics TRISTAR 3000 analyzer after degassing the sample at 190° C. in flowing nitrogen for five hours. Surface area was determined by taking ten points in the nitrogen adsorption isotherm between 0.05 and 0.3 relative pressure and by calculating the surface area by the standard BET procedure. Pore size distribution was determined from a minimum of 30 points in the nitrogen desorption isotherm and calculated using the BJH model for cylindrical pores. The instrument control and calculations were performed using the TriStar software and are consistent with ASTM D3663-99 entitled "Surface Area of Catalysts and Catalyst Carriers," ASTM D4222-98 entitled "Determination of Nitrogen Adsorption and Desorption Isotherms of Catalysts by Static Volumetric Measurements," and ASTM D4641-94 entitled "Calculation of Pore Size Distributions of Catalysts from Nitrogen Desorption Isotherms." The initial surface area (A) of the catalyst was determined as the surface area of the catalyst structure prior to contact of reactant gas. The average pore volume (V) of the catalyst ($N_2$ as adsorptive material) was measured and calculated using the method described above. Average pore size (diameter) was calculated as 4V/A.

TABLE 1

Properties of the Supports and Catalysts

| EXAMPLES # | Structural Stabilizer Content on Support, wt % | Catalyst composition, wt % | BET Surface Area, $m^2/g$ | Avg. Pore Volume, ml/g | Avg. Pore Diameter, nm |
|---|---|---|---|---|---|
| S0 | — | — | 128 | 0.45 | 14 |
| S1 | 2 wt % Mg | — | 122 | 0.47 | 16 |
| C1 | 2 wt % Mg | 30 Co/0.03 Pt/0.5 B | 67 | 0.22 | 13 |
| S2 | 2 wt % Co | — | 127 | 0.53 | 17 |
| C2 | 2 wt % Co | 30 Co/0.03 Pt/0.5 B | 68 | 0.24 | 14 |
| S3 | 2 wt % Si | — | 176 | 0.52 | 12 |
| C3 | 2 wt % Si | 30 Co/0.03 Pt/0.5 B | 88 | 0.25 | 11 |
| S4 | 2 wt % Al | — | 109 | 0.46 | 17 |
| C4 | 2 wt % Al | 30 Co/0.03 Pt/0.5 B | 59 | 0.18 | 12 |
| S5 | 10 wt % $SiO_2$:$Al_2O_3$ | — | 197 | 0.56 | 11 |

As shown in Table 1, the introduction of magnesium, cobalt and silicon, or of a co-precipitated silica-alumina into the aluminum structure of the support Examples S1-S3 and S5 resulted in a maintenance of surface area (ca. 122 $m^2/g$ and ca. 127 $m^2/g$ for magnesium and cobalt respectively) and pore volume (ca. 0.47 ml/g for magnesium) or in an increase in surface area (ca. 176 $m^2/g$ and 197 $m^2/g$ with silicon and silica-alumina, respectively) and pore volume (ca. 0.53 ml/g; ca 0.52 ml/g; and ca. 0.56 ml/g with silicon, cobalt, and silica-alumina, respectively). Thus, the addition of these four structural stabilizers to boehmite followed by drying/calcination maintained improved pore structures of the resulting aluminum-containing matrices. After deposition of the catalytically active material and promoters on the stabilized supports to produce catalysts, the BET surface area and average pore volume of the catalyst Examples C1-$C_4$ were about half of those of the corresponding stabilized support Examples S1-S4 (a BET drop of about the atoms about 50%). The reduction in surface area and pore volume in the catalysts was expected as the atoms of the catalytically active material and of promoters deposited on the surface of the pores, thereby decreasing the available surface areas of the pores and the available volume within the pores.

Hydrothermal Stability of Examples S0-S5 and C1-C4

The hydrothermal stability of catalyst support Examples S0-S5 and catalyst Examples C1-C4 was determined using a steaming test. The steaming test comprised exposing a 1-g catalyst sample to about 15 g of water in an autoclave at a temperature of 225° C. and a pressure of 375 psig (approximating the Fischer-Tropsch operating conditions) for 2 hours. The catalyst sample was cooled down to room temperature (about 18-20° C.) and then dried at about 80° C. for about 5 hours. Two samples (before and after steam treatment) were then analyzed for changes in surface area and pore size (average pore volume and diameter). Both samples were measured by the BJH desorption method as described above. The results for non-stabilized (unmodified) calcined support Example S0, stabilized supports Examples S1-S5 and catalyst Examples C1-$C_4$ made therefrom are shown in the FIG. 3.

Figure 3:
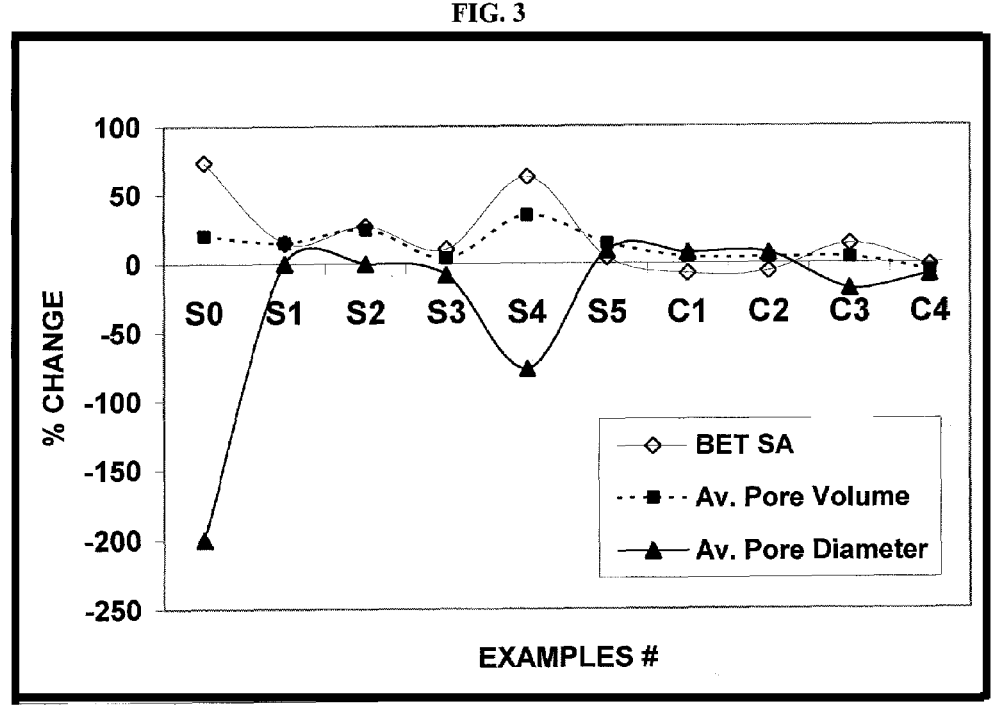
FIG. 3 illustrates the hydrothermal stability of non-stable and stable supports.

FIG. 3 shows the relative percentage of change (increase or decrease) in average pore volume, average pore diameter and BET surface area, which was calculated by the following formula:

$$\% \text{ change} = \frac{(\text{value before steam test} - \text{value after steam test})}{(\text{value before steam test})}$$

A positive (negative) % change indicates a decrease (increase) in a specific property, and a 0% value indicates no change in the specific property after a steam test. All three support catalyst Examples S1-S3 modified by a structural stabilizer comprising one element: (Mg, Co, or Si) and the support catalyst Example S5 modified by a co-precipitated silica-alumina showed better conservation (least amount of change) in average pore volume, average pore diameter and BET surface area, after the steaming test, than the unmodified support Example S0 derived from the same boehmite material but calcined without a structural stabilizer. Hence, modification of the boehmite material with one element (magnesium, cobalt, or silicon) or with a co-precipitated silica-alumina resulted in a catalyst support with improved hydrothermal stability. Catalysts made therefrom conserved the improved hydrothermal stability.

Catalyst Performance of Examples C1-C3

The Fischer-Tropsch catalysts Examples C1-C3 that were prepared with supports derived from boehmite and stabilized with one structural stabilizer were separately placed in a fixed bed reactor to measure their catalytic performance in the conversion of synthesis gas to hydrocarbons during a Fischer-Tropsch process. The 1-gram catalyst samples diluted with about 12 grams of alpha-alumina to make a total diluted catalyst bed volume of about 10 ml was placed in the tubular ¼-inch i.d. stainless steel reactor. It was first activated in situ by heating to 400° C. at a heating rate of 1° C./min, with the temperature maintained for 16 hours under a flowing gas comprising 50% $H_2$ in nitrogen at 200 standard cubic centimeters per minute (sccm) at atmospheric pressure. The temperature was then reduced to about 210° C. in flowing nitrogen. Once at about 210° C., the nitrogen was replaced by a mixture of 60% $H_2$, 30% CO and 10% $N_2$ at a total pressure of 350 psig. The gas flow was adjusted to 100 sccm to give a gas hourly space velocity (GHSV) of 6,000 $hr^{-1}$, which was measured as the volume of reactant gas at standard pressure and temperature per hour per volume of active catalyst bed. After 24 hours on stream, the temperature was increased to about 220° C., Product mass balance, on-line gas analysis and compositional analysis of the collected liquid and wax were done every 24 hours by conventional gas chromatography methods. The performance (CO conversion, alpha value, $C_1$ make, $C_{5+}$ productivity) of these three catalysts Examples C1-C3 versus the time on stream (TOS) in the fixed bed reactor were then compared, as shown in Table 2 below.

TABLE 2

Fixed-Bed Results for Examples C1-C3

| Catalyst EXAMPLES (with Stabilizer Content) | TOS, hrs | Temp., ° C. | CO Conv., % | alpha value | $C_{5+}$, g/h/kgcat | $C_1$, wt. % |
|---|---|---|---|---|---|---|
| C1 (with 2% Mg) | 24 | 210 | 46.1 | 0.90 | 481 | 7.9 |
| C2 (with 2% Co) | 24 | 210 | 51.1 | 0.89 | 539 | 6.4 |
|  | 48 | 220 | 73.4 | 0.90 | 734 | 9.6 |
|  | 72 | 220 | 69.8 | 0.90 | 700 | 9.3 |
| C3 (with 2% Si) | 24 | 210 | 46.4 | 0.92 | 480 | 7.8 |
|  | 48 | 220 | 73.1 | 0.92 | 728 | 9.4 |
|  | 72 | 220 | 74.0 | — | 735 | 9.3 |

Data in Table 2 indicate that the catalyst Examples C1-C3 were active for the Fischer-Tropsch synthesis. Furthermore, addition of the structural modifiers to the support did not appear to adversely affect the catalyst activity. As shown in Table 2, catalyst Examples C1-C3 showed similar initial CO conversion, alpha value, $C_{5+}$ productivity, and methane ($C_1$) make, which suggests each of the three modifiers (Si, Co, Mg) would be acceptable. (Data for catalyst Example C1 were only available for one day.) Therefore, catalysts prepared by the modification of boehmite with a structural stabilizer selected from the group consisting of Mg, Co and Si exhibited good Fischer-Tropsch synthesis activity.

Examples C5-C10

Catalysts Made from a Single Boehmite

The next five examples $C_5$-$C_9$ of a Fischer-Tropsch catalyst were prepared using boehmites having various single average crystallite sizes. The sixth example C10 (a comparative example) was a conventional Fischer-Tropsch catalyst prepared from gamma-alumina instead of boehmite. A description of the preparation of the Examples C5-C10 is provided below.

Example C5

A boehmite alumina support material commercially available from Alcoa, Inc. (Houston, Tex.) under the tradename Hi Q® 502-02 (with an average crystallite size of 8.4 nm) was first pretreated. That is, it was spray-dried by mixing the boehmite alumina support material in deionized water to achieve a solid content of about 35% by weight of the solution. The solution was then passed through a Mobile Minor spray-drier (type H, Model 2000, available from Niro Inc.) having an inlet temperature of about 250° C. and an outlet temperature of about 100° C., such that the spray-drier had a solid outlet flow of from about 40 g/min to about 80 g/min. To finish the pretreatment, the spray-dried boehmite material was then preheated (i.e., pre-calcined in air) at 325° C. for 2 hours at atmospheric pressure.

A multi-step aqueous incipient wetness impregnation method was used to prepare a Fischer-Tropsch catalyst from the pretreated boehmite support material. A solution was prepared by combining cobalt nitrate hexahydrate [$Co(NO_3)_2 \cdot 6H_2O$], tetraamineplatinum(II) nitrate [$(NH_3)_4Pt(NO_3)_2$], and boric acid [$H_3BO_3$]. The pretreated boehmite support material was impregnated using a portion of the solution prepared above to achieve incipient wetness. The resulting catalyst precursor was dried for 16 hours in an oven at a temperature of about 82° C. The dried catalyst precursor was then calcined in air by raising its temperature at a rate of 1° C./min. to 750° C., followed by holding at this temperature for 4 hours. The above procedure was repeated to obtain the following loading of Co, Pt, and B on the support: 30 wt. % Co; 0.03 wt. % Pt; and 0.5 wt. % B, wherein the weight % is based on the total weight of the final catalyst. However, in the subsequent calcination(s), a lower calcination temperature of 240° C. was used.

Example C6

The procedure of Example C5 was followed except that a boehmite alumina support material commercially available from Sasol North America Inc. (Houston, Tex.) under the tradename Dispal® 23N4-80 (with an average crystallite size of about 10 nm) was used to prepare the Fischer-Tropsch catalyst.

Example C7

The procedure of Example C5 was followed except that a boehmite alumina support material commercially available from Sasol under the tradename Dispal® 18N4-80 (with an average crystallite size of about 15 nm) was used to prepare the Fischer-Tropsch catalyst.

Example C8

The procedure of Example C5 was followed except that a boehmite alumina support material commercially available from Sasol under the tradename Dispal® 14N4-80 (with an average crystallite size of about 25 nm) was used to prepare the Fischer-Tropsch catalyst.

Example C9

The procedure of Example C5 was followed except that a boehmite alumina support material commercially available from Alcoa, Inc. (Houston, Tex.) under the tradename Hi Q® 180E (with an average crystallite size of about 34.5 nm) was used to prepare the Fischer-Tropsch catalyst.

Example C10

A multi-step aqueous incipient wetness impregnation method was used to prepare a Fischer-Tropsch catalyst. First, a solution was prepared by combining cobalt nitrate hexahydrate $[Co(NO_3)_2 \cdot 6H_2O]$, tetraamineplatinum(II) nitrate $[(NH_3)4Pt(NO_3)_2]$, and boric acid $[H_3BO_3]$. A gamma-alumina support material commercially available from Sasol under the tradename Puralox® SCCa 5/150 was then impregnated using a portion of the solution prepared above to achieve incipient wetness. The resulting catalyst precursor was dried for 16 hours in an oven at a temperature of about 82° C. The dried catalyst precursor was then calcined in air by raising its temperature at a rate of 1° C./min. to 240° C., followed by holding at this temperature for 4 hours. The above procedure was repeated to obtain the following loading of Co, Pt, and B on the gamma-alumina support: 25 wt. % Co; 0.03 wt. % Pt; and 0.5 wt. % B, wherein the weight % is based on the total weight of the final catalyst.

Examples C11-C13

Catalysts Made from Two Boehmites

The next three examples C11-C13 of a catalyst were prepared using a mixture of boehmites having two different average crystallite sizes. A description of the preparation of these three Examples C11-C13 is provided below.

Example C11

Equal weights of two boehmite support materials (Sasol Dispal® 23N4-80 with an average crystallite size of about 10 nm and Dispal® 18N4-80A with an average crystallite size of about 10 nm) were dispersed in water, spray dried, and preheated (as described in Example C5) to form a pretreated mixed-boehmite material. Again, a multi-step aqueous incipient wetness impregnation method was used to prepare a Fischer-Tropsch catalyst. First, a solution was prepared by combining cobalt nitrate hexahydrate $[Co(NO_3)_2 \cdot 6H_2O]$, tetraamineplatinum(II) nitrate $[(NH_3)4Pt(NO_3)_2]$, and boric acid $[H_3BO_3]$. The mixed-boehmite material was then impregnated using a portion of the solution prepared above to achieve incipient wetness. The resulting catalyst precursor was dried for 16 hours in an oven at a temperature of about 82° C. The dried catalyst precursor was then calcined in air by raising its temperature at a rate of 1° C./min. to 750° C., followed by holding at this temperature for 4 hours. The above procedure was repeated except that in the subsequent calcination(s), a lower calcination temperature of 240° C. was used. As a result of the calcination, the calcined impregnated mixed-boehmite sample was converted to a catalyst supported on a stabilized aluminum oxide structure; and the catalyst had the following loading of Co, Pt, and B: 30 wt. % Co; 0.03 wt. % Pt; and 0.5 wt. % B, wherein the weight % is based on the total weight of the final catalyst.

Example C12

The procedure of Example C11 was followed except that two boehmite support materials commercially available from Sasol under the tradenames Disperal® P2 Dispal® 18N480 with respective average boehmite crystallite sizes of 4 nm and 15 nm were dispersed together in water, spray dried, and preheated at 325° C. (as described in Example C5) to form a pretreated mixed-boehmite material comprising 4 wt % of the Disperal® P2 boehmite and 96 wt % of the Dispal® 18N4-80 boehmite.

Example C13

The procedure of Example C11 was followed except that two boehmite support materials commercially available from Sasol under the tradenames Disperal® P2 and Dispal®23N4-80 with respective average boehmite crystallite sizes of 4 nm and 10 nm were dispersed together in water, spray dried, and preheated (as described in Example C5) to form a pretreated mixed-boehmite material comprising 4 wt % of the Disperal® P2 boehmite and 96 wt % of the Dispal® 23N4-80 boehmite.

Example C14

Catalysts Made from a Pretreated Boehmite

The example C14 represents a boehmite support material that was subjected to a pretreatment process. A description of the preparation of this example C14 is provided below.

A boehmite material commercially available from Sasol under the tradename Dispal® 14N4-80 (with an average crystallite size of about 25 nm) was pretreated. That is, it was spray-dried by mixing the boehmite material in deionized water to achieve a solid content of about 35% by weight of the solution. The solution was then passed through a Mobile Minor spray-drier (type H, Model 2000, available from Niro Inc.) having an inlet temperature of about 250° C. and an outlet temperature of about 100° C., such that the spray-drier had a solid outlet flow of from about 40 g/min to about 80 g/min. To finish the pretreatment, the spray-dried boehmite material was then preheated (i.e., pre-calcined in air) at 325° C. for 2 hours at atmospheric pressure.

Figure 4:
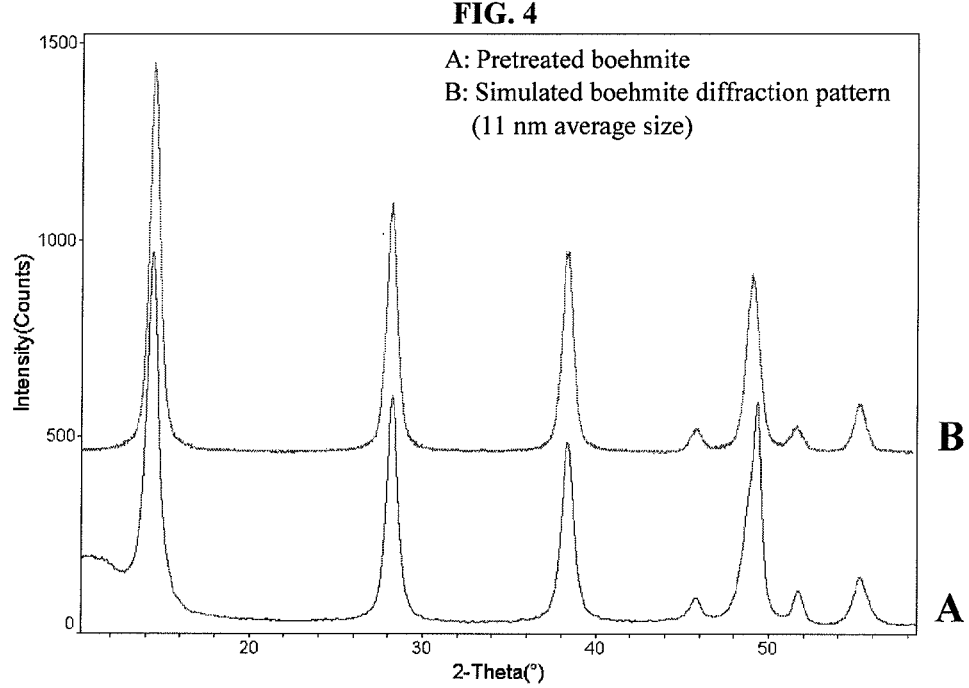
FIG. 4 is a XRD graph of pretreated boehmite and of a simulated boehmite diffraction pattern.

FIG. 4 depicts a XRD graph of the pretreated boehmite material and of a simulated boehmite diffraction pattern. As can be seen in FIG. 4 the diffraction pattern of the pretreated boehmite material is very similar to that of the simulated pattern. Thus, FIG. 4 illustrates that pretreating the boehmite (i.e., preheating at 325° C. for 2 hours at atmospheric pressure) does not convert the boehmite to an aluminum oxide structure.

Attrition Resistance of Example C7

During the preparation of Example C7 (boehmite with average 15-nm crystallites), the attrition resistance of the support material was tested before and after pretreatment using the ASTM method D-5757-95. After the pretreatment, the pretreated boehmite had a lower attrition index (1.1) compared to the untreated boehmite (3.2), indicating that the pretreated boehmite yielded a more attrition resistant material. Since the deposition of active metals and promoters did not greatly affect the attrition resistance of the deposited support, it is expected that the catalyst prepared with a pretreated boehmite material would have better attrition resistance than the catalysts made with boehmite materials without pretreatment.

Characteristics of Supports and Catalysts Materials of Examples C5-C13

Several properties (BET surface area, pore volume and average pore diameter) of the boehmite support materials prepared in Examples C5-C11 were measured and are shown in Table 3 below. Similarly, several properties (BET surface area, pore volume, average pore diameter, cobalt average crystallite size and phase) of the catalysts prepared in Examples C5-C13 were measured and are shown in Table 4 below. Those same properties of the gamma-alumina and of the catalyst prepared therefrom in Example C10 are also shown in both Tables 3 and 4.

The average crystallite size and crystallite cobalt phase were both determined by X-ray diffraction (XRD). The XRD method is disclosed, for example, in Klug & Alexander, X-ray diffraction procedures for polycrystalline and amorphous materials, John Wiley & Sons, $2^{nd}$ Edition, 1974, which is incorporated by reference herein. This reference includes the formula that was used to calculate the average crystallite size (page 656).

The BET Surface Area, average pore volume and average pore diameter were measured by the BJH desorption method using $N_2$ as the adsorptive material of commercially available unmodified $\gamma$-$Al_2O_3$ and stabilized catalyst supports.

Catalyst Performance of Examples C5-C13

The Fischer-Tropsch catalysts prepared in Examples C5-C13 were separately placed in a fixed bed reactor to measure their catalytic performance in the conversion of synthesis gas to hydrocarbons during a Fischer-Tropsch process. The fixed bed reactor was operated at a pressure of 360 psig, a temperature of 220° C., and a space velocity of 6 NL/h/g catalyst. The performance (CO conversion, $C_1$ make, and $C_{5+}$ productivity in gram of $C_{5+}$ hydrocarbons per hour per kilogram of catalyst) of these nine catalysts versus the time on stream (TOS) in the fixed bed reactor was then compared, as shown in Table 5 below.

TABLE 3

Characterization of stabilized supports

| Stab. Support for Ex. | Support precursor type | Source | Boehmite Material Avg. Crystallite Size, nm | Support BET Surface Area, $m^2/g$ | Support Pore Volume, cc/g | Support Avg. Pore Diameter, nm |
|---|---|---|---|---|---|---|
| C5 | Boehmite Hi Q ® 502-02 | Alcoa | 8.4 | 285 | 0.24 | 3.4 |
| C6 | Boehmite Dispal ® 23N4-80 | Sasol | 10 | 186 | 0.30 | 6.5 |
| C7 | Boehmite Dispal ® 18N4-80 | Sasol | 15 | 133 | 0.30 | 9.1 |
| C8 | Boehmite Dispal ® 14N4-80 | Sasol | 25 | 79 | 0.36 | 19 |
| C9 | Boehmite Hi Q ® 180E | Alcoa | 34.5 | 22 | 0.16 | 30 |
| C10 | Gamma-alumina Puralox ® SCCa 5/150 | Sasol | — | 137 | 0.48 | 14 |
| C11 | Mixed Boehmites Dispal ® 23N4-80:18N4-80 | Sasol | 10 (50 wt %) 15 (50 wt %) | 172 | 0.32 | 7.4 |

TABLE 4

Characterization of stabilized Co-based catalysts

| Ex # | Boehmite material Type | Catalyst BET Surface Area, $m^2/g$ | Catalyst Pore Volume, cc/g | Avg. Pore Diameter of Catalyst, nm | XRD (Avg. Crystallite Size of cobalt, Phase) |
|---|---|---|---|---|---|
| C5 | Boehmite Hi Q ® 502-02 | 63 | 0.12 | 7.3 | 16.1, $Co_3O_4$ |
| C6 | Boehmite Dispal ® 23N4-80 | 81 | 0.19 | 9.4 | 11.6, $Co_3O_4$ |
| C7 | Boehmite Dispal ® 18N4-80 | 75 | 0.20 | 10.6 | 12.5, $Co_3O_4$ |
| C8 | Boehmite Dispal ® 14N4-80 | 54 | 0.22 | 15 | 18.0, $Co_3O_4$ |
| C9 | Boehmite Hi Q ® 180E | 42 | 0.23 | 22 | 23.0, $Co_3O_4$ |
| C10 | Gamma-alumina Puralox ® SCCa 5/150 | 94 | 0.25 | 10.8 | 14.2, $Co_3O_4$ |
| C11 | Mixed Boehmites Dispal ® 23N4-80:Dispal ® 18N4-80 (50:50) | 68 | 0.17 | 10.1 | 16.5, $Co_3O_4$ |
| C12 | Mixed Boehmites Disperal ® P2:Dispal ® 18N4-80 (4:96) | 91 | 0.19 | 7.7 | nd |
| C13 | Mixed Boehmites Disperal ® P2:Dispal ® 23N4-80 (4:96) | 91 | 0.20 | 7.9 | nd | nd: not determined

TABLE 5

Fixed bed performance of Examples C5-C13

| Ex No. | Boehmite Material | Catalyst Composition on Stabilized Support | TOS, h | CO conv., % | $C_1$, wt. % | $C_{5+}$, g/h/kg Cat. |
|---|---|---|---|---|---|---|
| C5 | Boehmite Hi Q ® 502-02 | 30% Co/0.03% Pt/0.5% B | 96 | 50 | 9.4 | 495 |
| C6 | Boehmite Dispal ® 23N4-80 | 30% Co/0.03% Pt/0.5% B | 72 | 61 | 8.4 | 621 |
| C7 | Boehmite Dispal ® 18N4-80 | 30% Co/0.03% Pt/0.5% B | 72 | 76 | 9.0 | 753 |
| C8 | Boehmite Dispal ® 14N4-80 | 30% Co/0.03% Pt/0.5% B | 96 | 69 | 9.3 | 686 |
| C9 | Boehmite Hi Q ® 180E | 30% Co/0.03% Pt/0.5% B | 48 | 47 | 9.4 | 465 |
| C10 | Gamma-alumina Puralox ® SCCa 5/150 | 25% Co/0.03% Pt/0.5% B | 96 | 62 | 10 | 604 |
| C11 | Mixed Boehmites Dispal ® 23N4-80:Dispal ® 18N4-80 (50:50) | 30% Co/0.03% Pt/0.5% B | 72 | 69 | 8.9 | 686 |
| C12 | Mixed Boehmites Disperal ® P2:Dispal ® 18N4-80 (4:96) | 30% Co/0.03% Pt/0.5% B | 72 | 73 | 8.9 | 706 |
| C13 | Mixed Boehmites Disperal ® P2:Dispal ® 23N4-80 (4:96) | 30% Co/0.03% Pt/0.5% B | 72 | 55 | 9.4 | 550 |

Based on the results in Table 5, the higher amounts of $C_{5+}$ hydrocarbons were the ones formed in Examples C6, C7, and C8, which were derived from a single boehmite having average crystallite sizes of 10 nm, 15 nm, and 25 nm, respectively, and those formed in Examples C11 and C12 from a mixture of 10 and 15 nm boehmites and a mixture of 4 and 15 nm boehmites, respectively. The catalysts derived from a single boehmite material having an average crystallite size of 8.4 nm (Examples C5) or of 34.5 nm (Example C9) or from mixed boehmites having average crystallite sizes of 4 and 10 nm (Example C13) yielded much lower % conversions of CO (below 60%) and lower productivities of $C_{5+}$ hydrocarbons (below 600 g/h/kg Cat), than that obtained with Examples C6-C8 and Example C10 (based on gamma-alumina). As such, the catalysts derived from boehmite having 10 nm, 15 nm, and 25 nm average crystallite sizes preformed better than the cobalt-based catalysts derived from boehmite having smaller (8.4 nm) and larger (34.5 nm) crystallites.

Fischer-Tropsch catalysts prepared in Examples C5-C7 were also separately placed in a continuously stirred tank reactor (CSTR) to facilitate the conversion of syngas to hydrocarbons during a Fischer-Tropsch process. The CSTR was operated at a pressure of 350 psig, a temperature of 225° C., and a space velocity of 9 normal liters per hour per gram of catalyst (NL/hr/g catalyst). The performance (CO conversion, $C_1$ make, and $C_{5+}$ productivity in gram of $C_{5+}$ hydrocarbons per hour per kilogram of catalyst) of these three catalysts in the CSTR were then compared, as shown in Table 6 below.

TABLE 6

CSTR performance of Examples C5-C7

| Time, h | CO % Conversion | $C_1$, wt. % | $C_5^+$, g/h/kgcat |
|---|---|---|---|
| Example C5: (30% Co/0.03% Pt/0.5% B on a stabilized support derived from a boehmite with a 8.4 nm average crystallite size) | | | |
| 27 | 13.3 | 9.2 | 212 |
| 51 | 15.7 | 9.4 | 250 |
| 75 | 17.8 | 9.6 | 280 |
| 148 | 19.4 | 10.1 | 300 |
| Example C6: (30% Co/0.03% Pt/0.5% B on a stabilized support derived from a boehmite with a 10 nm average crystallite size) | | | |
| 84 | 35.5 | 10.9 | 534 |
| 105 | 41.6 | 8.1 | 657 |
| 130 | 39.4 | 8.6 | 615 |
| Example C7: (30% Co/0.03% Pt/0.5% B on a stabilized support derived from a boehmite with a 15 nm average crystallite size) | | | |
| 52 | 51.0 | 7.3 | 812 |
| 80 | 49.4 | 7.4 | 798 |
| 113 | 49.4 | 6.5 | 801 |
| 147 | 42.0 | 8.1 | 656 |
| 172 | 40.1 | 8.2 | 618 |

Drawing attention to Table 6, the catalysts derived from the single boehmites with a 10 nm average crystallite size (Example C6) and with a 15 nm average crystallite size (Example C7) generally yielded relatively higher % conversions of CO and relatively higher amounts of $C_5^+$ hydrocarbons than the catalyst derived from the single boehmite having a 8.4 nm boehmite average crystallite size (Example C5). This better performance of Examples C6 and C7 compared to Example C5 in a CSTR confirmed the results obtained in the fixed bed reactor as shown in Table 5.

Hydrothermal Stability of Examples C6, C10, C11 and C12

The hydrothermal stability of some of the catalyst examples C6, C10, C11 and C12 was determined using a steaming test. The steaming test comprised exposing a 1 g catalyst sample to about 15 g of water in an autoclave at a temperature of 225° C. and a pressure of 375 psig (approximating the Fischer-Tropsch operating conditions) for 2 hours. The catalyst sample was cooled down to room temperature (about 18-20° C.) and then dried at about 80° C. for about 5 hours. Two samples (before and after steam treatment) were then analyzed for changes in surface area and pore size. Both samples were measured by the BJH desorption method as described above. The results for Examples C6, C10, C11 and C12 are shown in Table 7. Both examples C6 and C11, which were derived from, respectively, a single boehmite material and mixed 50:50 boehmite materials of average crystallite sizes of 10 nm and 15 nm, showed better hydrothermal stability than Example 6, which was derived from gamma-alumina. That is, both the surface area and the pore size did not change as much after the steam treatment. However, Example C12, which had mixed 4:96 boehmite materials of average crystallite sizes of 4 nm and 15 nm, was not as hydrothermally resistant as the other 3 examples C6, C10, C11.

at a temperature of about 82° C. The dried catalyst precursor was then calcined in air by raising its temperature at a rate of 1° C./min. to 240° C. followed by holding at this temperature for 4 hours. The above procedure was repeated in the subsequent calcination(s). As a result of the calcination, the calcined impregnated mixed-boehmite sample was converted to a catalyst supported on a stabilized aluminum oxide structure; and the catalyst had the following loading of Co, Pt, and B: 25 wt. % Co; 0.03 wt. % Pt; and 0.5 wt. % B, wherein the weight % is based on the total weight of the final catalyst.

TABLE 7

Steam test results for Examples C6, C10, C11 and C12

| Ex. | Support precursor | Catalyst BET, $m^2$/g catalyst | | | Catalyst Avg. Pore size, nm | | |
|---|---|---|---|---|---|---|---|
| | | Before steam | After steam | % change | Before steam | After steam | % change |
| C10 | Gamma-alumina | 94 | 113 | 20 | 10.8 | 9.1 | 16 |
| C6 | Single boehmite (10 nm) | 86 | 96 | 11 | 8.2 | 7.4 | 13 |
| C11 | Mixed boehmites (10 nm and 15 nm with a 50:50 weight ratio) | 68 | 64 | 6 | 10.1 | 9.1 | 10 |
| C12 | Mixed boehmites (4 nm and 15 nm with a 4:96 weight ratio) | 91 | 70 | 23 | 7.7 | 11.0 | 43 |

Examples S15-S19 and C15-C19

Catalysts and Supports Made from Mixed Boehmites and Colloidal Silica

The next five Examples C15-C19 of a Fischer-Tropsch catalyst supported on their respective support Examples S15-S19 were prepared using a mixture of boehmites having two different average crystallite sizes. A description of the preparation of the Examples C15-C19 is provided below.

Examples S15 and C15

Two boehmite support materials commercially available from Sasol under the tradenames Dispal® 18N4-80 and Dispal® 14N4-80 with respective average boehmite crystallite sizes of 15 nm and 25 nm were dispersed together in water to form a mixed-boehmite material comprising 50 wt % of the Dispal® 18N4-80 boehmite and 50 wt % of the Dispal® 14N4-80 boehmite. Then, a colloidal solution of silica comprising 3% Si (Ludox® available from Grace Davison) was added to this boehmite mix and mixed well. Finally, this sol was spray dried using a Mobile Minor spray-drier (type H, Model 2000, available from Niro Inc.) having an inlet temperature of about 260° C. and an outlet temperature of about 105° C. To finish the pretreatment, the spray-dried boehmite material was then preheated (i.e., pre-calcined in air) at 750° C. for 2 hours at atmospheric pressure. This generated the stabilized support S115 for catalyst Example C15.

A multi-step aqueous incipient wetness impregnation method was used to prepare a Fischer-Tropsch catalyst. First, a solution was prepared by combining cobalt nitrate hexahydrate $[Co(NO_3)_2 \cdot 6H_2O]$, tetraamineplatinum(II) nitrate $[(NH_3)_4Pt(NO_3)_2]$, and boric acid $[H_3BO_3]$. The mixed-boehmite material was then impregnated using a portion of the solution prepared above to achieve incipient wetness. The resulting catalyst precursor was dried for 16 hours in an oven Example S16 and C16

The procedure of Example C15 was followed except that 55 wt % of the Dispal® 18N4-80 and 45 wt % of the Dispal® 14N$_4$-80 were mixed to form the stabilized support S16. The catalyst Example C16 had the same metal loading as the catalyst Example C15.

Example S17 and C17

The procedure of Example C15 was followed except that 65 wt % of the Dispal® 18N4-80 and 35 wt % of the Dispal® 14N4-80 were mixed to form the stabilized support S17. The catalyst Example C17 had the same metal loading as the catalyst Example C15.

Example S18 and C18

The procedure of Example C15 was followed except that Dispal® 18N4-80 and Dispal® 11N7-80 with respective average boehmite crystallite sizes of 15 nm and 35 nm were used in the respective proportions: 85 wt % and 15 wt % to form the stabilized support S18, and the catalyst had the following loading of Co, Pt, and B: 27.5 wt. % Co; 0.03 wt. % Pt; and 0.5 wt. % B, wherein the weight % is based on the total weight of the final catalyst.

Catalyst Performance Examples C15-C18

The catalyst Examples C15-C18 were separately placed in a fixed bed reactor to measure their catalytic performance in the conversion of synthesis gas to hydrocarbons during a Fischer-Tropsch process, using the same method of testing as described for Examples C5-C13. The fixed bed reactor was operated at a pressure of 360 psig, a temperature of 210 to 220° C., and a space velocity of 6 NL/h/g catalyst. The performance (CO conversion, $C_1$ make, and $C_{5+}$ productivity in gram of $C_{5+}$ hydrocarbons per hour per kilogram of catalyst)

of these 4 catalysts versus the time on stream (TOS) in the fixed bed reactor was then compared, as shown in Table 8 below.

TABLE 8

Fixed-bed results of Examples C15-C18

| Catalyst | Temp. °C. | Age hrs | CO Conv. % | Alpha (α) | $C_{5+}$ g/h/kgcat | $C_1$ wt. % | $CO_2/CO$ mole % |
|---|---|---|---|---|---|---|---|
| C15 | 210 | 24 | 68.3 | 0.90 | 700 | 8.4 | 0.0 |
| | 210 | 48 | 31.6 | 0.89 | 292 | 17.6 | 0.0 |
| | 210 | 72 | 32.0 | 0.92 | 296 | 17.3 | 0.0 |
| | 220 | 96 | 74.0 | 0.90 | 703 | 13.7 | 0.9 |
| | 220 | 120 | 72.4 | 0.88 | 868 | 13.9 | 0.8 |
| | 220 | 144 | 66.1 | 0.89 | 614 | 15.1 | 0.8 |
| | 220 | 168 | 62.5 | 0.78 | 578 | 15.6 | 0.8 |
| C16 | 210 | 24 | 38.2 | 0.89 | 372 | 14.0 | 0.2 |
| | 220 | 48 | 86.2 | 0.89 | 831 | 13.3 | 1.2 |
| | 220 | 72 | 80.1 | 0.86 | 763 | 14.4 | 1.2 |
| C17 | 210 | 24 | 74.2 | 0.93 | 750 | 9.5 | 0.4 |
| | 210 | 48 | 39.8 | 0.88 | 373 | 17.5 | 0.0 |
| | 210 | 72 | 35.6 | 0.90 | 330 | 18.3 | 0.0 |
| | 220 | 96 | 76.8 | 0.87 | 731 | 14.1 | 1.1 |
| | 220 | 120 | 77.3 | 0.89 | 732 | 14.3 | 1.3 |
| | 220 | 144 | 72.6 | 0.88 | 687 | 14.5 | 0.9 |
| | 220 | 168 | 68.2 | 0.87 | 641 | 15.2 | 0.8 |
| C18 | 210 | 24 | 56.4 | 0.91 | 541 | 13.1 | 0.9 |
| | 220 | 48 | 89.6 | 0.89 | 844 | 13.5 | 2.2 |
| | 220 | 72 | 84.4 | 0.89 | 792 | 13.6 | 2.0 |
| | 220 | 96 | 73.9 | 0.90 | 696 | 14.4 | 1.3 |

Examples S19-S22 and C19-C20

Catalysts Made from Single Boehmite and Colloidal Silica

The next two catalyst examples C19 (and its support S19) and C20 (and its support S20) of a catalyst were prepared using a single boehmite having an average crystallite size of about 4 nm. Example S21 was made using a single boehmite having an average crystallite size of about 15 nm; and Example S22 was made using a single boehmite having an average crystallite size of about 25 nm. A description of the preparation of these examples S19-S22 and C19-C20 is provided below.

Examples S19 and C19

Colloidal Silica Mixed with a Single Boehmite after Spray-Drying

A boehmite material comprising a 4-nm crystalline boehmite was made by peptizing with an acid a boehmite commercially available from Sasol North America and then spray-drying to provide a boehmite powder with an average particle size of about 35 microns. The boehmite powder was dispersed in water to form a boehmite sol. This sol was again spray-dried using a Mobile Minor spray-drier (type H, Model 2000, available from Niro Inc.) having an inlet temperature of about 260° C. and an outlet temperature of about 105° C. to provide a boehmite powder with an average particle size of about 70 microns. To finish the pretreatment, the spray-dried boehmite powder was then heated (i.e., calcined in air) at 325° C. for 2 hours at atmospheric pressure. An incipient wetness impregnation method was used to prepare a 3% Si modified boehmite support material. The spray-dried and heated boehmite powder was impregnated using a colloidal Ludox® silica to achieve incipient wetness. The resulting impregnated boehmite powder was dried for 16 hours in an oven at a temperature of about 82° C. to form a dried precursor. The dried precursor was then calcined in air by raising its temperature at a rate of 1° C./min. to 750° C. followed by holding at this temperature for 2 hours, which provided the stabilized support denoted Example S19 for the catalyst Example C19. The same multi-step aqueous incipient wetness impregnation method described earlier for Example C15 was used to prepare catalyst Example C19. The catalyst C19 had the following loading of Co, Pt, and B: 25 wt. % Co; 0.03 wt. % Pt; and 0.5 wt. % B, wherein the weight % is based on the total weight of the final catalyst, similar to those of Examples C15, C16 and C17.

Examples S20 and C20

Colloidal Silica Mixed with a Single Boehmite Before Spray-Drying

For Examples S20 and C20, a boehmite material comprising a 4-nm crystalline boehmite was provided by peptizing with an acid a boehmite commercially available from Sasol North America and then spray-drying to provide a boehmite powder with an average particle size of about 35 microns. The boehmite material was dispersed in water to form a boehmite sol. Ludox® silica (2% Si) was dispersed in water and added to the boehmite sol and mixed well. If necessary, the pH of the Ludox® silica sol was adjusted using acetic acid, so that the pH of the silica sol was about the same as the boehmite sol before the acidified silica sol was added to the boehmite sol. Finally, the combined sol comprising the boehmite and the colloidal silica was spray-dried using a MOBILE MINOR spray-drier (type H, Model 2000, available from Niro Inc.) having an inlet temperature of about 260° C. and an outlet temperature of about 105° C. To finish the pretreatment, the spray-dried boehmite material was then heated (i.e., calcined in air) at 750° C. for 2 hours at atmospheric pressure, which provided the stabilized support denoted Example S20 for the catalyst Example C20.

The same multi-step aqueous incipient wetness impregnation method described earlier for Example C15 was used to prepare catalyst Example C20. The catalyst Example C20 had the following loading of Co, Pt, and B: 25 wt. % Co; 0.03 wt. % Pt; and 0.5 wt. % B, wherein the weight % is based on the total weight of the final catalyst, similar to those of Examples C19, C15, C16 and C17.

Characteristics of Supports and Catalysts Materials of Examples C15-C20

Several properties of the stabilized support materials and the Fischer-Tropsch catalysts prepared therefrom in Examples C15-C20 were measured and are shown in Table 9 below.

TABLE 9

| Ex. | Support Type | Boehmite Avg. Crystallite Size, nm (wt %) | Si wt % | BET Surface Area, m²/g | Avg Pore Volume, cc/g | Avg. Pore Diameter, nm |
|---|---|---|---|---|---|---|
| C15 | 18N480 + 14N480 Support | 15 (50 wt %) 25 (50 wt %) | 3 | 119 | 0.49 | 16 |
|  | Catalyst |  |  | 73 | 0.24 | 11 |
| C16 | 18N480 + 14N480 Support | 15 (55 wt %) 25 (45 wt %) | 3 | 118 | 0.48 | 16 |
|  | Catalyst |  |  | 73 | 0.23 | 13 |
| C17 | 18N480 + 14N480 Support | 15 (65 wt %) 25 (35 wt %) | 3 | 143 | 0.48 | 14 |
|  | Catalyst |  |  | 85 | 0.26 | 12 |
| C18 | 18N480 + 11N780 Support | 15 (85 wt %) 35 (15 wt %) | 3 | 127 | 0.46 | 15 |
|  | Catalyst |  |  | 75 | 0.21 | 10 |
| C19 | Support S19 | 4 (100 wt %) | 2 | 167 | 0.47 | 11 |
|  | Catalyst |  |  | 99 | 0.24 | 9.7 |
| C20 | Support S20 | 4 (100 wt %) | 2 | 158 | 0.49 | 12 |
|  | Catalyst |  |  | 94 | 0.25 | 11 |

Testing of Catalyst Performance of Examples C19 and C20

The catalysts C19 and C20 were separately placed in a fixed bed reactor to measure their catalytic performance in the conversion of synthesis gas to hydrocarbons during a Fischer-Tropsch process, using the same method of testing as described for catalyst Examples C1-C3. The fixed bed reactor was operated at a pressure of 360 psig, a temperature of 210° C. to 220° C., and a space velocity of 6 NL/h/g catalyst. The performance (CO conversion, $CO_2/CO$, and $C_{5+}$ productivity in gram of $C_{5+}$ hydrocarbons per hour per kilogram of catalyst) of these two catalyst Examples C19 and C20 versus the time on stream (TOS) in the fixed bed reactor are shown in Table 10 below.

TABLE 10

Fixed-bed results of Examples C19 and C20

| Catalyst | Temp ° C. | TOS Hrs | CO Conv. % | Alpha | $C_{5+}$ g/h/kgcat | $CO_2/CO$ Mole % |
|---|---|---|---|---|---|---|
| C20 | 210 | 24 | 31.1 | 0.89 | 343 | 0.3 |
|  | 220 | 48 | 75.2 | 0.89 | 819 | 1.2 |
|  | 220 | 72 | 73.3 | 0.90 | 797 | 1.1 |
| C19 | 210 | 24 | 36.9 | 0.87 | 410 | 0.3 |
|  | 220 | 48 | 81.4 | 0.89 | 892 | 1.3 |
|  | 220 | 72 | 77.5 | 0.92 | 850 | 1.3 |

Examples S21-S22

Support Made from Spray-Dried Mixture of Colloidal Silica and a Single Boehmite

The same procedure as described for Example S20 (support of Example C20) was used except that in lieu of the 4 nm boehmite, Dispal® 18N4-80 with an average crystallite size of about 15 nm was used for Example S21 and Dispal® 14N4-80 with an average crystallite size of about 25 nm was used for Example S22, Examples S21 and S22 contained about 3 wt % Si.

Hydrothermal Stability of Support Examples S20-S22 and S15

The hydrothermal stability of catalyst support and catalyst Examples S20-S22 and the stabilized support (denoted S15) of Example C15 was determined using the same steaming test as described earlier for Examples S0-S5. The results of the steam test are shown in FIG. 5.

Figure 5:
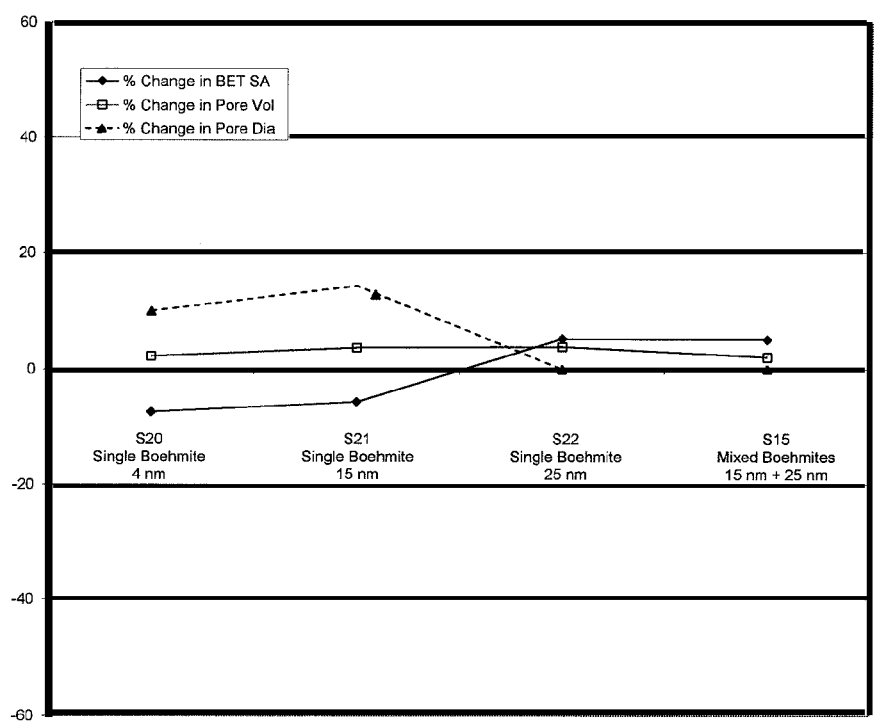
FIG. 5 illustrates the hydrothermal stability of single-boehmite and mixed-boehmites stabilized supports.

FIG. 5 illustrates that, when a single boehmite was employed in the presence of 3 wt % Si (from a colloidal silica) to make the support, the increase in the boehmite average crystallite size (from 4 nm to 25 nm) improved the steam resistance of the stabilized supports (better conservation of the pore diameter and BET surface area). In addition, the stabilized support S15, which was formed from a mixture of almost equal weights (55:45) of two boehmites of different average crystallite sizes of 15 and 25 nm respectively had an improved steam resistance than either of the stabilized supports S21 and S22 made from a sole boehmite with an average crystallite sizes of 15 nm or 25 nm, respectively.

Example S23

Support Made from Three Crystalline Boehmites and Colloidal Silica

The next support example S23 was prepared using three boehmite support materials. A description of the preparation of this example S23 is provided. Three boehmite support materials commercially available from Sasol in the form of powders under the tradenames Dispal® 18N4-80, Dispal® 14N4-80, Dispal® 11N7-80 with respective average boehmite crystallite sizes of 15 nm, 25 nm and 35 nm were dispersed together in water to form a mixed-boehmite material comprising 55 wt % of the Dispal® 18N4-80, 30 wt % of the Dispal® 14N4-80 boehmite and 15 wt % Dispal® 11N7-80 boehmite. Then, a colloidal solution of silica (Ludox® available from Grace Davison) was added to this boehmite mix and mixed well. Finally, the mixture comprising the colloidal silica and the mixed boehmites was spray dried using a Mobile Minor spray-drier (type H, Model 2000, available from Niro Inc.) having an inlet temperature of about 260° C. and an outlet temperature of about 105° C. to form a silica-containing boehmite powder. To finish the support preparation, the spray-dried silica-containing boehmite powder was then calcined in air at 750° C. for 2 hours under atmospheric pressure to generate the stabilized support Example S23. Example S23 comprises about 3 wt % Si. Example S23 had a BET surface area of 126 m²/g, a pore volume of 0.47 cc/g and an average pore diameter of 15 nm.

Examples S24-S27

Catalyst Supports from Bayerite

Support Examples S24-S27 of catalyst supports were prepared using a bayerite material, Alumina Versal™-B which is commercially available UOP LLC Adsorbents and Specialty Products (Des Plaines, Ill.). The bayerite (UOP Alumina Versal™-B) was in the form of a powder and had an average crystallite size of about 38.2 nanometers. Unmodified support Examples S24 and S25 were made without the addition of a structural stabilizer using the bayerite material, while support Examples S26-S27 have been stabilized by a silicon structural stabilizer using the same bayerite material. A description of the preparation of Examples S24-S27 is provided below.

Example S24-S25

Unmodified Catalyst Support from Bayerite

Unmodified support Examples S24-S25 were made with no structural stabilizer using UOP Versal™-B bayerite. The bayerite powder was calcined at atmospheric pressure in air for 2 hours at 350° C. and at 850° C. for Examples S24 and S25 respectively to convert most of the aluminum hydrate to a transition alumina phase. No structural stabilizer was added to support Examples S24-S25.

Examples S26-S27

Modified Catalyst Supports from Bayerite

Two catalyst support Examples S26 and S27 were stabilized with a silicon structural stabilizer using the same bayerite material Versal™-B from UOP LLC used in Examples S24 and S25. The bayerite powder was mixed with silicic acid in deionized water to make a mixture with a solid content of about 30% by weight. The mixture was then spray-dried to form dried particles of about 60 to about 90 microns in size. Finally, the dried particles were calcined at atmospheric pressure in air for 2 hours at 350° C. and at 850° C. for Examples S26 and S27 respectively to convert most of the aluminum hydrate to a transition alumina. The catalyst support Examples S26 and S27 had a final structural stabilizer content of 2 wt % silica, respectively, wherein wt % represents percent by weight based on the total weight of the final catalyst support.

XRD Analysis of Support Examples S24-S27

An analysis by X-Ray Diffraction determined that Examples S24 and S26 (which were calcined at 350° C.) both consist essentially of a mixture of gamma-alumina and boehmite with an average boehmite crystallite size of about 26 nm, and that Examples S25 and S27 (which were calcined at 850° C.) both consists essentially of a mixture of theta-alumina and delta-alumina (both transition aluminas).

Characteristics and Hydrothermal Stability of Support Examples S24-S27

Several properties (BET surface area, pore volume and average pore diameter) of the support materials from Examples S24-S27 are shown in Table 11. The hydrothermal stability of catalyst support Examples S24-S27 was determined using a steaming test as previously described for Examples S0-S5 and C1-C4. Table 11 also shows the relative percentage of change (increase or decrease) in average pore volume, average pore diameter and BET surface area resulting from the steaming test, which was calculated by the same formula used earlier. A positive (negative) % change indicates a decrease (increase) in a specific property, and a 0% value indicates no change in the specific property after the steam test.

TABLE 11

Properties for supports S24-S27 before and after steam test

| Ex. | SiO₂ wt % | Temp.*, ° C. | BET Surface Area, m²/g | | | Pore Volume, cc/g | | | Avg. Pore Diameter, nm | | |
| --- | --- | --- | --- | --- | --- | --- | --- | --- | --- | --- | --- |
| | | | Before steam | After steam | % | Before steam | After steam | % | Before steam | After steam | % |
| S24 | — | 350 | 379 | 32 | 92 | 0.33 | 0.21 | 36 | 3.5 | 26 | −643 |
| S26 | 2% | 350 | 385 | 286 | 26 | 0.32 | 0.27 | 16 | 3.4 | 3.8 | −12 |
| S25 | — | 850 | 121 | 77 | 36 | 0.39 | 0.34 | 13 | 13 | 18 | −38 |
| S27 | 2% | 850 | 156 | 127 | 19 | 0.36 | 0.31 | 14 | 9.2 | 9.9 | −8 |

*calcination

The steam test resulted in a decrease in surface area and pore volume with an increase in average pore diameter for all support Examples S24-S27, but the changes in support properties were not as pronounced for Examples S26 and S27 in the presence of the structural stabilizer comprising silicon compared to Examples S24 and S25 without the added structural stabilizer. The surface area decreased by 92% and 36% for unmodified S24 and S25, respectively, compared to 26% and 19% for stabilized S26 and S27, respectively. A similar result was obtained for the pore volume which decreased by 36% and 13% for unmodified S24 and S25, respectively, compared to 16% and 14% for stabilized S26 and S27, respectively. The major improvement was observed for the average pore size at the lower calcination temperature. The presence of the structural stabilizer in Example S26 resulted in a better preservation of the average pore size (increase of 12%) compared to a drastic pore size enlargement in unmodified Example S24 (increase of 643%).

Examples C25 and C27

Catalysts on Stabilized Supports Made from Bayerite

A multi-step aqueous incipient wetness impregnation method was used to prepare two Fischer-Tropsch catalysts in Examples C25 and C27 from, respectively, the support of Examples S25 and S27 as similarly described for Examples C1-C4 so as to obtain the following loadings of Co, Pt, and B on the support: 30 wt. % Co; 0.03 wt. % Pt; and 0.5 wt. % B, wherein the weight % is based on the total weight of the final catalyst. The Co, Pt, and B metal content in the catalyst was calculated by mass balance after drying and calcination. The properties of the catalysts are shown in Table 12.

TABLE 12

Properties of the catalyst Examples C25 and C27

| Cat. Ex. | Supp. Ex. | Structural Stabilizer Content on Support, wt % | Catalyst composition, wt % | Catalyst BET Surface Area, $m^2/g$ | Catalyst Volume, ml/g | Catalyst Avg. Pore Diameter, nm |
|---|---|---|---|---|---|---|
| C25 | S25 | 0 | 30 Co/0.03 Pt/0.5 B | 50 | 0.15 | 12 |
| C27 | S27 | 2 | 30 Co/0.03 Pt/0.5 B | 57 | 0.12 | 8.7 |

Testing of Catalyst Performance of Examples C25 and C27

The catalysts C25 and C27 were separately placed in a fixed bed reactor to measure their catalytic performance in the conversion of synthesis gas to hydrocarbons during a Fischer-Tropsch process, using the same method of testing as described for catalyst Examples C1-C3. The fixed bed reactor was operated at a pressure of 360 psig, a temperature of 210° C. to 220° C., and a space velocity of 6 NL/h/g catalyst. The performance (CO conversion, $CO_2/CO$, and $C_{5+}$ productivity in gram of $C_{5+}$ hydrocarbons per hour per kilogram of catalyst) of these two catalyst Examples C25 and C27 versus the time on stream (TOS) in the fixed bed reactor are shown in Table 13 below. Data in Table 13 indicate that the catalyst Examples C25 and C27 were active for the FT synthesis. Furthermore, addition of the structural modifier to the support did not appear to adversely affect the catalyst activity. As shown in Table 13, catalyst Examples C25 and C27 showed similar initial CO conversion, alpha value, $C_{5+}$ productivity, and methane ($C_1$) make, suggesting that a silicon modifier is suitable for increasing the support resistance to hydrothermal degradation, but yet do not affect the FT synthesis activity of the catalyst for good $C_{5+}$ productivity. Therefore, catalysts prepared by the modification of bayerite with at least one structural stabilizer exhibited similar improvement in hydrothermal resistance to those obtained with a crystalline boehmite, without the detriment to performance.

TABLE 13

Fixed-bed results of Examples C25 and C27

| Catalyst EX. (support with Stabilizer Content) | TOS, hrs | Temp, ° C. | CO Conv., % | Alpha value | $C_{5+}$, g/h/kgcat | $C_1$, wt. % |
|---|---|---|---|---|---|---|
| Example C25 | 24 | 210 | 10 | 0.90 | 113 | — |
| (on S25 with | 48 | 220 | 61 | 0.87 | 587 | 16 |
| 0% Si) | 72 | 220 | 63 | 0.90 | 602 | 15 |
|  | 96 | 220 | 64 | 0.91 | 603 | 16 |
| Example C27 | 24 | 210 | 38 | 0.90 | 382 | 14 |
| (on S27 with | 48 | 220 | 73 | 0.90 | 716 | 13 |
| 2% $SiO_2$) | 72 | 220 | 66 | 0.89 | 646 | 13 |
|  | 96 | 220 | 61 | 0.90 | 590 | 13 |

The following patent applications all filed on Oct. 16, 2003 are hereby incorporated herein by reference: U.S. Published Patent Application 2004-0127352 A1, Ser. No. 10/687,017, entitled "High Hydrothermal Stability Catalyst Support"; U.S. Published patent application 2004-0127586 A1, Ser. No. 10/687,140, entitled "A Stabilized Transition Alumina Catalyst Support From Boehmite and Catalysts Made Therefrom"; and U.S. Published Patent Application 2004-0132833 A1, Ser. No. 10/686,977, entitled "Fischer-Tropsch Processes and Catalysts Made From a Material Comprising Boehmite."

Accordingly, the scope of protection is not limited by the description and Examples set out above, but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Background of the Invention is not an admission that it is prior art to the present invention, especially any reference that may have a publication date after the priority date of this application. This disclosure of all patent applications, and publications cited herein are hereby incorporated by reference, to the extent that they provide exemplary, procedural or other details supplementary to those set forth herein.

Should the disclosure of any of the patents, patent applications, and publications that are incorporated herein conflict with the present specification to the extent that it might render a term unclear, the present specification shall take precedence.

As used herein, the term "about" or "approximately" when preceding a numerical value, has its usual meaning and also includes the range of normal measurement variations that is customary with laboratory instruments that are commonly used in this field of endeavor (e.g., weight, temperature or pressure measuring devices), preferably within ±10% of the stated numerical value.

Use of the term "optionally" with respect to any element of a claim is intended to mean that the subject element is required, or alternatively, is not required. Both alternatives are intended to be within the scope of the claim.

While preferred embodiments of this invention have been shown and described, modifications thereof can be made by one skilled in the art without departing from the spirit or teaching of this invention. The embodiments described herein are exemplary only and are not limiting. Many variations and modifications of systems and methods are possible and are within the scope of the invention. Accordingly, the scope of protection is not limited to the embodiments described herein, but is only limited by the claims that follow, the scope of which shall include all equivalents of the subject matter of the claims.

The invention claimed is:

1. A method for making a stabilized catalyst support comprising the following steps:
    a) forming a mixture of a crystalline hydrous alumina precursor and a first portion of a structural stabilizer, wherein said crystalline hydrous alumina precursor comprises two or more crystalline boehmites having different average crystallite sizes differing by at least 1 nm;
    b) drying said mixture, wherein drying comprises spray-drying;
    c) low-temperature treating the dried mixture from step (b) to form a partially-stabilized support, wherein said low-temperature treating comprises exposing said dried mixture to a temperature of about 350° C. or less to substantially retain said two or more crystalline boehmites;

d) applying a second portion of said structural stabilizer to said partially-stabilized support to form a support precursor, wherein the step of applying comprises impregnation; and e) high-temperature treating said support precursor to form a stabilized support, wherein the step of high-temperature treating comprises calcining at a temperature between about 450° C. and about 900° C. to effect the conversion of said two or more crystalline boehmites to a stabilized aluminum oxide structure.

2. The method according to claim 1 wherein said crystalline hydrous alumina precursor comprises a colloidal suspension of said crystalline boehmites, said colloidal suspension being formed by mixing a sol or slurry comprising said two or more crystalline boehmites with an acid.

3. The method according to claim 1 wherein the step (a) of forming said mixture with said first portion of said structural stabilizer comprises mixing said crystalline hydrous alumina precursor with a colloidal suspension of an oxide of said structural stabilizer.

4. The method according to claim 1 wherein the step (d) of applying said second portion of said structural stabilizer comprises impregnating said partially-stabilized support with a colloidal suspension of an oxide of said structural stabilizer.

5. The method according to claim 1 wherein the step (d) of applying said second portion of said structural stabilizer comprises impregnating said partially-stabilized support with a structural stabilizer compound dissolved in an organic solvent.

6. The method according to claim 1 wherein said structural stabilizer comprises silicon.

7. The method according to claim 6 wherein the step (a) of forming said mixture with said first portion of said structural stabilizer comprises mixing said crystalline hydrous alumina precursor with a structural stabilizer compound comprising a tetraalkyl orthosilicate.

8. The method according to claim 6 wherein the step (d) of applying said second portion of said structural stabilizer comprises impregnating said partially-stabilized support with a structural stabilizer compound comprising a tetraalkyl orthosilicate.

9. The method according to claim 6 wherein said steps (a)-(e) are carried out to provide a support which is stabilized with said structural stabilizer comprising silicon, said stabilized support having an average pore size between about 10 nm and about 20 nm; a BET surface area between about 90 $m^2/g$ support and about 180 $m^2/g$ support; and a pore volume between about 0.4 cc/g support and about 0.55 cc/g support.

10. The method according to claim 1 wherein the step (c) of low-temperature treating comprises exposing said dried mixture to a temperature between about 250° C. and about 350° C.

11. The method according to claim 1 wherein the step (e) of high-temperature treating comprises calcining said support precursor at a temperature between about 600° C. and about 850° C.

12. The method according to claim 1 wherein said crystalline hydrous alumina precursor comprises:
a first crystalline boehmite having a first average crystallite size between about 4 nm and about 15 nm; and
a second crystalline boehmite having a second average crystallite size between about 10 nm and about 40 nm.

13. The method according to claim 1 wherein said crystalline hydrous alumina precursor is free of any aluminum alkoxide.

14. A method for making a stabilized catalyst support comprising the following steps:
incorporating two or more structural stabilizers into a crystalline hydrous alumina precursor to form a support precursor, said crystalline hydrous alumina precursor comprising two or more crystalline boehmites having different average crystallite sizes differing by at least 1 nm; and
heat treating said support precursor to form a stabilized support, wherein the step of heat treating comprises calcining at a temperature between about 450° C. and about 900° C. to effect the conversion of said two or more crystalline boehmites to a stabilized aluminum oxide structure;
wherein the incorporating step comprises:
a) mixing said crystalline hydrous alumina precursor with a first structural stabilizer or a compound thereof to form a mixture;
b) drying the mixture from step (a) to form a dried material, wherein said drying comprises at least one spray-drying step; and
c) impregnating said dried material with a second structural stabilizer or a compound thereof to form said support precursor.

15. The method according to claim 14 wherein the step of incorporating further comprises:
low-temperature treating said dried material at a temperature of about 350° C. or less to substantially retain said two or more crystalline boehmites.

16. The method according to claim 14 wherein said first stabilizer or said second stabilizer comprises silicon, and wherein the compound of said first or second stabilizer which comprises silicon comprises a colloidal suspension of silicon oxide.

17. The method according to claim 14 wherein said first stabilizer or said second stabilizer comprises silicon, and wherein the compound of said first or second stabilizer which comprises silicon comprises a tetraalkyl orthosilicate.

18. A method for making a stabilized catalyst support comprising the following steps:
a) shaping by spray-drying a crystalline hydrous alumina precursor with a binder comprising silica, wherein said crystalline hydrous alumina precursor comprises two or more crystalline boehmites having different average crystallite sizes differing by at least 1 nm;
b) preheating the shaped crystalline hydrous alumina precursor from step (a) at a temperature of 350° C. or less to substantially retain said two or more crystalline boehmites and to form a preheated support material;
c) impregnating said preheated support material from step (b) with a structural stabilizer or compound thereof, wherein said structural stabilizer comprises silicon; and
d) calcining the impregnated material from step (c) to form a stabilized support, wherein said calcining is carried out at a temperature between about 450° C. and about 900° C. to effect the conversion of said two or more crystalline boehmites to a stabilized aluminum oxide structure.

19. The method according to claim 18 wherein silica in said binder used in step (a) is in the form of a dried silica gel or a gelatinous silica precipitate.

20. The method according to claim 18 wherein the step (b) of preheating comprises exposing said shaped crystalline hydrous alumina precursor to a temperature between about 250° C. and about 350° C.

21. The method according to claim 18 wherein step (c) comprises impregnating the preheated support material from step (b) with a structural stabilizer compound dissolved in an organic solvent.

22. The method according to claim 18 wherein step (c) comprises impregnating the preheated support material from step (b) with a structural stabilizer compound comprising at least one of ammonium silicate, calcium silicate, tetramethyl orthosilicate, tetraethyl orthosilicate, tetrapropyl orthosilicate, tetraisopropyl orthosilicate, tetrabutyl orthosilicate, tetrahexyl orthosilicate, tetraallyl orthosilicate, silicon tetraboride, silicon tetraacetate, zirconium silicate, silicic acid, or a silica-alumina gel.

23. The method according to claim 18 wherein step (c) comprises impregnating the preheated support material from step (b) with a structural stabilizer compound comprising a tetraalkyl orthosilicate.

24. The method according to claim 18 wherein step (d) comprises calcining the impregnated material from step (c) at a temperature between about 600° C. and about 850° C.

25. The method according to claim 18 wherein the crystalline hydrous alumina precursor comprises:
a first crystalline boehmite having a first average crystallite size between about 4 nm and about 15 nm; and
a second crystalline boehmite having a second average crystallite size between about 10 nm and about 40 nm.

26. A process for producing hydrocarbons employing a catalyst supported on a stabilized support with an enhanced hydrothermal stability, comprising:
reacting a feed gas comprising carbon monoxide and hydrogen under conversion promoting conditions in the presence said catalyst supported on said stabilized support to produce hydrocarbons with 5 or more carbon atoms; wherein said stabilized support is prepared by a method comprising the following steps:
a) forming a mixture of a crystalline hydrous alumina precursor and a first portion of a structural stabilizer, wherein said crystalline hydrous alumina precursor comprises two or more crystalline boehmites having different average crystallite sizes differing by at least 1 nm;
b) drying said mixture, wherein drying comprises spray-drying;
c) low-temperature treating the dried mixture from step (b) to form a partially-stabilized support, wherein said low-temperature treating comprises exposing said dried mixture to a temperature of about 350° C. or less to substantially retain said two or more crystalline boehmites;
d) applying a second portion of said structural stabilizer to said partially-stabilized support to form a support precursor, wherein the step of applying comprises impregnation; and
e) high-temperature treating said support precursor to form a stabilized support, wherein the step of high-temperature treating comprises calcining at a temperature between about 450° C. and about 900° C. to effect the conversion of said two or more crystalline boehmites to a stabilized aluminum oxide structure.

27. A process for producing hydrocarbons employing a catalyst supported on a stabilized support with an enhanced hydrothermal stability, comprising:
reacting a feed gas comprising carbon monoxide and hydrogen under conversion promoting conditions in the presence of said catalyst supported on said stabilized support to produce hydrocarbons with 5 or more carbon atoms; wherein said stabilized support is prepared by a method comprising the following steps:
incorporating two or more structural stabilizers into a crystalline hydrous alumina precursor to form a support precursor, said crystalline hydrous alumina precursor comprising two or more crystalline boehmites having different average crystallite sizes differing by at least 1 nm; and
heat treating said support precursor to form said stabilized support, wherein said heat treating comprises calcining at a temperature between about 450° C. and about 900° C. to effect the conversion of said two or more crystalline boehmites to a stabilized aluminum oxide structure;
wherein the incorporating step comprises:
a) mixing a first structural stabilizer or compound thereof with said crystalline hydrous alumina precursor comprising said crystalline boehmites to form a mixture;
b) drying the mixture from step (a) to form a dried material, wherein said drying comprises at least one spray-drying step; and
c) impregnating the dried material from step (b) with a second structural stabilizer or compound thereof to form said support precursor.

28. A process for producing hydrocarbons employing a catalyst supported on a stabilized support with an enhanced hydrothermal stability, comprising:
reacting a feed gas comprising carbon monoxide and hydrogen under conversion promoting conditions in the presence of said catalyst supported on said stabilized support to produce hydrocarbons with 5 or more carbon atoms; wherein said stabilized support is prepared by a method comprising the following steps:
a) shaping by spray-drying a crystalline hydrous alumina precursor with a binder comprising silica, wherein said crystalline hydrous alumina precursor comprises two or more crystalline boehmites having different average crystallite sizes differing by at least 1 nm;
b) preheating the shaped crystalline hydrous alumina precursor from step (a) at a temperature of 350° C. or less to substantially retain said two or more crystalline boehmites and to form a preheated support material;
c) impregnating said preheated support material from step (b) with a structural stabilizer or compound thereof, wherein said structural stabilizer comprises silicon; and
d) calcining the impregnated material from step (c) to form said stabilized support, wherein said calcining is carried out at a temperature between about 450° C. and about 900° C. to effect the conversion of said two or more crystalline boehmites to a stabilized aluminum oxide structure.

* * * * *